US006697043B1

(12) United States Patent
Shahoian

(10) Patent No.: US 6,697,043 B1
(45) Date of Patent: Feb. 24, 2004

(54) HAPTIC INTERFACE DEVICE AND ACTUATOR ASSEMBLY PROVIDING LINEAR HAPTIC SENSATIONS

(75) Inventor: Erik J. Shahoian, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/585,741

(22) Filed: Jun. 2, 2000

Related U.S. Application Data

(60) Provisional application No. 60/172,953, filed on Dec. 21, 1999, provisional application No. 60/182,868, filed on Feb. 16, 2000, and provisional application No. 60/191,333, filed on Mar. 22, 2000.

(51) Int. Cl.[7] .................................................. G09G 5/00
(52) U.S. Cl. ...................................................... 345/156
(58) Field of Search ................................ 345/156, 163, 345/164, 167, 168, 173

(56) References Cited

U.S. PATENT DOCUMENTS

| 3,157,853 A | 11/1964 | Hirsch |
| 3,220,121 A | 11/1965 | Cutler |
| 3,497,668 A | 2/1970 | Hirsch |

(List continued on next page.)

FOREIGN PATENT DOCUMENTS

| EP | 0 265 011 A1 | 4/1988 |
| EP | 0 349 086 A1 | 1/1990 |
| EP | 0 607 580 A1 | 7/1994 |
| EP | 0 626 634 A2 | 11/1994 |
| JP | S62-194389 | 12/1987 |
| JP | H5-86387 | 11/1993 |
| WO | WO 92/00559 | 1/1992 |
| WO | WO 95/20788 | 8/1995 |
| WO | WO 97/31333 | 8/1997 |
| WO | WO 98/32112 | 7/1998 |
| WO | WO 00/03319 | 1/2000 |

OTHER PUBLICATIONS

Rosenberg et al., "The Use of Force Feedback to Enhance Graphical User Interfaces," Stereoscopic Displays & Virtual Reality Systems III (1996), Proc. SPIE 2653, pp. 243–248.
Schmult et al., "Application Areas for A Force–Feedback Joystick," DSC–vol. 49, Advances in Robotics, Mechatronics, and Haptic Interfaces, ASME 1993, pp. 47–54.
Ellis et al., "Design and Evaluation of a High–Performance Prototype Planar Haptic Interface," DSC–vol. 49, Advances in Robotics, Mechatronics, and Haptic Interfaces, ASME Dec. 1993, pp. 55–65.

(List continued on next page.)

*Primary Examiner*—Richard Hjerpe
*Assistant Examiner*—Ronald Laneau

(57) ABSTRACT

An interface device and method providing haptic sensations to a user. A user physically contacts a housing of the interface device, and a sensor device detects the manipulation of the interface device by the user. An actuator assembly includes an actuator that provides output forces to the user as haptic sensations. In one embodiment, the actuator outputs a rotary force, and a flexure coupled to the actuator moves an inertial mass and/or a contact member. The flexure can be a unitary member that includes flex joints allowing a portion of the flexure to be linearly moved. The flexure can converts rotary force output by the actuator to linear motion, where the linear motion causes a force that is transmitted to the user. In another embodiment, the actuator outputs a force, and a mechanism coupling the actuator to the device housing uses the force to move the actuator with respect to the device housing. The actuator acts as an inertial mass when in motion to provide an inertial force that can be transmitted to the user. The mechanism can be a flexure including at least one flex joint or a mechanism with bearings.

69 Claims, 25 Drawing Sheets

U.S. PATENT DOCUMENTS

| | | |
|---|---|---|
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll .................. 340/172.5 |
| 4,160,508 A | 7/1979 | Salisbury, Jr. |
| 4,236,325 A | 12/1980 | Hall et al. |
| 4,414,984 A | 11/1983 | Zarudiansky ............... 128/774 |
| 4,513,235 A | 4/1985 | Acklam et al. |
| 4,550,617 A | 11/1985 | Fraigner et al. ............ 73/862 |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,731,603 A | 3/1988 | McRae et al. ............. 340/407 |
| 4,787,051 A | 11/1988 | Olson ....................... 364/518 |
| 4,794,392 A | 12/1988 | Selinko |
| 4,795,296 A | 1/1989 | Jau ............................... 414/5 |
| 4,868,549 A * | 9/1989 | Affinito et al. ............ 345/164 |
| 4,891,764 A | 1/1990 | McIntosh |
| 4,896,554 A | 1/1990 | Culver .................. 74/471 XY |
| 4,930,770 A | 6/1990 | Baker |
| 4,934,694 A | 6/1990 | McIntosh |
| 4,949,119 A | 8/1990 | Moncrief et al. ........... 364/578 |
| 5,019,761 A | 5/1991 | Kraft |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,146,566 A | 9/1992 | Hollis, Jr. et al. ........... 395/275 |
| 5,184,319 A | 2/1993 | Kramer ...................... 364/806 |
| 5,185,561 A | 2/1993 | Good et al. ................ 318/432 |
| 5,186,629 A | 2/1993 | Rohen ........................ 434/114 |
| 5,203,563 A | 4/1993 | Loper, III ............... 273/148 B |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,296,871 A | 3/1994 | Paley ........................ 345/163 |
| 5,299,810 A | 4/1994 | Pierce et al. |
| 5,309,140 A | 5/1994 | Everett, Jr. et al. |
| 5,334,027 A | 8/1994 | Wherlock |
| 5,388,992 A | 2/1995 | Franklin et al. ............ 434/114 |
| 5,399,091 A | 3/1995 | Mitsumoto .................. 434/61 |
| 5,405,152 A | 4/1995 | Katanics et al. ............ 273/438 |
| 5,414,337 A | 5/1995 | Schuler ...................... 318/561 |
| 5,440,183 A | 8/1995 | Denne ........................ 310/12 |
| 5,451,924 A | 9/1995 | Massimino et al. ...... 340/407.1 |
| 5,466,213 A | 11/1995 | Hogan et al. |
| 5,489,812 A | 2/1996 | Furuhata et al. ............ 310/309 |
| 5,506,605 A | 4/1996 | Paley ........................ 345/163 |
| 5,542,672 A | 8/1996 | Meredith ..................... 463/37 |
| 5,547,382 A | 8/1996 | Yamasaki et al. |
| 5,565,840 A | 10/1996 | Thorner et al. .......... 340/407.1 |
| 5,583,478 A | 12/1996 | Renzi ...................... 340/407.1 |
| 5,589,828 A | 12/1996 | Armstrong ................... 341/20 |
| 5,625,576 A | 4/1997 | Massie et al. .............. 364/578 |
| 5,629,594 A | 5/1997 | Jacobus et al. ........ 318/568.11 |
| 5,642,469 A | 6/1997 | Hannaford et al. ........... 395/99 |
| 5,643,087 A | 7/1997 | Marcus et al. ................ 463/38 |
| 5,666,138 A | 9/1997 | Culver ....................... 345/161 |
| 5,684,722 A | 11/1997 | Thorner et al. ............. 364/578 |
| 5,691,747 A | 11/1997 | Amano ...................... 345/167 |
| 5,696,537 A | 12/1997 | Solhjell ....................... 345/164 |
| 5,709,219 A | 1/1998 | Chen et al. .................. 128/782 |
| 5,714,978 A | 2/1998 | Yamanaka et al. .......... 345/157 |
| 5,734,373 A | 3/1998 | Rosenberg et al. ......... 345/161 |
| 5,736,978 A | 4/1998 | Hasser et al. ................ 345/173 |
| 5,742,278 A | 4/1998 | Chen et al. .................. 345/156 |
| 5,754,023 A | 5/1998 | Roston et al. ............... 318/561 |
| 5,766,016 A | 6/1998 | Sinclair et al. |
| 5,781,172 A | 7/1998 | Engel et al. ................. 345/164 |
| 5,784,052 A | 7/1998 | Keyson ....................... 345/167 |
| 5,785,630 A | 7/1998 | Bobick et al. |
| 5,790,108 A * | 8/1998 | Salcudean et al. .......... 345/184 |
| 5,805,140 A | 9/1998 | Rosenberg et al. ......... 345/161 |
| 5,825,308 A | 10/1998 | Rosenberg .................... 341/20 |
| 5,857,986 A | 1/1999 | Moriyasu ...................... 601/49 |
| 5,889,670 A | 3/1999 | Schuler et al. ............... 364/188 |
| 5,894,263 A | 4/1999 | Shimakawa et al. ..... 340/388.1 |
| 5,897,437 A | 4/1999 | Nishiumi et al. ............. 463/47 |
| 5,903,085 A | 5/1999 | Karam ........................ 310/328 |
| 5,914,705 A * | 6/1999 | Johnson et al. ............. 345/163 |
| 5,956,016 A | 9/1999 | Kuenzner et al. ........... 345/156 |
| 5,959,613 A | 9/1999 | Rosenberg et al. ......... 345/161 |
| 5,973,670 A | 10/1999 | Barber et al. ................ 345/157 |
| 5,973,689 A | 10/1999 | Gallery ....................... 345/339 |
| 5,979,892 A | 11/1999 | Smith ......................... 271/267 |
| 5,984,880 A | 11/1999 | Lander et al. ............... 600/595 |
| 5,986,643 A | 11/1999 | Harvill et al. ............... 345/156 |
| 5,990,869 A | 11/1999 | Kubica et al. ............... 345/163 |
| 6,001,014 A | 12/1999 | Ogata et al. ................... 463/37 |
| 6,028,593 A | 2/2000 | Rosenberg et al. ......... 345/156 |
| 6,044,646 A | 4/2000 | Silverbrook .................. 60/528 |
| 6,078,308 A | 6/2000 | Rosenberg et al. ......... 345/145 |
| 6,088,019 A | 7/2000 | Rosenberg .................. 345/156 |
| 6,100,874 A | 8/2000 | Schena et al. ............... 345/157 |
| 6,128,006 A * | 10/2000 | Rosenberg et al. ......... 345/163 |
| 6,154,201 A | 11/2000 | Levin et al. ................. 345/184 |
| 6,166,723 A * | 12/2000 | Schena et al. ............... 345/184 |
| 6,184,868 B1 | 2/2001 | Shahoian et al. ............ 345/161 |
| 6,198,206 B1 | 3/2001 | Saarmaa et al. ............. 310/340 |
| 6,211,861 B1 | 4/2001 | Rosenberg et al. ......... 345/163 |
| 6,219,032 B1 | 4/2001 | Rosenberg et al. ......... 345/157 |
| 6,243,078 B1 | 6/2001 | Rosenberg .................. 345/161 |
| 6,256,011 B1 | 7/2001 | Culver ....................... 345/157 |
| 6,275,213 B1 | 8/2001 | Tremblay et al. ........... 345/156 |
| 6,300,936 B1 | 10/2001 | Braun et al. ................. 345/156 |

OTHER PUBLICATIONS

Hannaford et al., "Force–Feedback Cursor Control," NASA Tech Brief, vol. 13, No. 11, Item #21, Jet Propulsion Lab., Nov. 1989.

Iwata, H., "Artificial Reality with Force–Feedback: Development of Desktop Virtual Space with Compact Master Manipulator," Computer Graphics, vol. 24, No. 4, Aug. 1990, pp. 165–170.

Ramstein et al., "The Pantograph: A Large Workspace Haptic Device for a Multimodal Human–Computer Interaction," Computer–Human Interaction, CHI '94.

Rosenberg et al., "Commercially Viable Force Feedback Controller for Individuals with Neuromotor Disabilities," USAF Armstrong Lab., May 1996.

Rosenberg, L., "A Force Feedback Programming Primer—For PC Gaming Peripherals Supporting I–Force 2.0 and Direct—X 5.0," Immersion Corporation, 1997.

Hasser, C., "Tactile Feedback For a Force–Reflecting Haptic Display," School of Engineering, Univ. of Dayton, Dec. 1995.

Hasser, C. et al., "Tactile Feedback With Adaptive Controller for a Force–Reflecting Haptic Display—Part 1: Design," IEEE 0–7803–3131, Jan. 1996.

Dennerlein, Jack T. et al., "Vibrotactile Feedback for Industrial Telemanipulators," $6^{th}$ Ann. Symposium on Haptic Interfaces for Virtual Environment and Teleoperator Systems, ASME IMECE, Nov. 1997.

Akamatsu, M. et al., "Multimodal Mouse: A Mouse–Type Device With Tactile and Force Display," Presence, vol. 3, No. 4, Winter 1994, pp. 73–80.

Kelley, A.J. et al., "MagicMouse: Tactile and Kinesthetic Feedback in the Human–Computer Interface Using an Electromagnetically Actuated Input/Output Device," Dept. of Elec. Eng., Univ. of British Columbia, Oct. 1993, pp. 1–27.

Ramstein, C., "Combining Haptic and Braille Technologies: Design Issues and Pilot Study," ACM 0–89791–776 Jun. 1996, pp. 37–44.

Payette, J. et al., "Evaluation of a Force Feedback (Haptic) Computer Pointing Device in Zero Gravity," DSC–vol. 58, Proc. of ASME Dynamics Systems and Control Division, ASME 1996, pp. 547–553.

Wiker, S. et al., "Development of Tactile Mice for Blind Access to Computers: Importance of Stimulation Locus, Object Size, and Vibrotactile Display Resolution," Proc. of Human Factors Society $35^{th}$ Annual Meeting 1991, pp. 708–712.

Minsky, M. et al., "Feeling and Seeing: Issues in Force Display," ACM 089791–351–5, 1990, pp. 235–242, 270.

Baigrie, "Elecric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research*, vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, pp. 1–369, 1990.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050–4729/93, pp. 955–960, 1993.

Adelstein et al., "Design and Implementation of a Force Reflecting Manipulandum for Manual Control research," DSC–vol. 42, *Advances in Robotics*, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advances in Robotics*, pp. 55–61, ASME 1992.

Russo, "Controlling Dissipative Magnetic Particle Brakes in Force Reflective Devices," DSC–vol. 42, *Advances in Robotics*, pp. 63–70, ASME 1992.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990.

Adelstein, "A Virtual Environment System for the Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980.

Bejczy et al., "Generalization of Bilateral Force–Reflecting Control of Manipulators," *Proceedings of Fourth CISM–IFToMM*, Sep. 8–12, 1981.

McAffee et al., "Teleoperator Subsystem/Telerobot Demonstrator: Force Reflecting Hand Controller Equipment Manual," JPL 1988, JPL D–5172.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback in a Computer Mouse," *Proceedings of Fourteenth Annual Northeast Bioengineering Conference, University of New Hampshire*, Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of the Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System for Dual–Arm Teleoperation," *SOAR '89 Workshop, JSC*, Houston, TX, Jul. 25–27, 1989.

Ouhyoung et al., "A Low–Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine the Cutting Edge*, Sep. 8–11, 1994.

Bejczy, et al., "Universal Computer Control System (UCCS) for Space Telerobots," CH2413–3/87/0000/0318501.001987 IEEE, 1987.

* cited by examiner

HAPTIC INTERFACE DEVICE AND ACTUATOR ASSEMBLY PROVIDING LINEAR HAPTIC SENSATIONS

CROSS REFERENCE TO RELATED APPLICATIONS

This application claims the benefit of U.S. Provisional Applications No. 60/172,953, filed Dec. 21, 1999, entitled, "Haptic Interface Device Providing Linear Tactile Sensations Using a Rotary Actuator," No. 60/182,868, filed Feb. 16, 2000, entitled, "Haptic Device with Rotary Actuator as Inertial Mass," and No. 60/191,333, filed Mar. 22, 2000, entitled, "Actuator Flexure Module," all of which are incorporated herein by reference in their entirety.

BACKGROUND OF THE INVENTION

The present invention relates generally to interface devices for allowing humans to interface with computer systems, and more particularly to low-cost computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object. In other applications, interface devices such as remote controls allow a user to interface with the functions of an electronic device or appliance.

In some interface devices, force (kinesthetic) feedback and/or tactile feedback is also provided to the user, more generally known collectively herein as "haptic feedback." These types of interface devices can provide physical sensations which are felt by the user manipulating a user manipulandum of the interface device, such as a joystick handle, mouse, wheel, etc. One or more motors or other actuators are coupled to the joystick handle or mouse and are connected to the controlling computer system. The computer system controls forces on the joystick or mouse in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device. For example, when the user moves the manipulatable object and causes a displayed cursor to interact with a different displayed graphical object, the computer can issue a command that causes the actuator to output a force on the physical object, conveying a feel sensation to the user.

One problem with current haptic feedback controllers in the home consumer market is the high manufacturing cost of such devices, which makes the devices expensive for the consumer. A large part of this manufacturing expense is due to the inclusion of complex and multiple actuators and corresponding control electronics in the haptic feedback device. In addition, high quality mechanical and force transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device.

Some low cost haptic devices exist, such as the vibrotactile gamepads for console game systems and personal computers, e.g. the Sony DualShock or Nintendo Rumble Pack. These devices generate tactile sensations by including a motor having a rotating shaft and an inertial mass connected to the shaft at an off-center point of the mass. The inertial mass is rotated around the motor shaft with respect to the interface device at various speeds. This can create sinusoidal force signals at various frequencies depending upon the current driven through the motor. The problem with such a methodology is slow response time because the spinning mass must accelerate and decelerate over time to achieve the rotational velocity corresponding to a desired frequency output. Also, this implementation applies forces in a continually changing direction confined to a plane of rotation of the mass, providing a "wobble" sensation. This can be particularly disconcerting to the user at slow frequencies and, in many embodiments, may be unsuitable for use with devices like a mouse, which also provide input in a plane that may overlap with the plane in which forces are exerted.

A need therefore exists for a haptic feedback device that is lower in cost to manufacture yet offers the user compelling haptic feedback to enhance the interaction with computer applications.

SUMMARY OF THE INVENTION

The present invention is directed toward an actuator assembly and an interface device including such an assembly that provides haptic sensations to a user. Inertial and/or contact forces are applied to a user with a low-cost actuator and mechanical structure, which allows a low-cost force feedback device to be produced.

More particularly, a haptic feedback interface device of the present invention is coupled to a host computer implementing a host application program and is manipulated by a user. The interface device includes a housing that is physically contacted by the user, a sensor device detecting said manipulation of said interface device by the user, and an actuator assembly that provides output forces to the user as haptic sensations.

In one embodiment, the actuator assembly includes an actuator that outputs a rotary force, and a flexure coupling the actuator to the device housing. The flexure is a unitary member and includes a plurality of flex joints allowing a portion of the flexure to be approximately linearly moved. The flexure converts the rotary force output by the actuator to the linear motion, where the linear motion causes a force that is transmitted to the user. Preferably, the linear motion is provided approximately along an axis that is perpendicular to a planar workspace in which the interface device may be moved by the user. In some embodiments, a portion of the flexure is coupled to an inertial mass so that the inertial mass is linearly moved when the actuator outputs the rotary force, where an inertial force caused by the inertial mass is transmitted to the user through the housing.

In another embodiment, the actuator assembly includes an actuator which outputs a force, and a mechanism coupling the actuator to the device housing, where the mechanism allows the actuator to be moved with respect to the device housing. The actuator acts as an inertial mass when in motion to provide an inertial force that is transmitted to the user. The mechanism can be a flexure including at least one flex joint or a mechanism with bearings, and the actuator can output a rotary force. The actuator can approximately linearly move along a z-axis substantially perpendicular to an x-y plane in which the user can move a manipulandum of the interface device. A method of the present invention similarly outputs a force from an actuator to move the actuator and provide haptic sensations to the user of the interface device.

In some embodiments, the mechanism or flexure is coupled to a moveable contact member which moves into physical contact with the user when said user is normally operating the interface device. For example, the contact member can include a cover portion that is at least a portion of a top surface of the interface device. The actuator can be driven bi-directionally to provide an output force that produces pulse or vibration sensations to the user. The flexure can include at least one stop to prevent motion of an actuator shaft of the actuator past a desired fraction of a full revolution.

Preferably, the interface device is a handheld interface device, such as a mouse, gamepad, or remote control device. The linear motion can be correlated with a graphical representation displayed by the host computer, where a position of a mouse in the planar workspace corresponds with a position of a cursor displayed in the graphical representation. The linear motion provides a pulse correlated with the interaction of a user-controlled cursor with a graphical object displayed in a graphical user interface. The linear motion can be included in a force sensation, such as a pulse, vibration, or texture force. The actuator preferably outputs the forces in response to commands or signals received by the interface device from the host computer.

The present invention advantageously provides a haptic feedback device that is significantly lower in cost than other types of haptic feedback devices and is thus well-suited for home consumer applications. One or more low-cost actuator assemblies of the present invention can be provided that apply a force in a particular degree of freedom, such as a Z-axis perpendicular to a support surface. A flexure is used is some embodiments to provide long-lasting and effective haptic sensations, and in some embodiments the actuator itself can be used as an inertial mass for inertial haptic sensations, saving cost and assembly time.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
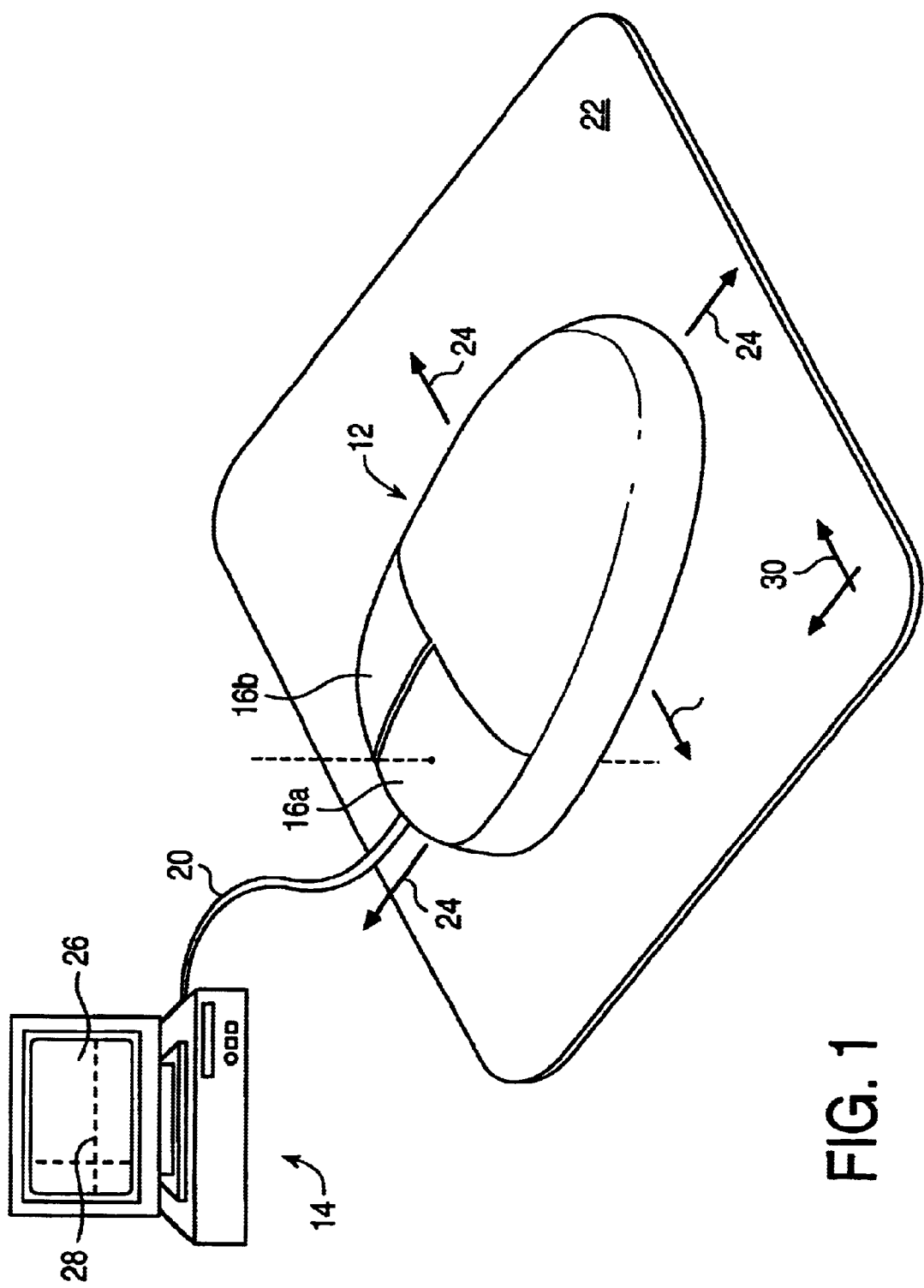
FIG. 1 is a perspective view of system including a haptic interface device of the present invention connected to a host computer.

FIG. 1 is a perspective view of a haptic feedback mouse interface system 10 of the present invention capable of providing input to a host computer based on the user's manipulation of the mouse and capable of providing haptic feedback to the user of the mouse system based on events occurring in a program implemented by the host computer. Mouse system 10 includes a mouse 12 and a host computer 14. It should be noted that the term "mouse" as used herein, indicates an object generally shaped to be grasped or contacted by the user and moved within a substantially planar workspace (and additional degrees of freedom if available). Typically, a mouse is a smooth- or angular-shaped compact unit that snugly fits under a user's hand, fingers, and/or palm, but can also be implemented as a grip, finger cradle, cylinder, sphere, planar object, etc.

Mouse 12 is an object that is preferably grasped or gripped and manipulated by a user. By "grasp," it is meant that users may releasably engage a portion of the object in some fashion, such as by hand, with their fingertips, etc. In the described embodiment, mouse 12 is shaped so that a user's fingers or hand may comfortably grasp the object and move it in the provided degrees of freedom in physical space. For example, a user can move mouse 12 to provide planar two-dimensional input to a computer system to correspondingly move a computer generated graphical object, such as a cursor or other image, in a graphical environment provided by computer 14 or to control a virtual character, vehicle, or other entity in a game or simulation. In addition, mouse 12 preferably includes one or more buttons 16a and 16b to allow the user to provide additional commands to the computer system. The mouse 12 may also include additional buttons. For example, a thumb button can be included on one side of the housing of mouse 12.

Mouse 12 preferably includes an actuator assembly which is operative to produce forces on the mouse 12 and haptic sensations to the user. Several embodiments are described herein which provide different implementations of the actuator assembly, and which are described in greater detail below with reference to FIGS. 2–12b.

Mouse 12 rests on a ground surface 22 such as a tabletop or mousepad. A user grasps the mouse 12 and moves the mouse in a planar workspace on the surface 22 as indicated by arrows 24. Mouse 12 may be moved anywhere on the ground surface 22, picked up and placed in a different location, etc. A frictional ball and roller assembly (not shown) can in some embodiments be provided on the underside of the mouse 12 to translate the planar motion of the mouse 12 into electrical position signals, which are sent to a host computer 14 over a bus 20 as is well known to those skilled in the art. In other embodiments, different mechanisms and/or electronics can be used to convert mouse motion to position or motion signals received by the host computer, as described below. Mouse 12 is preferably a relative device, in which its sensor detect a change in position of the mouse, allowing the mouse to be moved over any surface at any location. An absolute mouse may also be used, in which the absolute position of the mouse is known with reference to a particular predefined workspace.

Mouse 12 is coupled to the computer 14 by a bus 20, which communicates signals between mouse 12 and computer 14 and may also, in some preferred embodiments, provide power to the mouse 12. Components such as actuator assembly 18 require power that can be supplied from a conventional serial port or through an interface such as a USB or Firewire bus. In other embodiments, signals can be sent between mouse 12 and computer 14 by wireless transmission/reception. In some embodiments, the power for the actuator can be supplemented or solely supplied by a power storage device provided on the mouse, such as a capacitor or one or more batteries. Some embodiments of such are disclosed in U.S. Pat. No. 5,691,898, incorporated herein by reference.

Host computer 14 is preferably a personal computer or workstation, such as a PC compatible computer or Macintosh personal computer, or a Sun or Silicon Graphics workstation. For example, the computer 14 can operate under the Windows™, MacOS, Unix, or MS-DOS operating system. Alternatively, host computer system 14 can be one of a variety of home video game console systems commonly connected to a television set or other display, such as systems available from Nintendo, Sega, or Sony. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art.

Host computer 14 preferably implements a host application program with which a user is interacting via mouse 12 and other peripherals, if appropriate, and which may include force feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the mouse 12. Herein, for simplicity, operating systems such as Windows™, MS-DOS, MacOS, Linux, Be, etc. are also referred to as "application programs." In one preferred embodiment, an application program utilizes a graphical user interface (GUI) to present options to a user and receive input from the user. Herein, computer 14 may be referred as providing a "graphical environment," which can be a graphical user interface, game, simulation, or other visual environment. The computer displays "graphical objects" or "computer objects," which are not physical objects, but are logical software unit collections of data and/or procedures that may be displayed as images by computer 14 on display screen 26, as is well known to those skilled in the art. A displayed cursor or a simulated cockpit of an aircraft might be considered a graphical object. The host application program checks for input signals received from the electronics and sensors of mouse 12, and outputs force values and/or commands to be converted into forces output for mouse 12. Suitable software drivers which interface such simulation software with computer input/output (I/O) devices are available from Immersion Corporation of San Jose, Calif.

Display device 26 can be included in host computer 14 and can be a standard display screen (LCD, CRT, flat panel, etc.), 3-D goggles, or any other visual output device. Typically, the host application provides images to be displayed on display device 26 and/or other feedback, such as auditory signals. For example, display screen 26 can display images from a GUI.

As shown in FIG. 1, the host computer may have its own "host frame" 28 which is displayed on the display screen 26. In contrast, the mouse 12 has its own workspace or "local frame" 30 in which the mouse 12 is moved. In a position control paradigm, the position (or change in position) of a user-controlled graphical object, such as a cursor, in host frame 28 corresponds to a position (or change in position) of the mouse 12 in the local frame 30. The offset between the object in the host frame and the object in the local frame can be changed by the user by indexing, i.e., moving the mouse while no change in input is provided to the host computer, such as by lifting the mouse from a surface and placing it down at a different location.

In alternative embodiments, the mouse 12 can instead be a different interface device or control device. For example, handheld devices are very suitable for the actuator assemblies described herein. A hand-held remote control device used to select functions of a television, video cassette recorder, sound stereo, internet or network computer (e.g., Web-TV™), or a gamepad controller for video games or computer games, can be used with the haptic feedback components described herein. Handheld devices are not constrained to a planar workspace like a mouse but can still benefit from the directed inertial sensations and contact forces described herein which, for example, can be output about perpendicularly to the device's housing surfaces. Other interface devices may also make use of the actuator assemblies described herein. For example, a joystick handle can include the actuator assembly, where haptic sensations are output on the joystick handle as the sole haptic feedback or to supplement kinesthetic force feedback in the degrees of freedom of the joystick. Trackballs, steering wheels, styluses, rotary knobs, linear sliders, gun-shaped targeting devices, medical devices, grips, etc. can also make use of the actuator assemblies described herein to provide haptic sensations.

Figure 2:
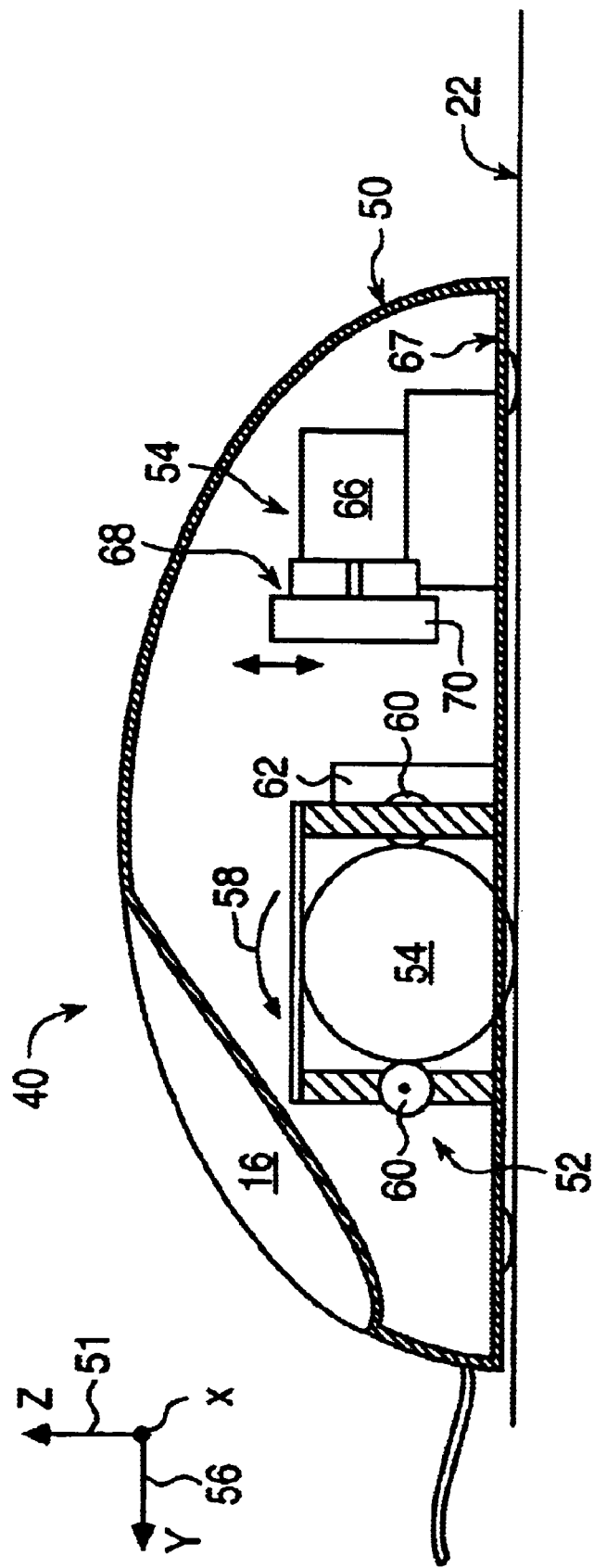
FIG. 2 is a side cross sectional view of a mouse embodiment of the haptic interface device of FIG. 1 that provides inertial forces to the user.

FIG. 2 is a side cross-sectional view of a first embodiment 40 of mouse 12 of FIG. 1. Mouse 40 includes one or more actuator assemblies for imparting haptic feedback such as tactile sensations to the user of the mouse. The actuator assembly outputs forces on the mouse 40 which the user is able to feel. The embodiment of FIG. 2 is intended to provide inertial forces rather than contact forces; contact forces are described with respect to FIG. 4. In some embodiments, two or more actuator assemblies can provide inertial forces or contact forces, or one actuator assembly can provide inertial forces, while a different actuator assembly can provide contact forces.

Mouse 40 includes a housing 50, a sensing system 52, and an actuator assembly 54. Housing 50 is shaped to fit the user's hand like a standard mouse while the user moves the mouse in the planar degrees of freedom and manipulates the buttons 16. Other housing shapes can be provided in many different embodiments.

Sensing system 52 detects the position of the mouse in its planar degrees of freedom, e.g. along the X and Y axes. In the described embodiment, sensing system 52 includes a standard mouse ball 54 for providing directional input to the computer system. Ball 45 is a sphere that extends partially out the bottom surface of the mouse and rolls in a direction corresponding to the motion of the mouse on a planar surface 22. For example, when the mouse 40 is moved in a direction indicated by arrow 56 (y direction), the ball rotates in place in a direction shown by arrow 58. The ball motion can be tracked by a cylindrical roller 60 which is coupled to a sensor 62 for detecting the motion of the mouse. A similar roller and sensor 28 can be used for the x-direction which is perpendicular to the y-axis.

Other types of mechanisms and/or electronics for detecting planar motion of the mouse 40 can be used in other embodiments. In some embodiments, high frequency tactile sensations can be applied by the actuator that cause a mouse ball 45 to slip with respect to the frictionally engaged rollers. This is problematic, causing the mouse to be less accurate because of the tactile sensations. To remedy this problem, a more preferred embodiment employs the actuator assembly 54 within an optical mouse that has no moving mouse ball component. A suitable optical mouse technology is made by Hewlett Packard of Palo Alto, Calif. and can be advantageously combined with the tactile sensation technologies described herein, where the optical sensor detects motion of the mouse relative to the planar support surface by optically taking and storing a number of images of the surface and comparing those images over time to determine if the mouse has moved. For example, the Intellimouse™ Explorer or Intellimouse™ with Intellieye™ mouse devices from Microsoft Corporation use this type of sensor. If a local microprocessor is employed (see FIG. 13), the control of the tactile element can be performed by the same local processor that controls the optical sensor technology, thereby reducing component costs (i.e., there is no need to have one processor for the optics and one processor for the tactile feedback). Alternatively, a portion of an optical sensor can be built into the surface 22 to detect the position of an emitter or transmitter in mouse 40 and thus detect the position of the mouse 40 on the surface 22.

Buttons 16 can be selected by the user as a "command gesture" when the user wishes to input a command signal to the host computer 14. The user pushes a button 16 down (in the degree of freedom of the button approximately along axis z) to provide a command to the computer. The command signal, when received by the host computer, can manipulate the graphical environment in a variety of ways. In one embodiment, an electrical lead can be made to contact a sensing lead as with any mechanical switch to determine a simple on or off state of the button. An optical switch or other type of digital sensor can alternatively be provided to detect a button press. In a different continuous-range button embodiment, a sensor can be used to detect the precise position of the button 16 in its range of motion (degree of freedom). In some embodiments, one or more of the buttons 16 can be provided with force feedback (in addition to the inertial tactile feedback from actuator 18), as described in U.S. Pat. No. 6,243,078.

Mouse 40 includes an actuator assembly 54, and the actuator assembly includes an actuator 66, a flexure mechanism ("flexure") 68, and an inertial mass 70 coupled to the actuator 66 by the flexure 68. In one preferred embodiment, the actuator 66 acts as an inertial mass, so that a separate inertial mass 70 is not required; this is described below. The inertial mass 70 is moved in a linear direction by the actuator 66, preferably approximately in the z-axis 51 which is approximately perpendicular the planar workspace of the mouse in the x- and y-axes, e.g. the mouse's position or motion is sensed in the x-y plane. The actuator is coupled to the housing 50 of the mouse such that inertial forces caused by the motion of the inertial mass are applied to the housing of the mouse with respect to the inertial mass, thereby conveying haptic feedback such as tactile sensations to the user of the mouse who is contacting the housing. Thus, the actuator 66 need not directly output forces to the user or to a user-manipulatable object, but instead the moving mass creates an inertial force that is indirectly transmitted to the user.

Using an inertial mass as the grounding reference for tactile sensation generation on an cursor control interface has numerous limitations. First and foremost, the magnitude of forces that can be output with respect to an inertial ground are not as high as can be output with respect to an earth ground. Of course, the larger the inertial mass, the larger the forces that can be output, so the theoretical limit of force magnitude is very high. However, for practical reasons, very large masses cannot typically be used within a mouse device as the inertial ground, since large masses make the mouse device too heavy and large masses may not fit in smaller mouse housings. Thus, the amount of force output that can be practically applied is limited.

Because large forces can not be applied through an inertial ground, it is desirable to compensate by using a high bandwidth actuator, i.e., an actuator that can output abrupt changes in force magnitude level. Since the human hand is more sensitive to changes in force level than to absolute force levels, a high bandwidth actuator used to convey low level forces produced with respect to an inertial ground can be quite effective in producing compelling haptic sensations.

The preferred embodiment creates inertial forces that are directed substantially in a single particular degree of freedom, i.e. along a particular axis. In most embodiments, crisp haptic sensations cannot typically be achieved using a continuously rotating eccentric mass, which provides an undirected inertial force in a rotating plane and creates a generalized wobble on the device. Therefore, a linear inertial force is desirable. It is important to consider the direction or degree of freedom that the linear force is applied on the housing of the mouse device with respect to the inertial mass. If a significant component of the force is applied along one or more of the moveable planar degrees of freedom of the mouse (i.e., the x or y axis) with respect to the inertial mass, the short pulse can jar the mouse in one or both of those planar degrees of freedom and thereby impair the user's ability to accurately guide a controlled graphical object, such as a cursor, to a given target. Since a primary function of a mouse is accurate targeting, a tactile sensation that distorts or impairs targeting, even mildly, is usually undesirable. To solve this problem, the mouse device of the present invention applies inertial forces substantially along the z axis, orthogonal to the planar x and y axes of the mouse controller. In such a novel configuration, tactile sensations can be applied at a perceptually strong level for the user without impairing the ability to accurately position a user controlled graphical object in the x and y axes. Furthermore, since the tactile sensations are directed in a third degree of freedom relative to the two-dimensional mouse planar workspace and display screen, jolts or pulses output along the z axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border.

Alternatively, directed inertial forces can be output along the X and Y axes in the planar workspace of the device and can be compensated for to prevent or reduce interference with the user's control of the device. One method to compensate is to actively filter imparted jitter in that workspace, as disclosed in U.S. Pat. No. 6,020,876, incorporated herein by reference; however, this implementation may add complexity and cost to the mouse device.

One way to direct an inertial force is to directly output a linear force, e.g., a linear moving voice coil actuator or a linear moving-magnet actuator can be used, which are suitable for high bandwidth actuation. These embodiments are described in greater detail in U.S. Pat. No. 6,211,861 and which is incorporated herein by reference. These embodiments allow for high fidelity control of force sensations in both the frequency and magnitude domains, and also allow the forces to be directed along a desired axis and allows for crisp tactile sensations that can be independently modulated in magnitude and frequency.

One aspect of the present invention is directed toward providing linear output forces using a rotary actuator, i.e. an actuator outputting a rotary force (torque). In the current actuator market, rotary actuators such as rotary DC motors are among the most inexpensive types of actuators that still allow high bandwidth operation (when driven with signals through, for example, an H-bridge type amplifier). These types of motors can also be made very small and output high magnitude forces for their size. Actuator 66 is therefore preferably a DC motor, but can be other types of rotary actuators in other embodiments. For example, a moving magnet actuator can be used instead of a DC motor; such an actuator is described in detail in copending patent application Ser. No. 60/133,208, incorporated herein by reference. Other types of actuators can also be used, such as a stepper motor controlled with pulse width modulation of an applied voltage, a pneumatic/hydraulic actuator, a torquer (motor with limited angular range), shape memory alloy material (wire, plate, etc.), a piezo-electric actuator, etc.

The present invention makes use of low cost flexure as a mechanical transmission to convert a rotary actuator force to a linear force that is used to move the inertial mass, and to also amplify the forces to allow more compelling haptic sensations. Various embodiments of the flexure 68 are described in greater detail below with reference to FIGS. 3a–12b.

In the described embodiment of FIG. 2, actuator assembly 54 has a stationary portion which is coupled to a part of the housing 50 (and thus stationary only with respect to the portion of the mouse housing to which it is coupled). The rotating shaft of the actuator is coupled to the moving portion of the assembly that includes the inertial mass 70 (or the actuator as the inertial mass) and at least part of the flexure 68, where the inertial mass moves linearly approximately along the Z-axis. The actuator 66 is operative to oscillate the inertial mass 70 (or itself in some embodiments) quickly along the axis C which is approximately parallel to the Z axis. Thus, forces produced by the inertial mass are transmitted to the housing through the actuator and felt by the user. These forces are substantially directed along the Z axis and therefore do not substantially interfere with motion of the mouse along the X and Y axes.

The actuator assembly 54 can be placed in a variety of positions within the mouse housing. For example, one preferred embodiment places the actuator assembly on the bottom portion of the housing, as close to the center of the mouse along both the X and Y axes as possible to reduce a wobble effect on the mouse when the actuator is active. In other embodiments, the actuator assembly 54 can be positioned centered along one axis but off-center along the other axis to accommodate other electronic and mechanical components in the mouse, e.g. near the front or back of the mouse. In yet other embodiments, the actuator assembly 54 can be connected to a side or top portion of the housing 50 rather than the bottom portion 67, although it is preferred that the actuator be oriented to output forces approximately along the Z-axis (and thus the top or bottom may be preferable to the sides). A variety of tactile sensations can be output to the user, many of which are described in greater detail below with respect to FIG. 14.

An additional challenge of applying a compelling tactile sensation to the mouse housing along the described Z axis is that the mouse sits upon a table or other surface 22 and is therefore physically grounded along that Z axis. In other words, the forces applied by the actuator assembly 54 along the Z axis, with respect to the inertial mass, are countered by the normal forces applied by the table surface upon the mouse housing. One way to accommodate these countering forces is to use a flexible or semi-flexible surface between the mouse and the ground surface, such as a standard mouse pad. This type of flexible surface increases the transmissibility of the inertial forces from the actuator to the housing. For example, the mouse pad adds additional compliance and damping to the second order harmonic system, allowing output forces to be magnified if the output force vibrations or pulses are within the magnifying frequency range of the system, as described below with reference to FIG. 3c. Most mouse pads add a compliance and damping between the mouse and a hard surface such as a tabletop that allows magnification of the inertial forces; in some embodiments, particular mouse pads can be provided which have a compliance tuned to amplify forces to a desired extent. Alternate embodiments include coupling the stationary portion of the actuator 66 to a portion of the housing 50 that is different from the base or bottom portion 68 of the housing (e.g. the side of the housing), and providing an amount of flex between the actuator-coupled portion of the mouse housing and the base portion 68 that is in contact with the surface 22. For example, flexible hinges or connecting members can couple the two portions. This too improves the transmissibility of the tactile sensations, and can also be used in conjunction with a mouse pad for still better force transmissibility. Compliance adding to the magnitude of tactile sensations is described in copending provisional application No. 60/157,206, incorporated herein by reference.

In addition, the haptic sensation output can be of varying quality depending on the direction of motion of the inertial mass (either a separate inertial mass or the actuator as the mass). For example, the inertial mass preferably is provided in an origin position when at rest, where a spring compliance biases the mass toward the origin position. In some embodiments, the origin position of the inertial mass may not be in the center of the range of motion of the mass, so that a greater distance exists from the origin position to a range limit on one side of the origin position than on the other side. Furthermore, even if the mass is centered in its range at the origin position when the actuator assembly is initially manufactured, the origin position may shift over time due to use, e.g. if a flexure is used, one or more flex joints may become less rigid over time to allow the mass to sag slightly due to gravity, thus causing the origin position to change to a non-centered position. In such cases, an initial greater magnitude haptic sensation can be obtained in many embodiments by first moving the mass in the direction having the greater distance from origin to range limit. The greater distance allows the mass to achieve a higher velocity and thus a higher momentum, so that when the mass changes direction at the range limit, a greater change in momentum is achieved and thus a greater force is output. This provides an initial pulse (from a rest state) having greater magnitude to the user than if the inertial mass were initially driven in the direction having less distance. To ensure such greater magnitude forces, the actuator 66 driving the mass can be set to the appropriate polarity to always initially drive the mass in the direction having greater range, e.g. in many embodiments, this is the "up" direction against gravity.

Figure 3A:
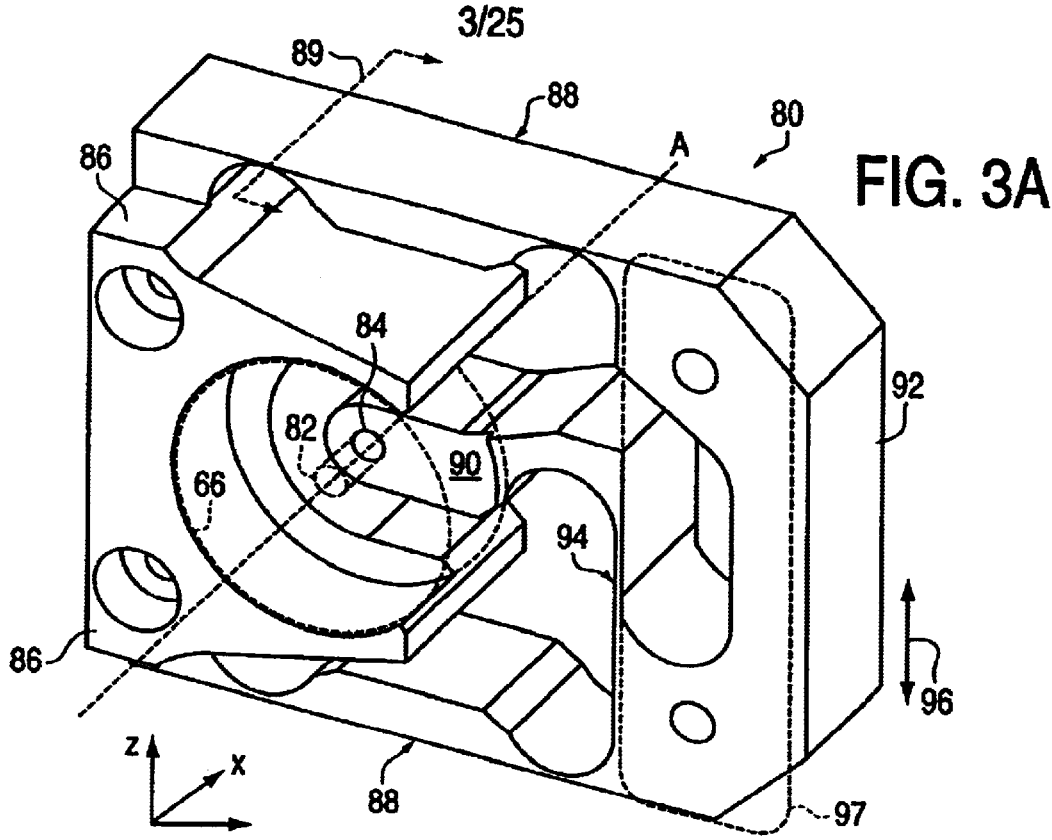
FIGS. 3a and 3b are perspective and side elevational views, respectively, of one embodiment of an actuator assembly suitable for use with the present invention.
Figure 3B:
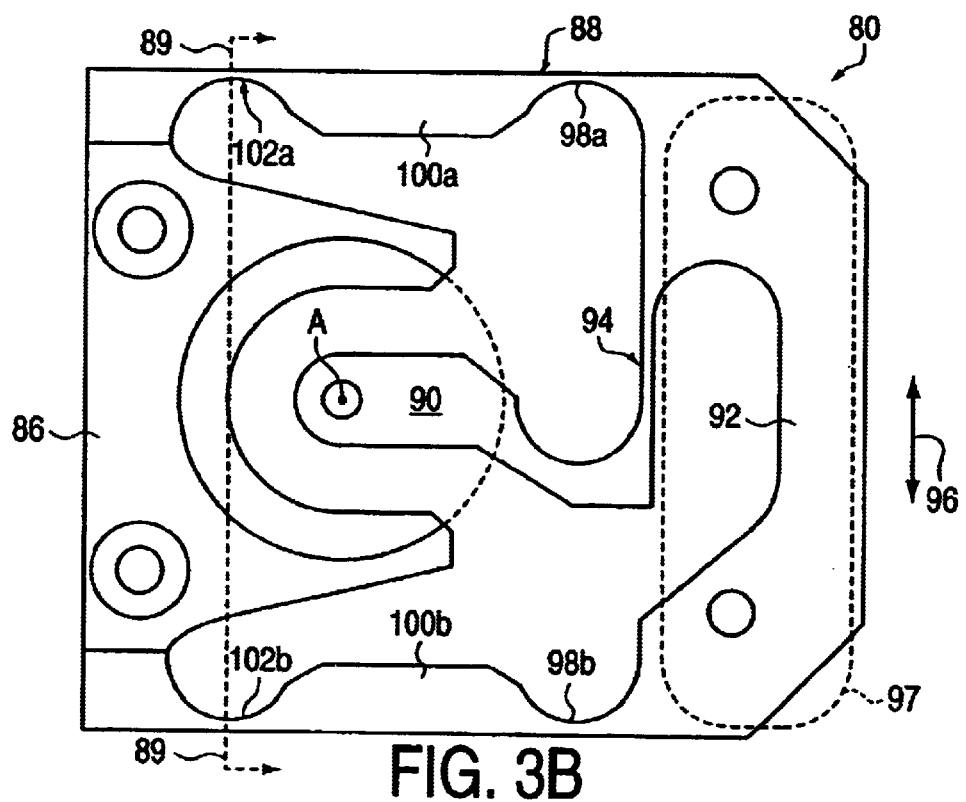

FIGS. 3a and 3b are perspective and side elevational views of a first embodiment 80 of a flexure 68 of the present invention for use in the actuator assembly 54. The flexure is preferably a single, unitary piece made of a material such as polypropylene plastic ("living hinge" material) or other flexible material. This type of material is durable and allows flexibility of the flex joints (hinges) in the flexure when one of the dimensions of the joint is made small, but is also rigid in the other dimensions, allowing structural integrity as well as flexibility depending on thickness. Some embodiments of flexures used in force feedback devices are described in U.S. Pat. No. 5,805,140 and patent application Ser. No. 09/376,649, both incorporated herein by reference.

Actuator 66 is shown coupled to the flexure 80, where the actuator is shown in dotted lines. The housing of the actuator is coupled to a grounded portion 86 of the flexure 80. The grounded portion 86 can be coupled to the housing 50 of the mouse 40, such as the side or bottom of the housing 50. In the shown configuration, the portion 88 (the portion to the right of the arrow 89) of the flexure should not be coupled to ground since it moves to provide an approximately linear motion, as explained below.

A rotating shaft 82 of the actuator is coupled to the flexure 80 in a bore 84 of the flexure 80 and is rigidly coupled to a central rotating member 90. The rotating shaft 82 of the actuator is rotated about an axis A which also rotates member 90 about axis A. Rotating member 90 is coupled to a linear moving portion 92 by a flex joint 94. The flex joint 94 preferably is made very thin in the dimension it is to flex, i.e. one of the x- or y-axis dimensions (the y-axis dimension as shown in FIG. 3a; it can also be made thin in the x-axis dimension) so that the flex joint 94 will bend when the moving portion 88 is moved with respect to the grounded portion 86. The linear moving portion 92 moves linearly along the z-axis as shown by arrow 96. In actuality, the linear moving portion 92 moves only approximately linearly since it has a small arc to its travel, but the arc is small enough to be ignored for force output purposes. The linear moving portion 92 is coupled to the grounded portion 86 of the flexure 80 by flex joints 98a and 98b. Preferably, one end of intermediate members 100a and 100b are coupled to the flex joints 98a and 98b, respectively, and the other ends of the intermediate members are coupled to another flex joint 102a and 102b, respectively. The flex joints 102a and 102b are coupled to the grounded portion 86. Like flex joint 94, the flex joint 98a, 98b, 102a and 102b are thin in one of the x-y dimensions (the other x-y dimension than the dimension in which the flex joint 94 is thin) to allow motion between the two members connected by each flex joint. Thus, the flex joints 102 and 98 on each member 100 combine to bend like a letter "S," allowing the linear motion of member 92.

In some embodiments, the linear moving member 92 of the flexure is of sufficient mass to act as the inertial mass 70 of the actuator assembly. The member 92 can be driven up and down on the z-axis to create inertial forces. In other embodiments, an additional mass, shown as dotted outline 97, can be coupled to the linearly moving member 92. For example, the mass 97 can be a piece of metal (iron, etc.) or other material having a large mass or weight. A larger mass 97 will cause forces with greater magnitude to be felt by the user of the mouse 40.

Figure 3C:
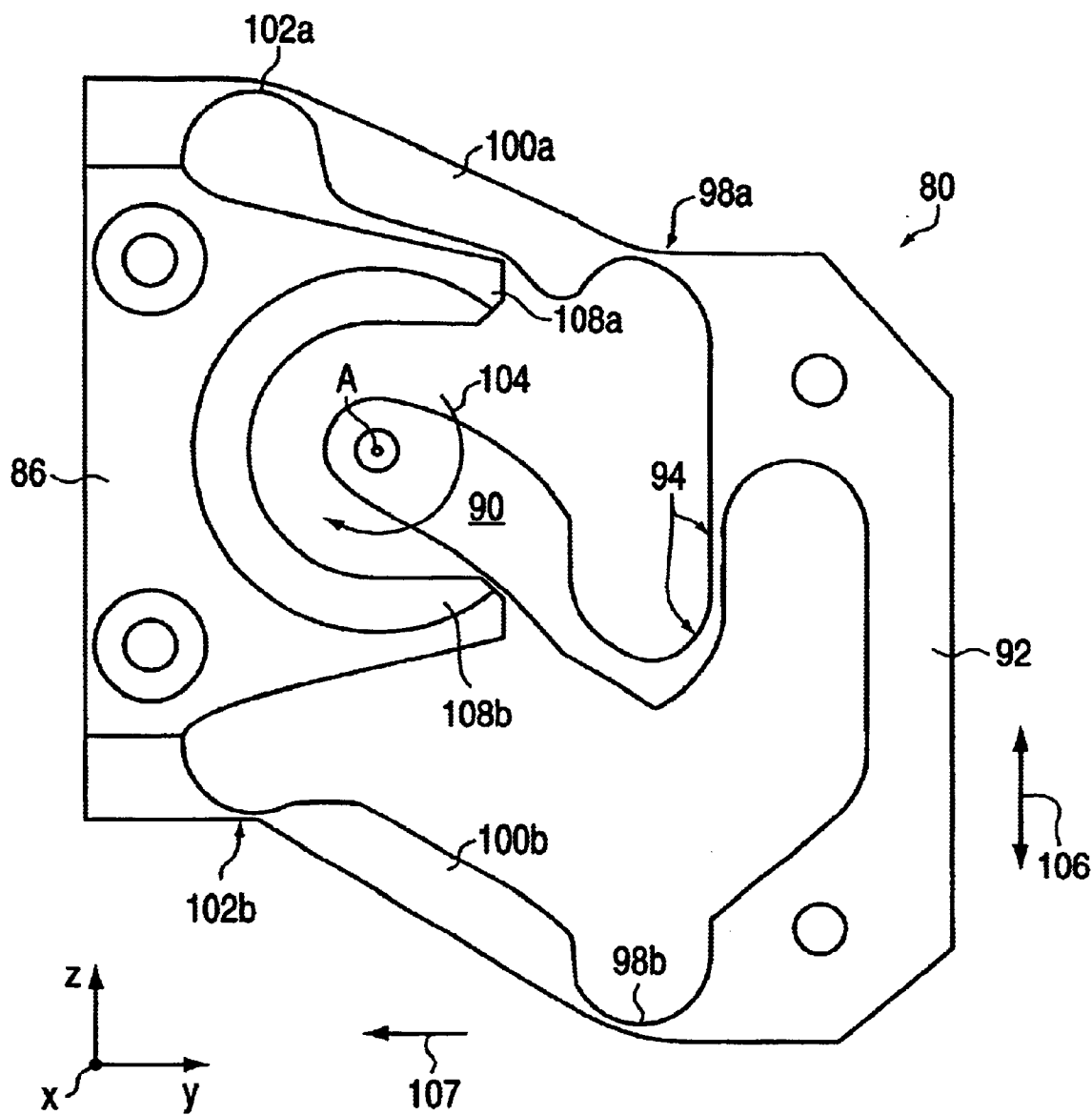
FIG. 3c is a side elevational view of the actuator assembly of FIGS. 3a and 3b in a flexed position.

An example of the motion allowed by flexure 80 is shown in FIG. 3c. In this example, the actuator 66 has caused rotation in the clockwise direction as shown by arrow 104. The rotation of the actuator shaft causes the rotating member 90 to rotate clockwise, which causes the linear moving member 92 to move approximately linearly in the direction 106. The flex joint 94 pulls the linear moving member 92 in this direction, and also flexes to allow the rotational motion to become linear motion. Flex joint 94 is important in that it allows moving member 92 to move slightly in the y-direction as shown by arrow 107 as the member 92 is moved in the z-direction; without such y-direction compliance, the member 92 could not move in the z-direction to any significant extent. Furthermore, the flex joints 102a and 102b flex with respect to the grounded portion 86, and the flex joints 98a and 98b also flex with respect to their connected members to allow the linear motion of the member 92 with respect to the portion 86. The arm length of member 90 is preferably shorter than the lengths of members 100a and 100b to allow greater force output; however, the member 90 length can be increased to allow greater displacement of member 92 at the cost of less force output.

The flexure 80 also preferably includes two stops 108a and 108b which are positioned surrounding the rotating member 90. In FIG. 3c, the rotating member 90 has impacted stop 108b, which prevents further rotation in that direction and also limits the linear motion of the member 92. Stop 108a similarly limits motion in the counterclockwise direction. In some configurations, the member 100a impacts the stop 108a and acts as the stopping member rather than or in addition to member 90 acting as the stopping member, and member 100b impacts the stop 108b in the other direction. The stops can be extended to different positions in different embodiments to allow a desired linear range of member 92. In some embodiments, the stops 108 can be provided with some compliance to improve the "feel" of an impact with the stop as experienced by the user; for example, a harsh "clacking" impact can be softened at maximum amplitude output of the actuator. With the stops acting as shown, the actuator 66 is operated in only a fraction of its rotational range, i.e. the actuator is driven in two directions and drives the member 90 back and forth, and the actuator shaft never makes a full revolution. This is intended operation of the actuator, since it allows high bandwidth operation and higher frequencies of pulses or vibrations to be output.

The flexure 80 is advantageous in the present invention because it has an extremely low cost and ease of manufacturability, yet allows high-bandwidth forces to be transmitted as inertial forces. Since the flexure 80 is a unitary member, it can be manufactured from a single mold (or a small number of molds), eliminating significant assembly time and cost. Furthermore, it is rigid enough to provide strong vibrations with respect to the mouse housing and to provide significant durability. In addition, the flexure provides close to zero backlash and does not wear out substantially over time, providing a long life to the product.

In addition, the flex joints included in flexure 80 act as spring members on the linear moving member 92 to provide a restoring force toward the rest position (origin position) of the flexure (shown in FIG. 3b). For example, the flex joints 102a and 98a sum to provide a first spring constant (k) for the member 92, the flex joints 102b and 98b sum to provide a second spring constant (k) for the member 92, and the flex joint 94 provides a third spring constant for the moving member 92. Having a spring-biased center position for the moving member is essential for providing linear harmonic operation which will faithfully reproduce an input control signal, and which is more desirable than nonlinear operation. With this spring compliance in the system included between the moveable member and the housing of the mouse, a second order harmonic system is created. This system can be tuned so that amplification of forces output by the actuator is performed at a efficient level, e.g. near the natural frequency of the system. Tuning such a harmonic system using an inertial force actuator and compliant suspension of a moving mass is described in greater detail in copending provisional patent application No. 60/157,206, which is incorporated herein by reference. A system providing contact forces, as described with reference to FIG. 4, can also be so tuned. For example, in the flexure 80, the spring constants can be tuned by adjusting the thickness of the flex joints 102a and 102b, 98a and 98b, and/or 94 (in the dimension in which they are thin). In some embodiments, additional springs can be added to provide additional centering force if desired, e.g. mechanical springs such as leaf springs.

Figure 3D:
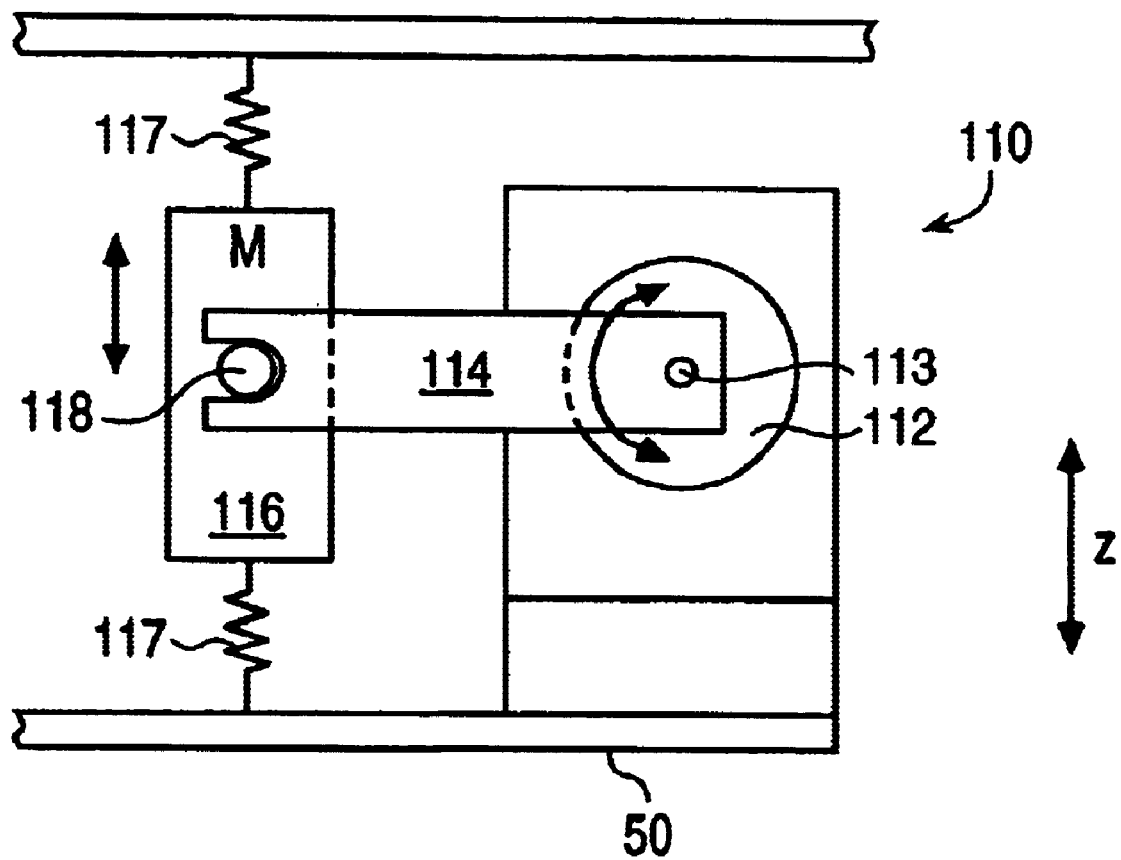
FIG. 3d is a side elevational view of a second embodiment of the actuator assembly of the present invention providing a moving inertial mass.

FIG. 3d is a side elevational view of a different embodiment 110 of the inertial actuator assembly 54 of FIG. 2. In this embodiment, a flexure is not used to couple the inertial mass to the actuator; instead, a rigid connection is used. An actuator 112 is grounded to the housing 50 of the interface device and includes a rotating shaft 113 that is rigidly coupled to an arm member 114. An inertial mass 116 is coupled to the housing 50 by two spring elements 117 which provide a centering, restoring force on the mass 116; the spring elements can be implemented as leaf springs, helical springs, flex joints, etc. The arm member 114 is slidably engaged with a boss 118 that is coupled to the mass 116.

When actuator shaft 113 is rotated, the arm member 114 is also rotated and causes the mass 116 to linearly move up or down along the z-axis. This linear motion is allowed by the arm member 114 sliding with respect to the boss 118 and the mass 116 as the arm member is rotated. The linear motion is also allowed by compliance in the spring elements 117 in the x-y plane. This embodiment is less durable and provides more backlash than the previous embodiments due to sliding friction between the member 114 and boss 118.

Figure 4:
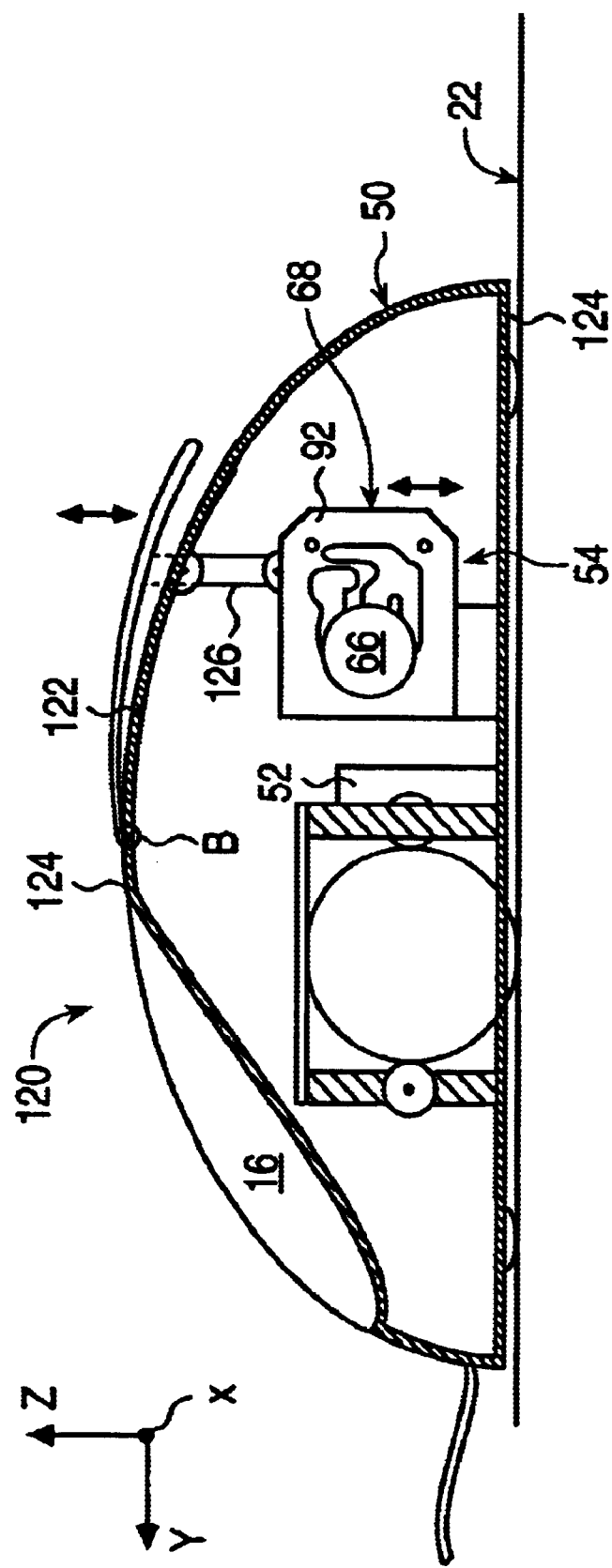
FIG. 4 is a side cross sectional view of the mouse interface device of FIG. 2 that additionally provides contact forces to the user.

FIG. 4 is a side elevational view of a second embodiment 120 of a mouse device using the flexure 80 shown in FIGS. 3a–3c. In FIG. 4, the linear motion provided by the actuator assembly 54 (including flexure 80) is used to drive a portion of the housing (or other member) that is in direct contact with the user's hand (finger, palm, etc.)

The mouse 120 includes a sensing system 52 and buttons 16 similar to those described for the mouse 40 of FIG. 2. The actuator assembly 54 includes an actuator 66, flexure 68 (such as flexure 80), and inertial mass also similar to the embodiment 40 of FIG. 2 (except that the actuator and flexure of FIG. 4 are shown rotated approximately 90 degrees with respect to FIG. 2).

Mouse 120 includes a moving cover portion 122 which can be part of the housing 50. Cover portion 122 is coupled to the base portion 124 of the housing 50 by a hinge allowing their respective motion, such as a mechanical hinge, a flexure, rubber bellows, or other type of hinge. Cover portion 122 may thus rotate about an axis B of the hinge with respect to the base portion. In other embodiments, the hinge can allow linear or sliding motion rather than rotary motion between cover and base portions. In the embodiment shown, the cover portion 122 extends in the y-direction from about the mid-point of the mouse housing to near the back end of the mouse. In other embodiments, the cover portion 122 can cover larger or smaller areas; for example, the cover portion 122 can be the entire top surface of the mouse housing, can include the sides of the mouse housing or be positioned only at the side portions, etc. Various embodiments of such a moveable cover portion are described in U.S. Pat. No. 6,243,078, incorporated herein by reference.

The cover portion 122 is rotatably coupled to a link 126, and the link 126 is rotatably coupled at its other end to the linear moving portion 92 of the flexure 80 (see FIGS. 3a–3c). Thus, as the member 92 of the flexure 80 is moved along the z-axis, this motion is transmitted to the cover portion 122 through the link 126, where the rotational couplings of the link allow the cover portion 122 to move about axis B of the hinge with respect to the base portion 124. The actuator 66 can drive the member 92 up on the z-axis, which causes the cover portion 122 to move up to, for example, the dashed position shown. In some embodiments, the cover portion can also be moved down from a rest position, where the rest position can be provided in the middle of the range of motion of the cover portion 122. For example, the inherent spring of the flexure 80 can bias the cover portion to such a middle rest position, and/or other mechanical springs can be added to perform this function.

Figure 6:
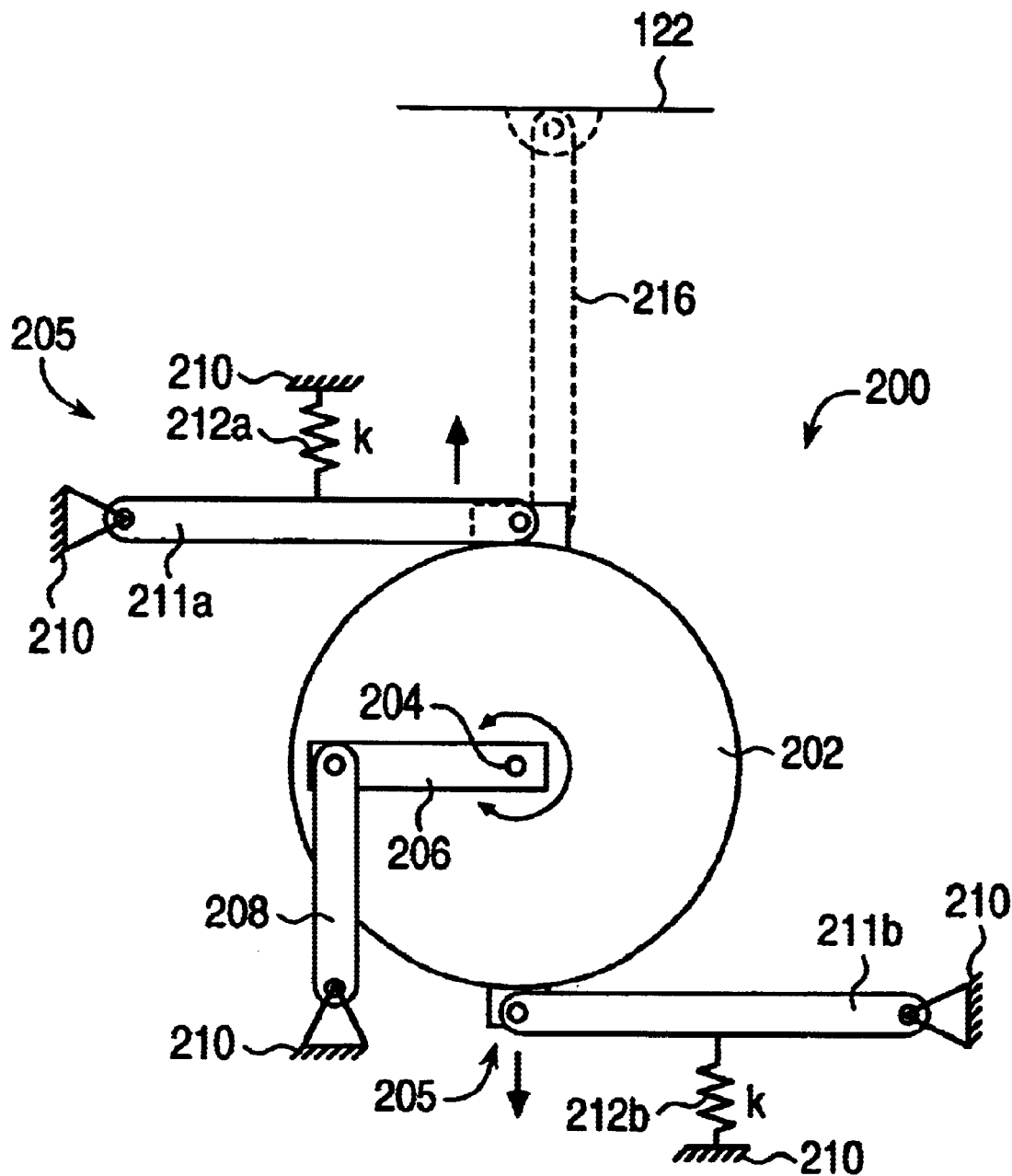
FIG. 6 is a schematic diagram of a fourth embodiment of the actuator assembly of the present invention in which the actuator is moved as an inertial mass.

The user feels the force of the cover portion against his or her hand (such as the palm) as a contact force (as opposed to an inertial force). When the cover portion is oscillated, the user can feel a vibration-like force. The cover portion can also be used to designate 3-D elevations in a graphical environment. In some embodiments, the configuration described can inherently provide an inertial force as well as the contact force if an inertial mass is moved as described above in addition to the contact portion. In other embodiments, a different "contact member" (e.g. a member that is physically contacted by the user) can be moved instead of the cover portion 122 but in a similar fashion, such as mouse buttons 16 or other buttons, tabs, mouse wheels, or dials. Furthermore, in some embodiments multiple actuator assemblies 54 can be used to drive a cover portion and one or more buttons or other controls of the mouse 120. Furthermore, in some embodiments, one actuator assembly 54 can be used to move a cover portion 122 or other member, and a different actuator assembly can be used to provide an inertial force as in the embodiment 40 of FIG. 2, where the inertial and contact forces can operate in conjunction if desired. Only one actuator assembly 54 need be used to provide both inertial and contact forces if the embodiment of FIG. 6 is used, described below.

Figure 5A:
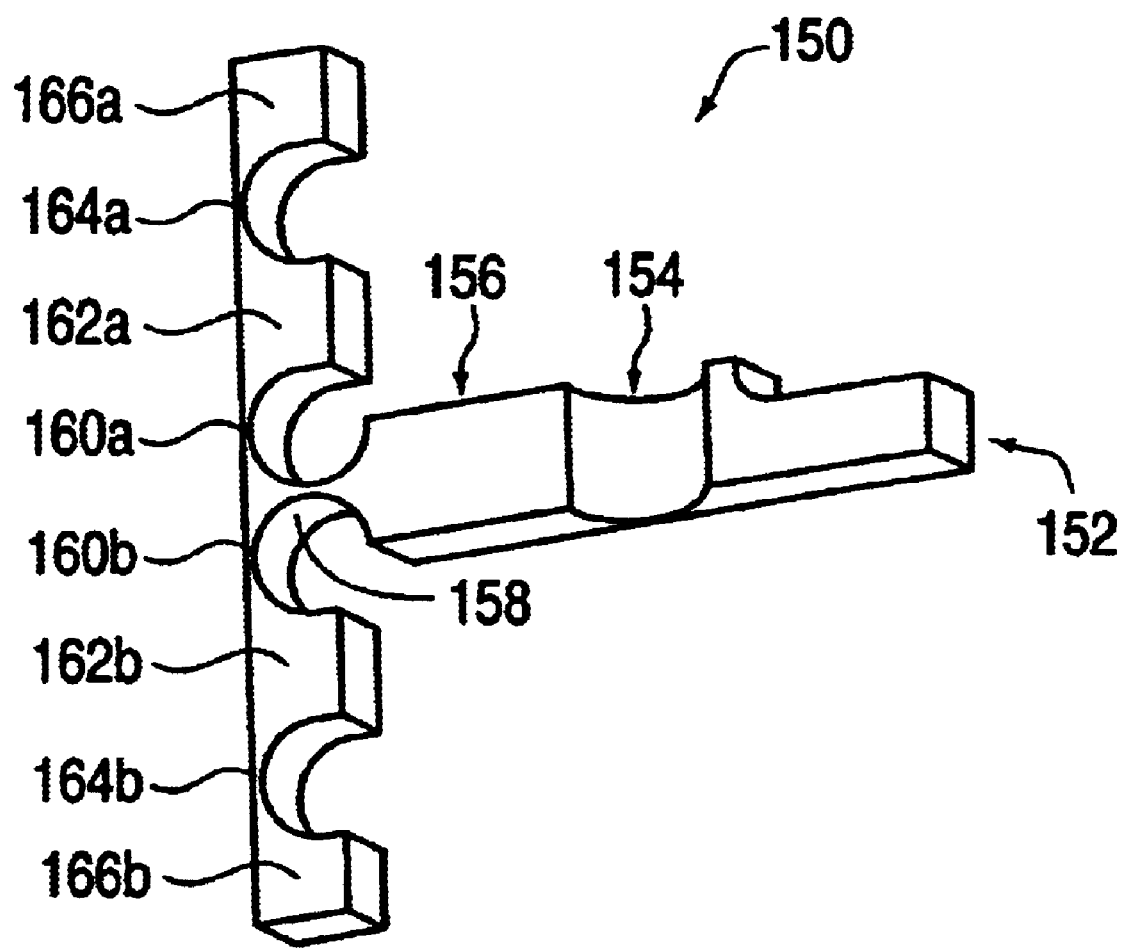
FIGS. 5a–5c are perspective views of a third embodiment of the actuator assembly of the present invention.
Figure 5B:
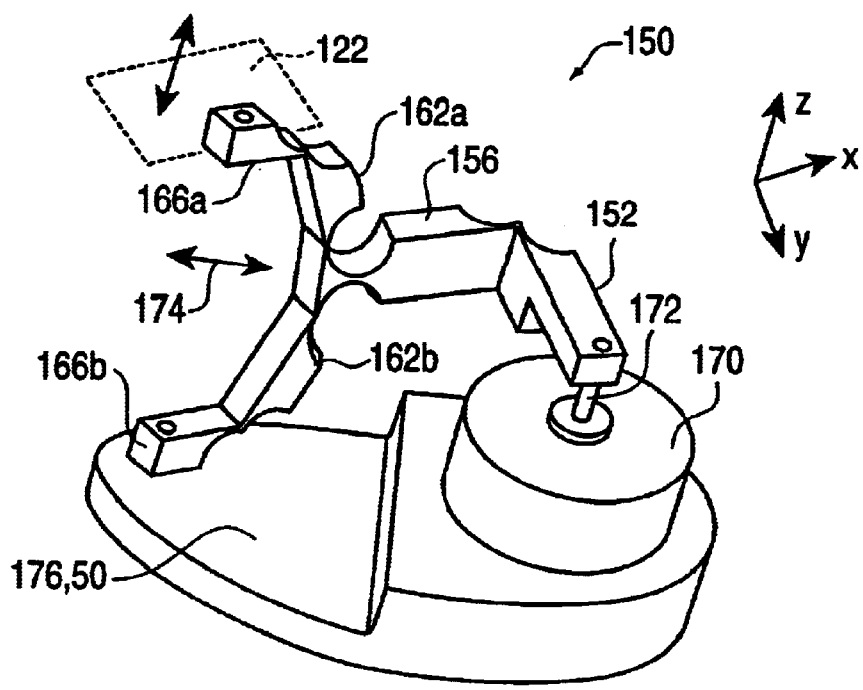
Figure 5C:
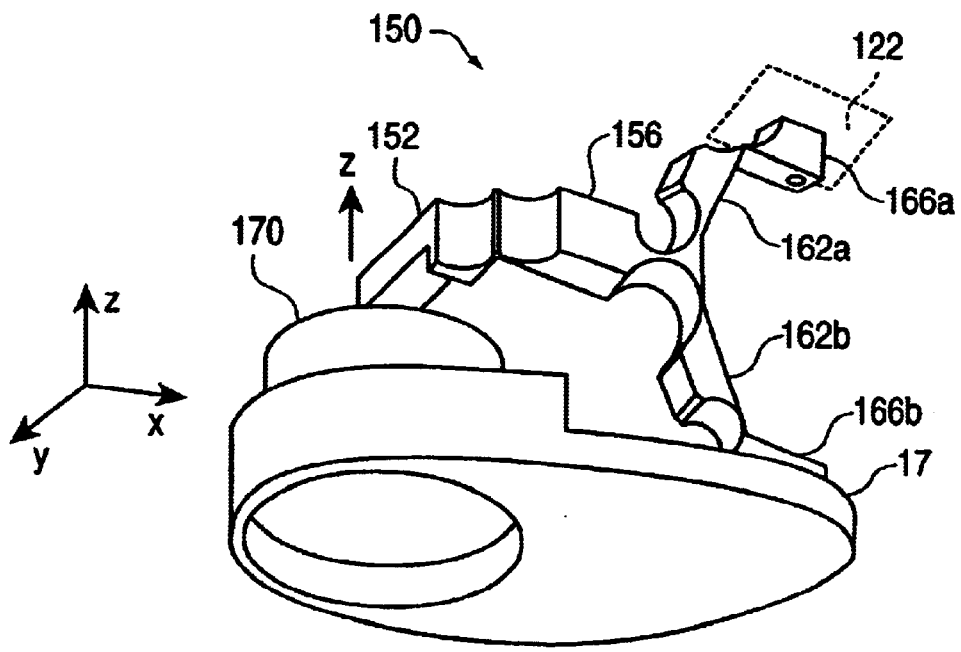

FIGS. 5a, 5b, and 5c are perspective views illustrating another embodiment 150 of the flexure 68 which can be used in mouse 120 to drive a cover portion 122, button 16, or other member in a direction approximately parallel to the z-axis. FIG. 5a illustrates the flexure 150 in an unflexed position. The flexure 150 is preferably manufactured as a single unitary piece as shown, thereby reducing production costs. The flexure 150 includes an actuator end 152 which is coupled to a rotary actuator. A flex joint 154 connects the actuator end 152 to a central member 156. Member 156 is connected at its other end to central flex joint 158, and the central flex joint 158 is coupled to a small central piece 159. Piece 159 is coupled to two flex joints 160a and 160b which are oriented approximately perpendicularly to the joint 158. Arm members 162a and 162b are coupled to the flex joints 160a and 160b, respectively, and flex joints 160a and 160b are coupled to the other ends of the arm members 162a and 162b. Finally, end members 166a and 166b are coupled to the other ends of the flex joints 164a and 164b, respectively.

In its intended operation, the flexure 150 is connected between three different points in the mouse 120. The actuator end 152 is rigidly coupled to a rotating actuator shaft. The end member 166b is coupled to the base portion or other surface of the housing 50 of the mouse, and the end member 166a is coupled to the moveable cover portion 122 or other moving member. The configuration of the flexure 150 is such that forces output by the actuator are magnified several times as they are transmitted through the end member 166a to the moveable cover portion or other member.

FIGS. 5b and 5c illustrate the use of flexure 150. An actuator 170 is oriented so that its shaft 172 rotates about an axis that is approximately parallel to the z-axis, i.e. the actuator shaft rotates in an x-y plane. The shaft 172 rotates actuator end 152 in a direct drive configuration, which causes central member 156 to move in the x-y plane, approximately linearly as shown by arrow 174. As in the flexure 80, the actuator 170 is operated in only a fraction of its rotational range when driving the central member 156 in two directions. End member 166b is coupled to the base surface 176 (e.g., housing 50) and is oriented approximately in the x-y plane, providing an anchor point for the flexure. The end member 166b can be rigidly coupled to the base surface 176, where the flex joints of the system provide the flex to allow the desired motion; or, the end member 166b can be rotatably coupled to the base surface 176 to allow additional ease of motion. The other end member 166a is also oriented approximately in the x-y plane and is driven approximately along the z-axis as the central member is moved due to the flexure configuration. The member 166a is preferably connected to a cover portion 122 as shown in FIG. 4, or a button or other moveable member. When in its rest position, the flexure 150 is approximately in a "Y" configuration as shown, with the end 152 and central member 156 as the base, and members 162 and 166 as the prongs or branch members of the "Y."

The flexure 150 is one form of a living hinge linkage, and allows for amplification of forces output on member 166a. For example, in a simulation it was found that 1 N of force provided by the actuator 170 at the central member 156 caused from 3 to 8 N output force on member 166a. The actual force output depends on the angle of the opposing links 162a and 162b with respect to the vertical z-axis; as the angle gets smaller due to the actuator moving the central member 156, a greater amount of force is output. Such force magnification allows a low-cost actuator 170 having small magnitude output, such as a pager motor, to be used to provide higher magnitude contact forces. One problem with the flexure 150 is that it tends to have nonlinear force vs. displacement characteristics, which may distort periodic forces at higher frequencies. However, it may be possible to use this variable mechanical advantage to control stiffness when representing such force effects as hard surfaces. The flexure 150 also has the same advantages as flexure 80 in ease of manufacturing and assembly as well as inherent spring restoring force and natural frequency tuning ability for force amplification.

The flexure 150 can also be used in an inertial force embodiment as described above with reference to FIG. 2. For example, the member 166a can be coupled to an inertial mass rather than being connected to a contact member such as cover portion 122. The inertial mass is moved linearly along the z-axis and thus provides inertial z-axis forces. It should be noted that the member 166a can provide both inertial and contact forces by maintaining the coupling of member 166a to the contact member 122 and adding an inertial mass to the member 166a.

Furthermore, the flexure 150 can also be used in an embodiment having the actuator used as an inertial mass. One such embodiment is described in detail below with reference to FIG. 6, including the advantages in cost and assembly. The flexure 150 can be used to move the actuator 170 as the inertial mass so that no additional inertial mass need be added. In one embodiment, the member 166a can be rigidly (or rotatably, if desired) coupled to a stationary part of the housing 50 instead of a moveable contact member. The entire base portion 176 (as well as flexure 150 and actuator 170 on the base portion 176) can be made moveable in the z-axis, so that when the actuator 170 outputs a rotational force, the amplified linear force output by the flexure 150 causes the base portion 176 to move in a z-direction instead of the member 166a. The base 176 is preferably mechanically constrained to a z-axis direction, since it may move within the x-y plane unless constrained. For example, the base 176 can be made cylindrical, and cylindrical walls or housing can surround the base 176 to allow it to move along the z-axis but not in the x-y plane. This embodiment is advantageous in that the actuator 170 rotates about the z-axis in the x-y plane, allowing the actuator to be positioned in a more low-profile position for compactness (if the flexure 150 is reduced in height as well). Other advantages of an embodiment having the actuator acting as the inertial mass are described below with reference to FIG. 6, and apply to the flexure 150 as well.

FIG. 6 is a schematic view of a different embodiment 200 of the actuator assembly 54 of the present invention for use in a haptic feedback mouse 40 or 120. Actuator assembly 200 is a preferred embodiment due to its low cost, ease of manufacturability, and quality of performance. A main difference of the embodiment 200 from previous embodiments is the use of an ungrounded actuator as the inertial mass in the actuator assembly. The assembly 200 can be positioned within the housing 50 of a mouse.

In assembly 200, a rotary actuator 202 is provided having a rotating shaft 204. A mechanical transmission 205 couples the actuator 202 to ground, e.g. the housing of the actuator is coupled to the housing 50 of the interface device 12 by the transmission mechanism 205. A rotating member 206 is coupled to the shaft 204 and is in turn rotatably coupled at its other end to a member 208. Member 208 is rotatably coupled at its other end to a ground 210, such as the mouse housing 50. Actuator 202 is also rotatably coupled at one end of its housing to an arm member 211a, and is rotatably coupled at another end of its housing to an arm member 211b. Each of the members 211a and 211b is rotatably coupled to a ground 210, such as the housing 50.

Actuator assembly 200 operates such that the rotation of the actuator shaft causes the actuator 202 (including both actuator housing and shaft 204) to move approximately along a single axis, such as the z axis (or different axes in other embodiments). The actuator shaft 204 is rotated, for example clockwise, which causes the member 206 to move clockwise. This causes an upward force to be exerted on the member 208; however, since member 208 is grounded, the upward force is instead converted to a downward force on the actuator 202. The actuator 202 is free to move downward due to the rotary couplings to the members 211a and 211b, and also due to the rotary couplings of the members 211a, 211b, and 208 to ground 210. When the actuator shaft 204 is rotated counterclockwise, a similar result occurs, where the actuator 202 is moved upward.

Thus, the rotation of the actuator shaft 204 can be controlled to control the motion of the actuator itself in a linear degree of freedom. If the actuator shaft is controlled to oscillate, the actuator acts as an inertial mass along the z-axis, providing haptic feedback in that degree of freedom. This embodiment thus saves the cost of providing a separate inertial mass and saves space and total weight in the device, which are important considerations in the home consumer market. The actuator 202 can any of a wide variety of rotary actuators, such as a DC motor, moving magnet actuator, rotary voice coil actuator, etc.

The essential elements of the schematic embodiment shown in FIG. 6 can be implemented with a wide variety of components. For example, the members can be rotatably coupled using mechanical couplings such as bearings, pin joints, etc. In other embodiments, the couplings can be implemented as flex joints, which is the preferred embodiment as described below with reference to FIGS. 7a–7f. In other embodiments, some of the couplings in the assembly can be implemented with mechanical bearings, while other couplings in that assembly can be flex joints. The actuator 202 rotates shaft 204 about an x or a y-axis and within a x-z plane or y-z plane; the actuator can alternatively be positioned so that the shaft is rotated about the z-axis and rotation occurs in the x-y plane, as described above with reference to FIGS. 5a–5c.

The actuator assembly 200 can also include spring elements 212a and 212b, where a spring element is coupled between each arm member 211 and ground 210. The spring elements 212 introduce a restoring force to the mechanism so that the actuator is biased to return to the rest position shown in FIG. 6 when no force is output by the actuator. This also provides a second order harmonic system which can be tuned according to the natural frequency of the system to provide amplified forces, as explained above. The spring elements 212a and 212b can be implemented as discrete physical springs (e.g. leaf springs, helical springs, etc.), or can be inherent in the couplings between elements, as with flex joints.

In some embodiments, the actuator assembly 200 can be used to provide contact forces, e.g. by driving a cover portion 122 or other moveable member as described with reference to FIG. 4. In such an embodiment, a link member 216 can be rotatably coupled to the actuator 202 housing at one end, and rotatably coupled to the cover portion 122 or other member. This embodiment also has the advantage of including both inertial forces (from the moving actuator 202) and contact forces (from the moving cover portion 122). This embodiment provides some of the most compelling haptic sensations for the embodiments described herein, since the user can feel direct contact forces from the moving cover portion 122, and can also feel inertial forces even when not contacting the mouse in appropriate manner to feel the contact forces from the cover plate. For example, users that may not prefer to grasp the mouse in the manner to feel the cover portion 122 can still experience haptic feedback from the inertial forces which are transmitted throughout the entire housing of the mouse.

Figure 7A:
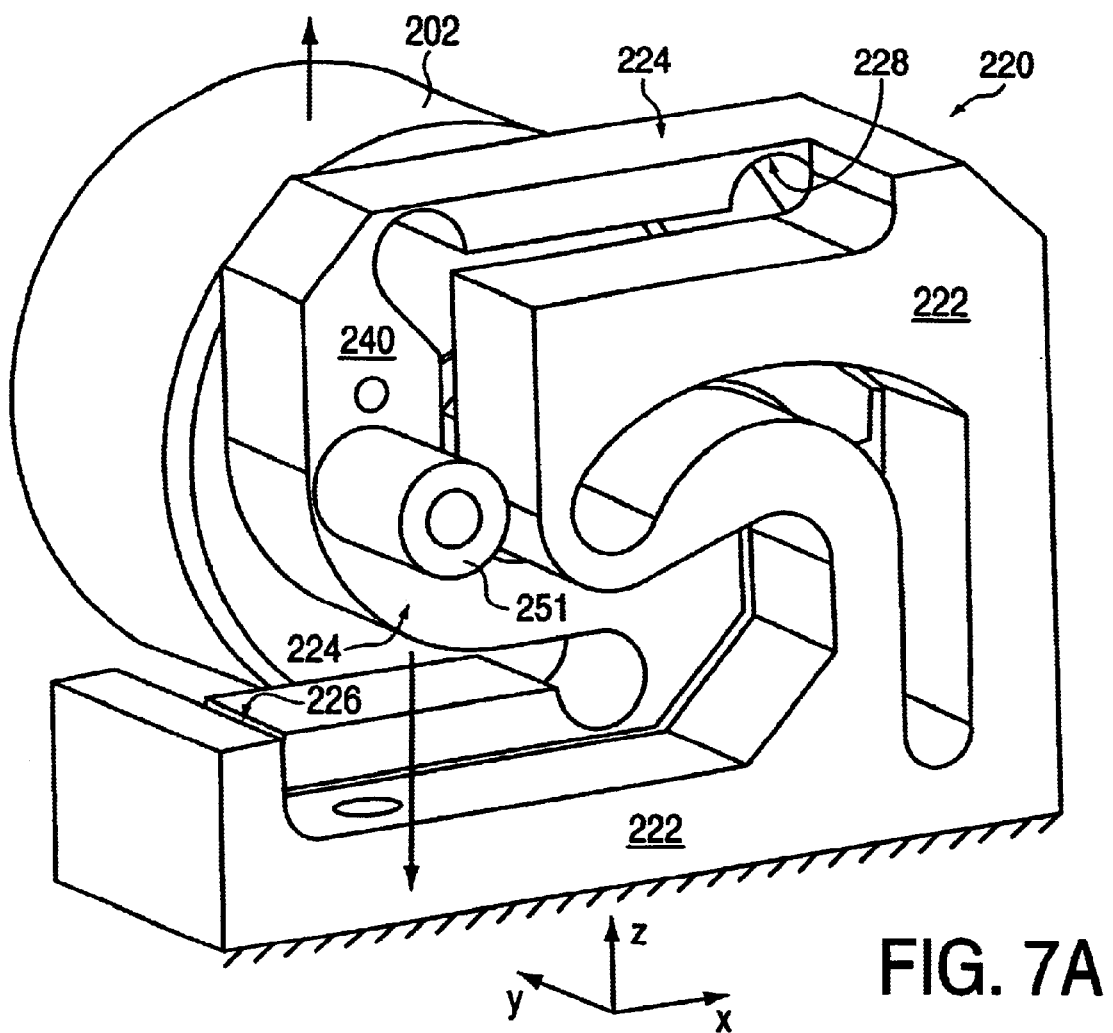
FIGS. 7a–7g are perspective views of a first embodiment of the actuator assembly of FIG. 6.
Figure 7B:
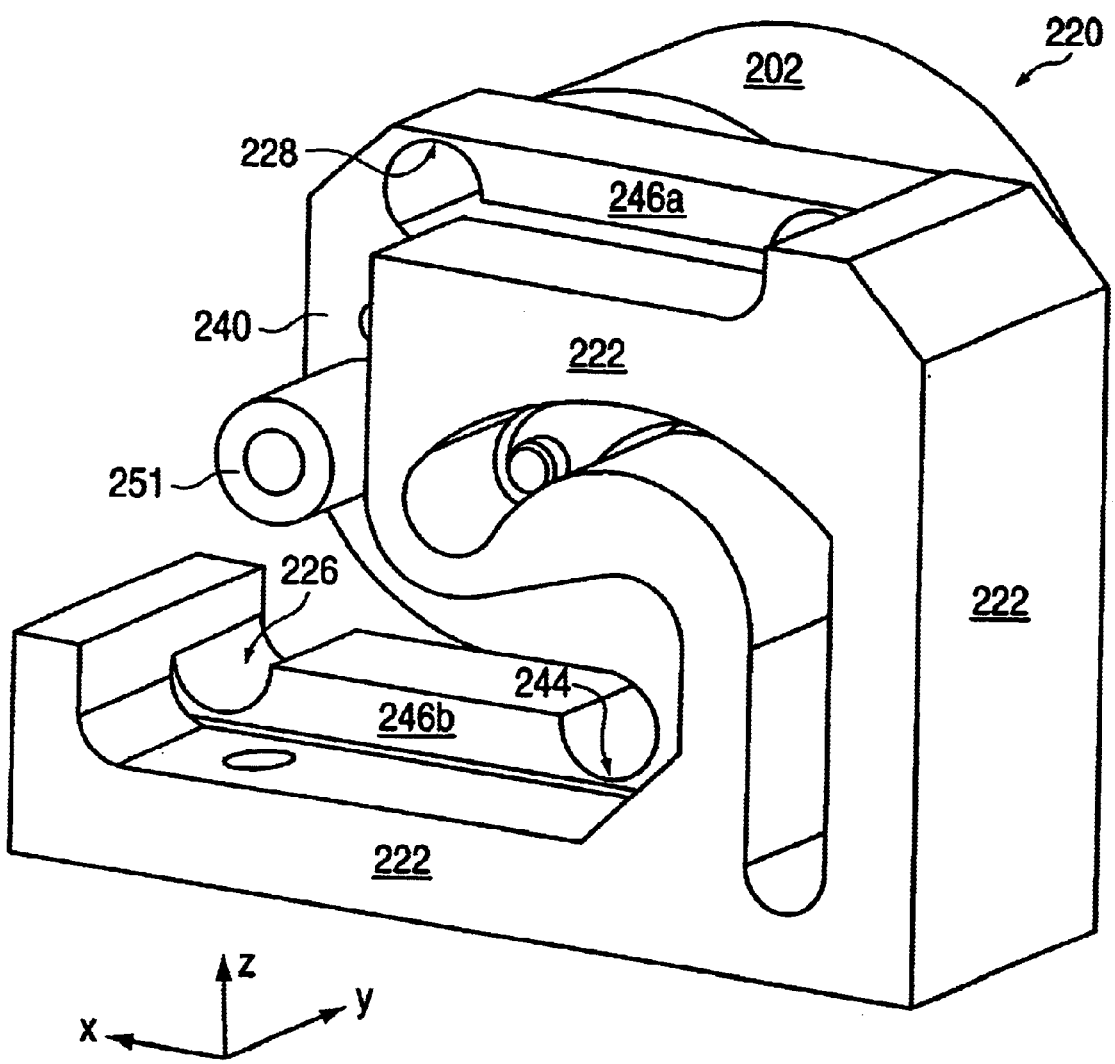
Figure 7C:
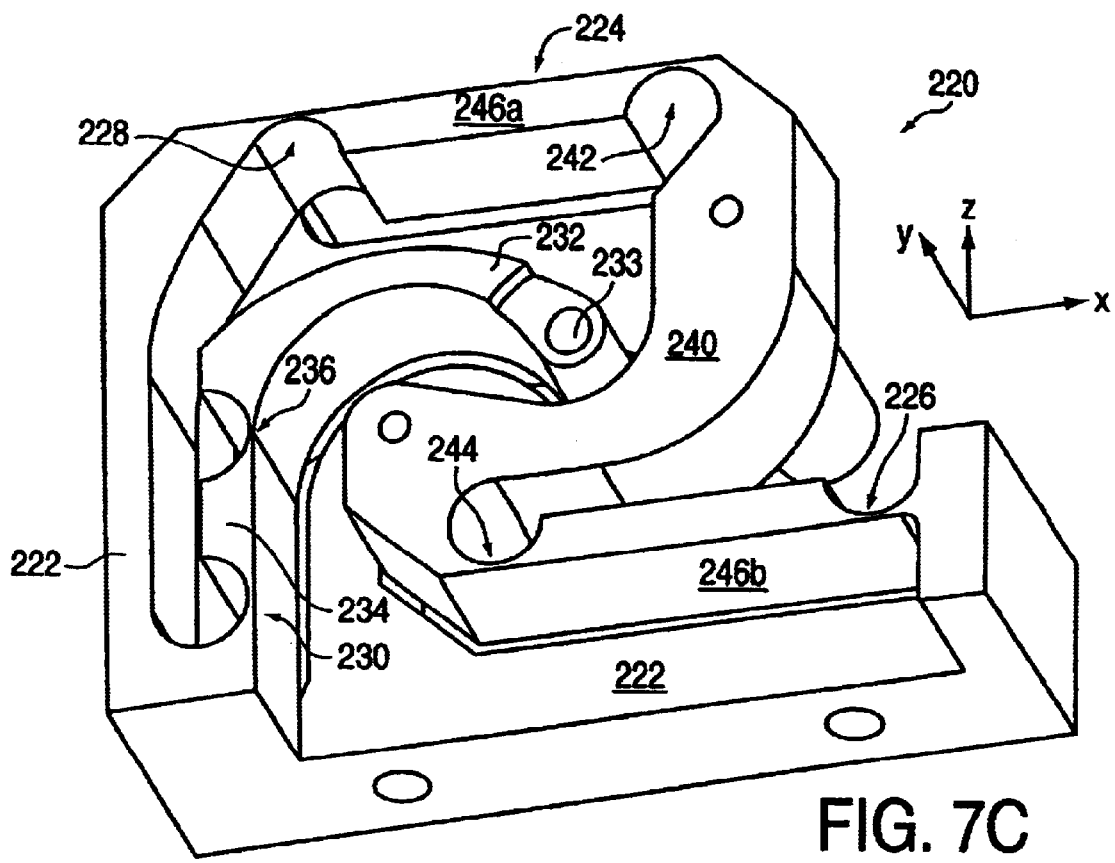
Figure 7D:
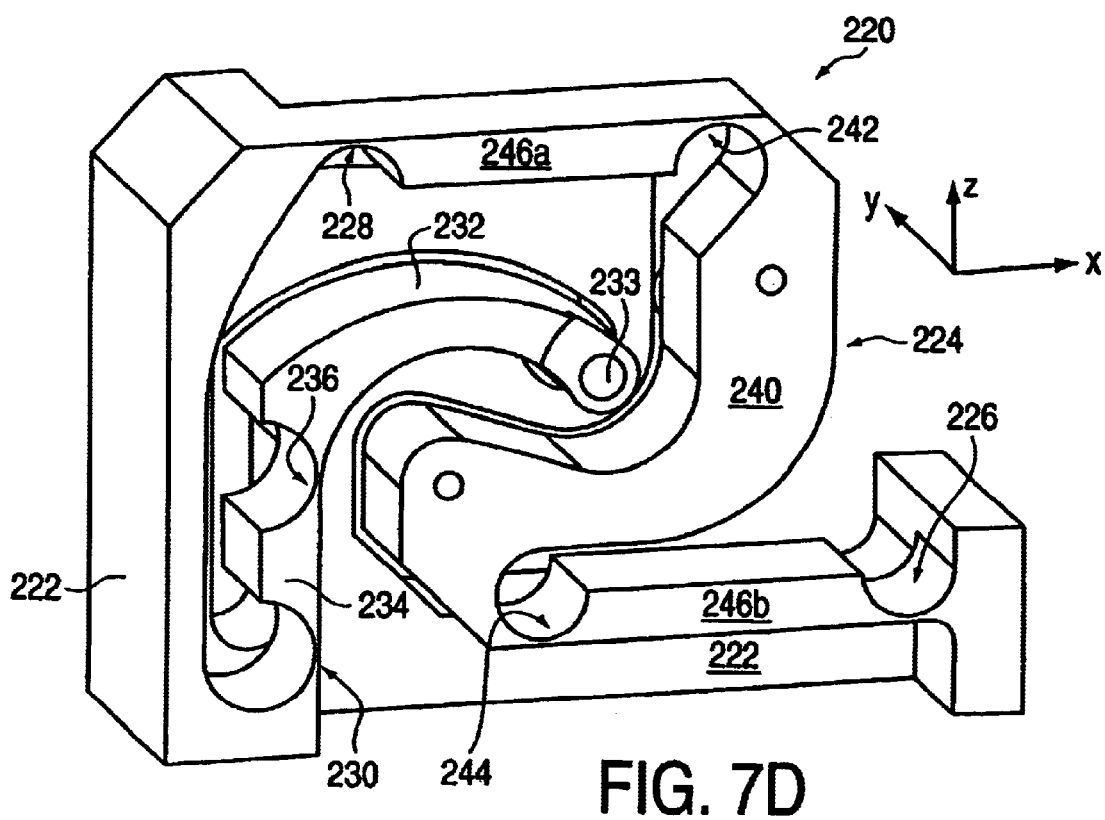
Figure 7E:
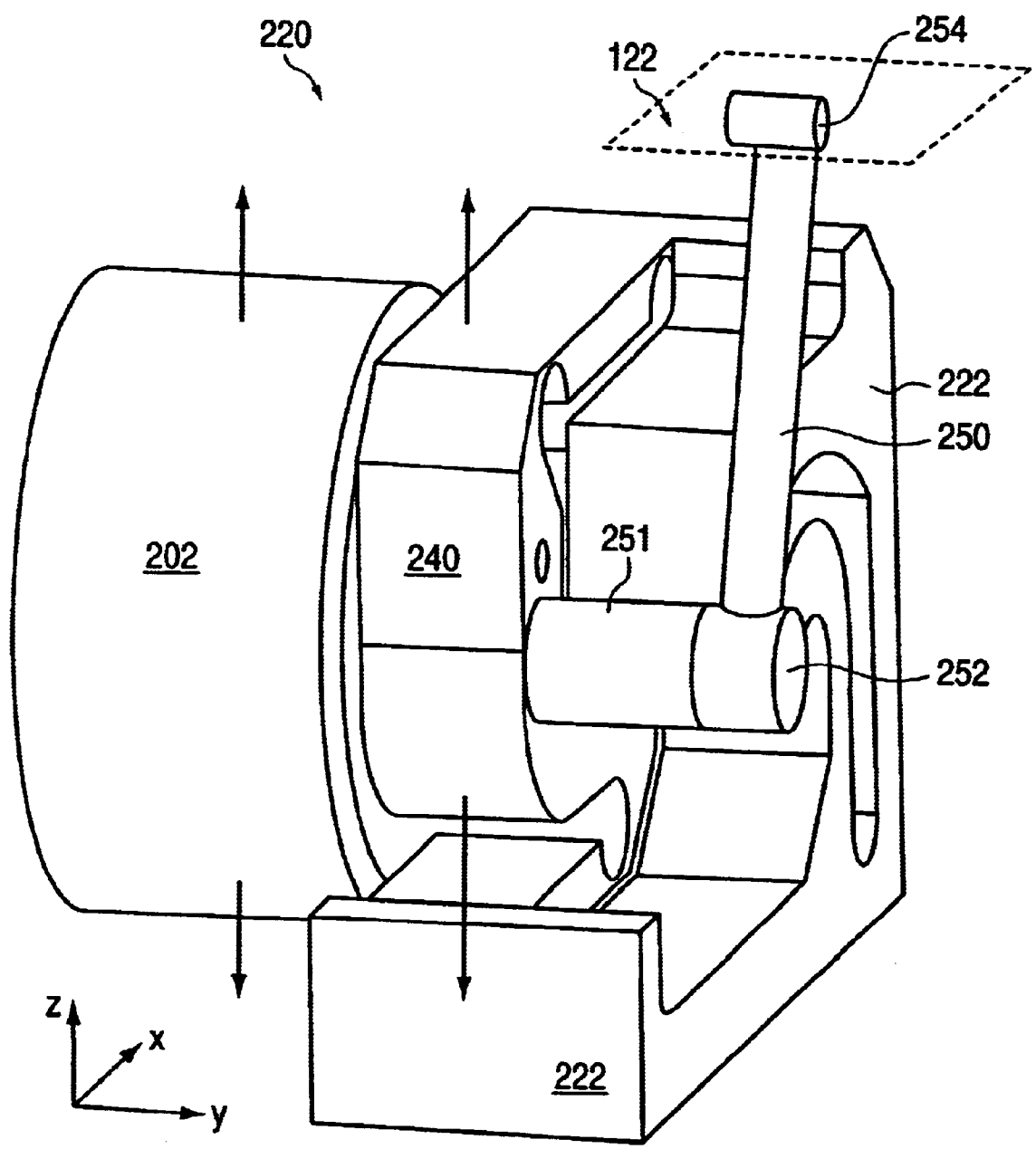
Figure 7F:
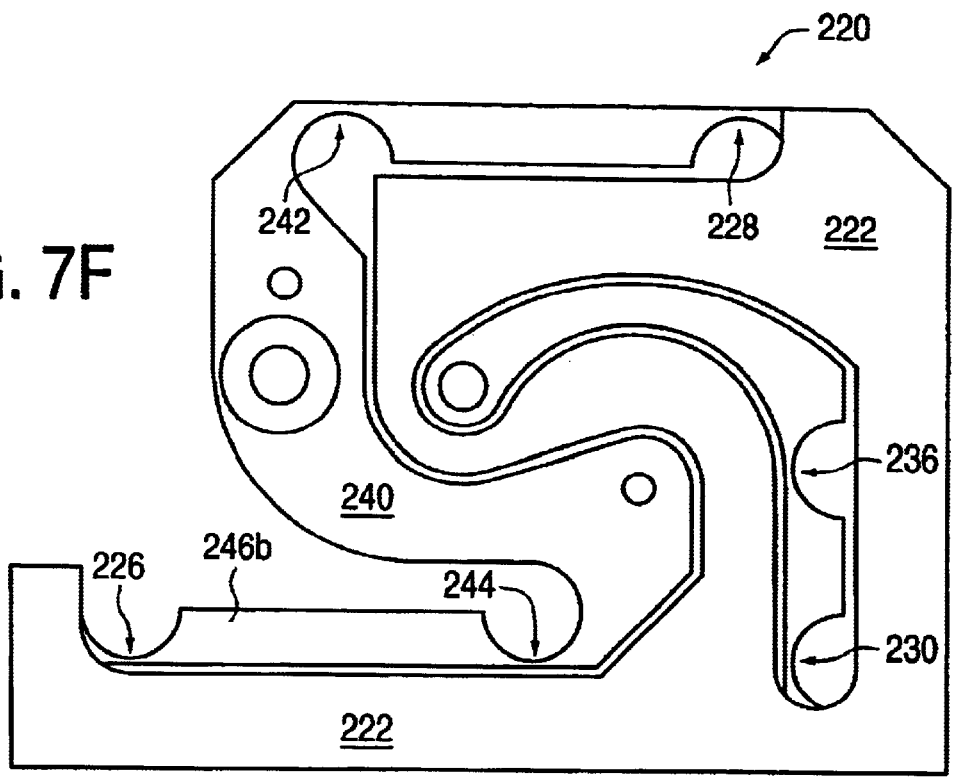
Figure 7G:
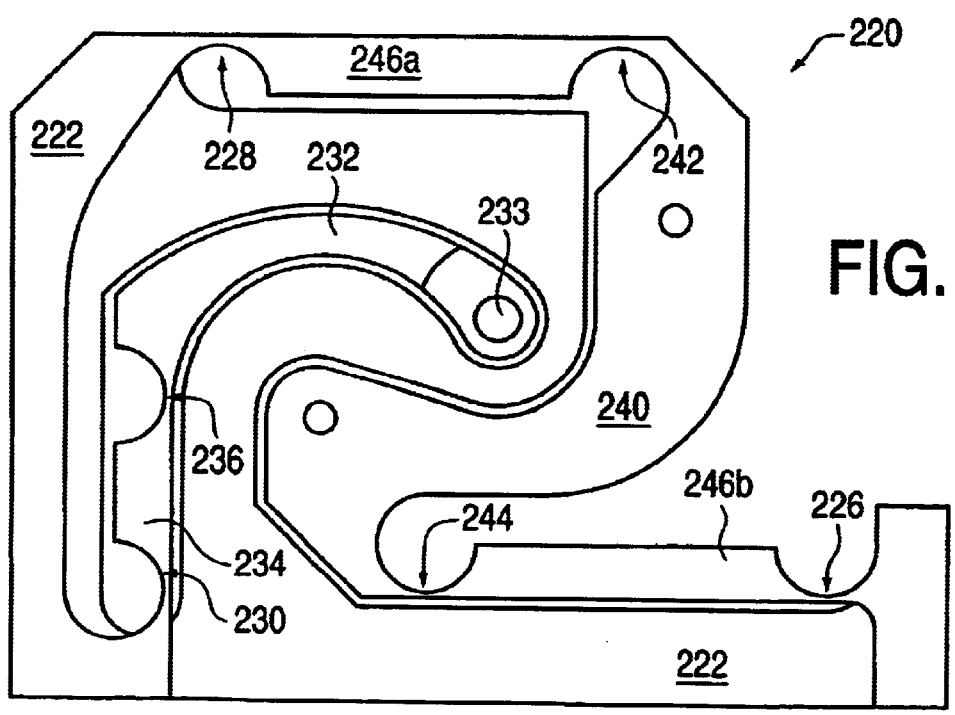

FIGS. 7a–7e are perspective views and FIGS. 7f and 7g are side elevational views of one flexure embodiment 220 of the actuator assembly 200 of the present invention shown in FIG. 6. In this embodiment, the mechanical transmission 205 is a unitary member, and the couplings between members of the mechanical transmission are provided as flex joints, similar to the flexible couplings provided in the embodiments of FIGS. 3 and 5.

Flexure 220 is preferably provided as a single unitary member that is coupled to a rotary actuator 202 (actuator 202 is not shown in all Figures). Flexure 220 includes a grounded portion 222 that is coupled to ground (e.g. mouse housing 50), and a moving portion 224. The moving portion 224 is flexibly connected to the grounded portion 222 at flex joints 226, 228, and 230 (not visible in all views). The moving portion 224 (best seen in FIGS. 7c and 7d) includes a rotating member 232 that is coupled to the actuator shaft via a bore 233. Rotating member 232 approximately corresponds to member 204 of FIG. 6. The rotating member 232 is flexibly coupled to a member 234 by a flex joint 236, where member 234 approximately corresponds to member 208. The member 234 is coupled to the grounded portion 222 by flex joint 230.

The housing of the actuator 202 is rigidly coupled to a central moving member 240, so hat when the central moving member 240 is moved approximately in a z-direction, the actuator 202 is also moved. Central member 240 is coupled to a flex joint 242 at one end and to a flex joint 244 at its other end. Arm member 246a is coupled to flex joint 242 and arm member 246b is coupled to flex joint 244, where the arm members 246 correspond to the arm members 211 of FIG. 6. The arm members 246a and 246b are coupled to the grounded portion 222 by flex joints 228 and 226, respectively.

The flexure 220 operates similarly to the actuator assembly 200 shown in FIG. 6. The actuator 202 and central member 240 move approximately along the z-axis when the actuator 202 is controlled to rotate its shaft and rotate the rotatable member 232. Flex joints 228, 242, 244, and 226 all flex to allow the linear motion of the actuator, as well as flex joints 236 and 230 which allow the rotational motion to be converted to linear motion. Preferably, enough space is provided above and below the actuator to allow its range of motion without impacting any surfaces or portions of the mouse housing 50, since such impacts can degrade the quality of the pulse, vibrations, and other haptic sensations output to the user.

As with all the flexures described herein, the one-piece flexure 220 has manufacturing advantages that make it a desirable low-cost solution for basic haptic feedback devices, where a single plastic mold can form the entire flexure 220. The use of a rotary actuator 202 to provide linear motion allows a very low cost motor to be used, and using the actuator as the inertial mass in the system further increases the compactness and decreases the cost of the actuator assembly, allowing straightforward use in low-cost computer mice and other compact consumer input devices. Furthermore, the flexible joints include inherent springs which provide a restoring force to the actuator, biasing it toward its rest position (as shown in these Figures) and allowing the amplification of forces by tuning the flexibility of the joints, as described above. For example, the flex joints can be adjusted in width to increase or decrease their flexibility and allow output vibrations to be increased in magnitude in a desired frequency range that is close to the natural frequency of the system.

In some embodiments, the approximate linear motion of the-actuator 202 can be used to drive a cover portion 122 as shown in FIG. 4, in addition to serving as an inertial motor. As shown in FIG. 6, a link member can be rotatably coupled between the actuator 202 and the cover portion or moving member of the mouse. The link member can be coupled anywhere to the central moving member 240 or arm members 246 of the flexure 220. As one example, a link member 250 is shown in FIG. 7e connected between the moving central member 240 and a cover portion 122 of the mouse housing. The link member 250 is rotatably coupled to the member 240 by a mechanical bearing 252, which can be coupled to the extension 251 shown in FIGS. 7a and 7b, and can be similarly coupled to the cover portion 122 by a bearing 254. Alternatively, other types of couplings besides bearings can be used, such as flex joints.

In other embodiments, additional flex joints or bearings can be used to provide desired motion of the actuator. The flexure 220 can also be oriented in other directions to provide inertial forces in those directions from linear motion of the actuator 202. Furthermore, the compactness of the design makes the actuator assembly ideal for use in other interface devices, such as remote control devices for use with electronic devices and appliances, gamepad controllers, or any other handheld controllers. The actuator assembly of the present invention is also suitable for any interface device that provides buttons or other contact surfaces for the user to contact during operation of the device and allows tactile sensations to be conveyed to the user.

Figure 8:
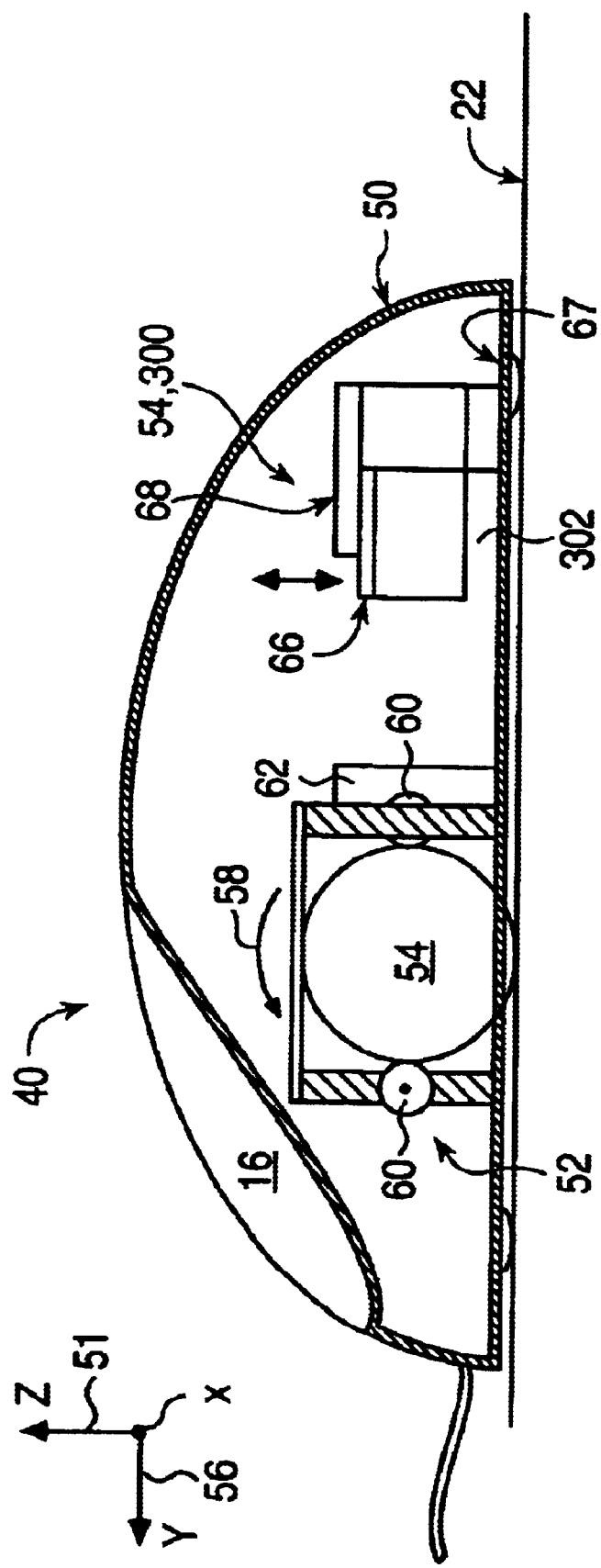
FIG. 8 is a side cross sectional view of a mouse embodiment of the haptic interface device of FIG. 2 including a second embodiment of the actuator assembly of FIG. 6.

FIG. 8 is a side elevational view of a mouse 12 including another embodiment 300 of the actuator assembly 54 of the present invention. Assembly 300 is similar to the actuator-flexure of FIGS. 7a–7e where the actuator also acts as the inertial mass or moving element, except that the actuator is oriented so that the actuator rotates its shaft about the z-axis in the x-y plane. This allows the actuator to be positioned in a more low-profile position for compactness, since the flexure in assembly 300 is designed to be low-profile.

As shown in FIG. 8, the assembly 300 can be positioned on the bottom portion 67 of the mouse housing 50, where space 302 is allowed for the actuator 66 to move along the z-axis without impacting the housing 50. In other embodiments, the assembly 300 can be positioned on other surfaces in the housing, such as the top or sides.

Although the actuator assembly 300 is shown to provide inertial forces, the moving actuator 66 can be coupled to a moving element on the housing surface of the mouse to provide contact forces, such as a moveable cover portion or a mouse button 16 as described above. In such embodiments, for example, a link member that is flexibly or hinged to the actuator 66 housing can be coupled between the moving element and the actuator, so that when the actuator 66 moves along the z-axis, the moving element is also moved approximately along the z-axis and may contact the user's palm or fingers to provide contact forces. This embodiment also has the advantage of including both inertial forces (from the moving actuator 66) and contact forces (from the moving cover portion or button).

Figure 9A:
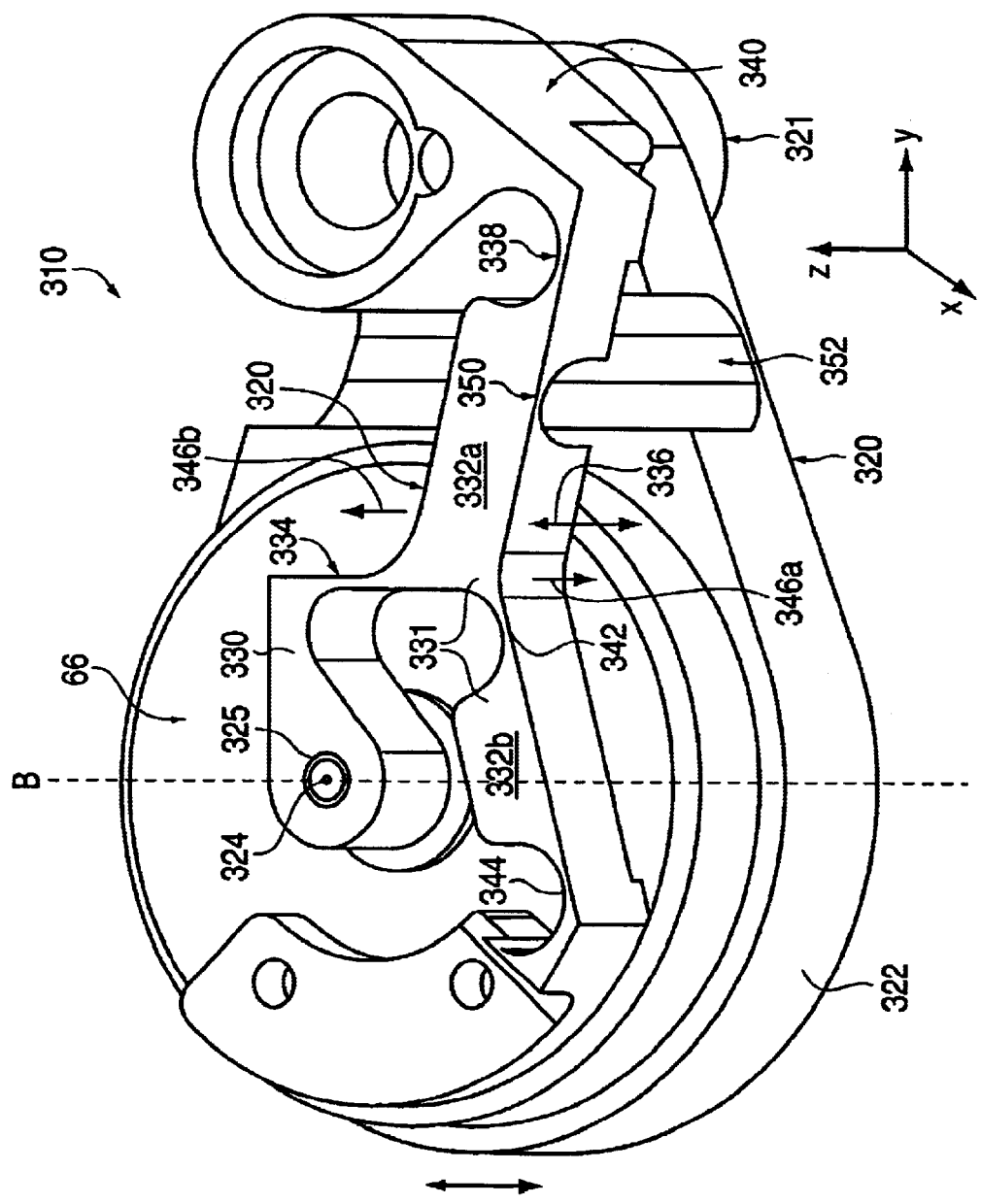
FIGS. 9a–9b and 9c are perspective and top plan views of the actuator assembly used in the device of FIG. 8.
Figure 9B:
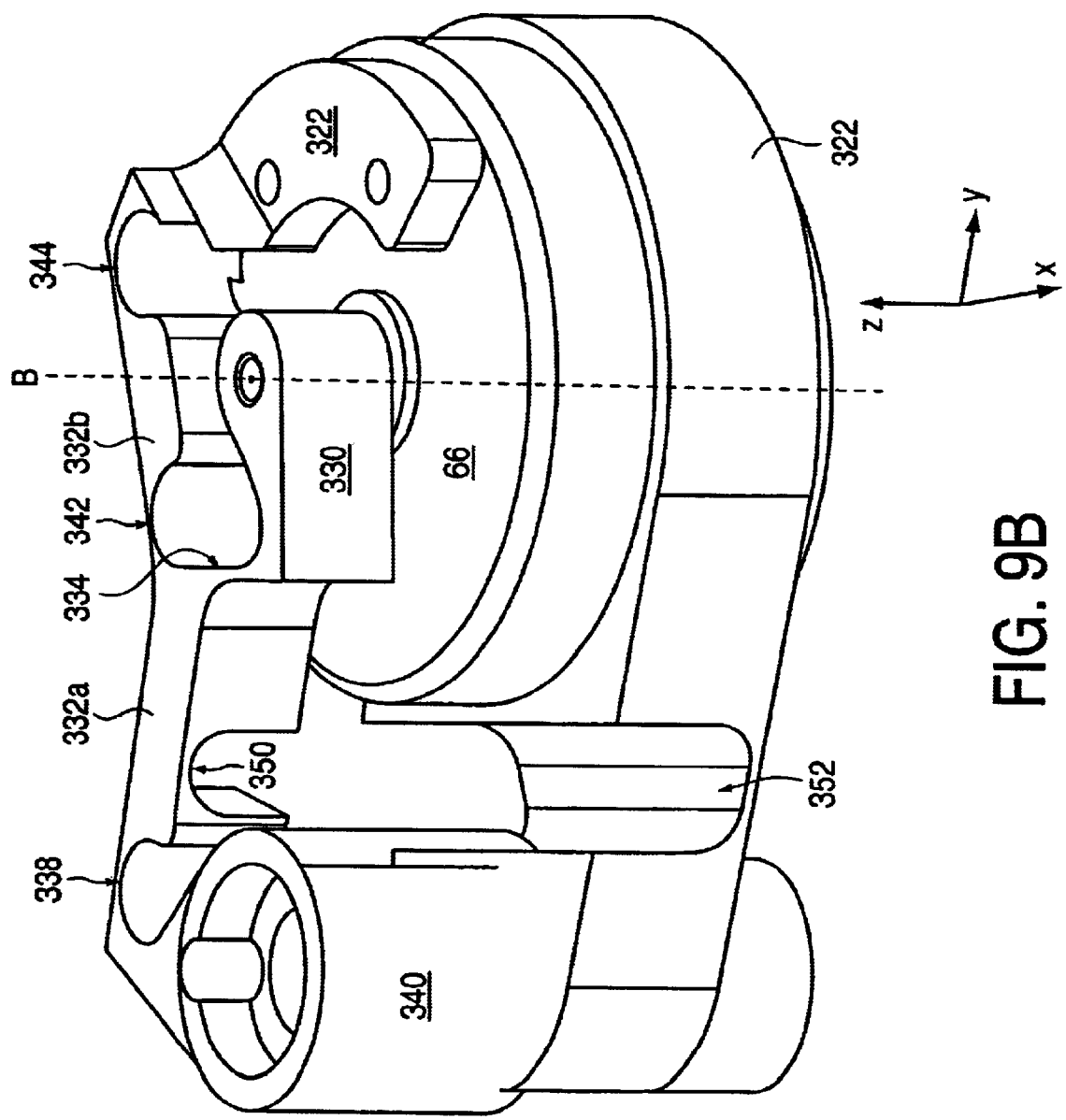
Figure 9C:
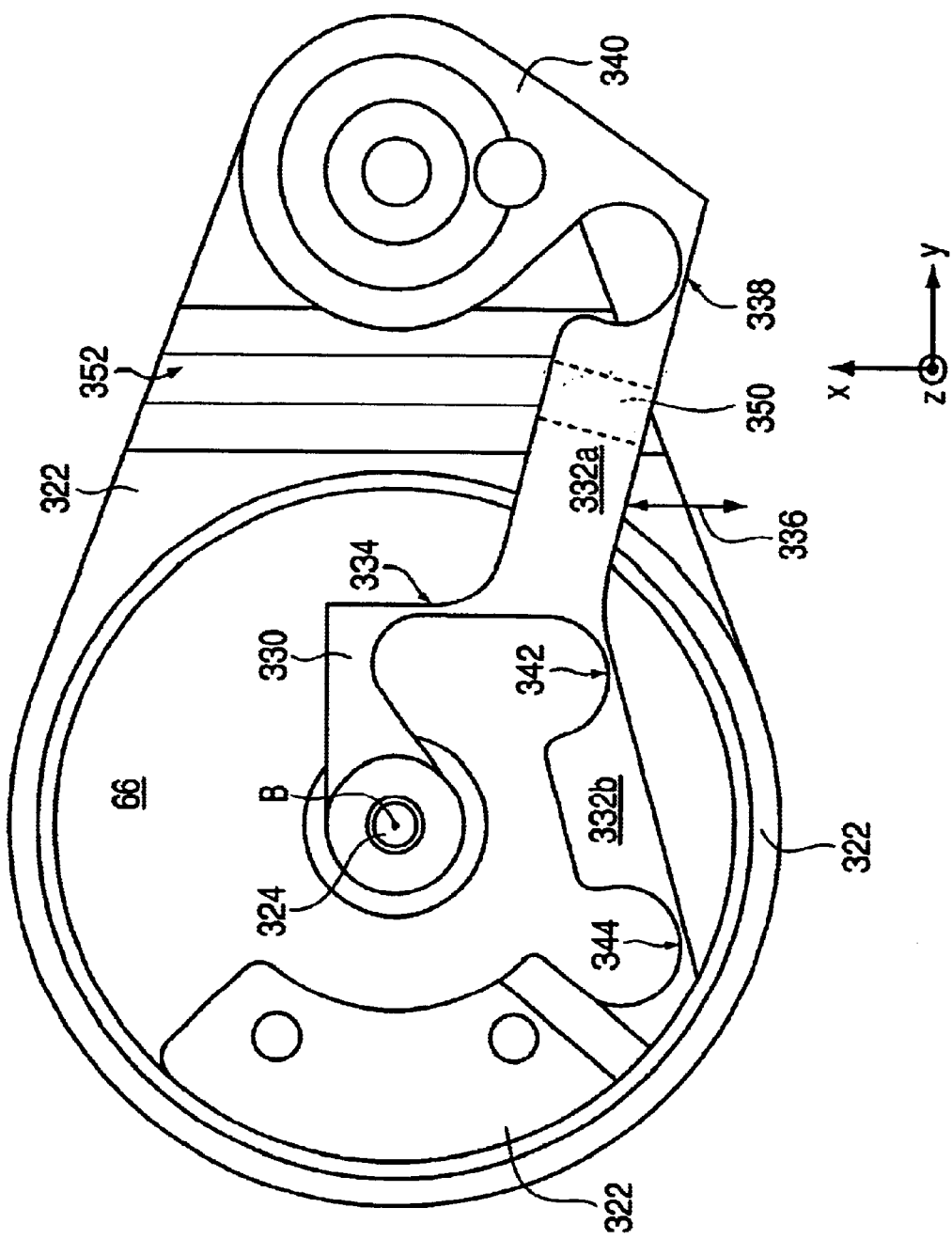

FIGS. 9a, 9b, and 9c are perspective and top elevation views of a first embodiment 310 of an actuator assembly 54 of the present invention. Actuator assembly includes a grounded flexure 320 and an actuator 66 coupled to the flexure 320. The flexure 320 is preferably a single, unitary piece made of a material such as polypropylene plastic ("living hinge" material) or other flexible material. This type of material is durable and allows flexibility of the flex joints (hinges) in the flexure when one of the dimensions of the joint is made small, but is also rigid in the other dimensions, allowing structural integrity as well as flexibility depending on thickness. Flexure 320 can be grounded to the mouse housing 50, for example, at portion 321.

Actuator 66 is shown coupled to the flexure 320. The housing of the actuator is coupled to a receptacle portion 322 of the flexure 320 which houses the actuator 66 as shown. Preferably, an amount of space is provided above and below the actuator 66 and receptacle portion 322 to allow motion of the actuator 66 in the z-axis; thus, the receptacle portion 322 should not be coupled to ground since it moves to provide an approximately linear motion, as explained below.

A rotating shaft 324 of the actuator is coupled to the flexure 320 in a bore 325 of the flexure 320 and is rigidly coupled to a central rotating member 330. The rotating shaft 324 of the actuator is rotated about an axis B which also rotates member 330 about axis B. Rotating member 330 is coupled to a first portion 332a of an angled member 331 by a flex joint 334. The flex joint 334 preferably is made very thin in the dimension it is to flex, i.e. one of the x- or y-axis dimensions (the y-axis dimension as shown in FIGS. 9a–9c; it can also be made thin in the x-axis dimension) so that the flex joint 334 will bend when the rotating portion 330 moves the first portion 332a approximately linearly. The first portion 332a is coupled to the grounded portion 340 of the flexure by a flex joint 338 and the first portion 332a is coupled to a second portion 332b of the angled member by flex joint 342. The second portion 332b, in turn, is coupled at its other end to the receptacle portion 322 of the flexure by a flex joint 344. Thus, in the shown configuration, the angled member 331 is connected between three different points: ground (housing), the receptacle portion 322, and the rotating actuator shaft 324.

The angled member 331 that includes first portion 332a and second portion 332b moves linearly along the x-axis as shown by arrow 336. In actuality, the portions 332a and 332b move only approximately linearly since it has a small arc to its travel, but the arc is small enough to be ignored. When the flexure is in its origin position (rest position), the portions 332a and 332b are preferably angled as shown with respect to their lengthwise axes. This allows the rotating member 330 to push or pull the angled member 331 along either direction as shown by arrow 336. This configuration allows forces output by the actuator to be magnified as they are transmitted to the moveable receptacle portion 322 and to the moving element of the interface device (inertial mass, cover portion, mouse button, etc.). The actual force output depends on the angle of the opposing portions 332a and 332b with respect to each other's lengthwise axes (or with respect to the y-axis). If the actuator 66 pushes the angled member 331 in the direction of arrow 346a, the angle between portions 332a and 332b increases and a greater amount of force is output. If the actuator pulls the angled member 331 in the direction of arrow 346b, a lesser amount of force is output. Such force magnification allows a low-cost actuator having small magnitude output, such as a pager motor, to be used to provide higher magnitude contact forces, similarly to the embodiment of FIGS. 5a–5c. The fact that such magnification occurs only in one direction tends does not tend, in practice, to introduce an undesirable degree of nonlinearity to the system.

The actuator 66 is operated in only a fraction of its rotational range when driving the rotating member 330 in two directions, allowing high bandwidth operation and high frequencies of pulses or vibrations to be output. The resulting motion of the angled member 331 compresses or stretches the flexure with respect to the grounded portion 321. To channel this compression or stretching into the desired z-axis motion, a flex joint 352 is provided in the flexure portion between the receptacle portion 322 and the grounded portion 340. Flex joint 352 is oriented to flex along the z-axis, unlike the flex joints 334, 338, 342, and 344, which flex in the x-y plane. The flex joint 352 allows the receptacle portion 322 (as well as the actuator 66, rotating member 330, and second portion 332b) to move linearly in the z-axis in response to motion of the portions 332a and 332b. In actuality, the receptacle portion 322 and actuator 66 move only approximately linearly, since they have a small arc to their travel; however, this arc is small enough to be ignored for most practical purposes. Thus, when the rotational motion of the rotating member 330 causes the ends of the angled member 331 to move further apart (direction 346a), the receptacle portion flexes down about flex joint 352 (as shown in FIG. 9a) along the z-axis. This is because the compression between actuator 66 and grounded portion 340 occurs in a plane above the flex joint 352, causing the flex joint 352 to flex downwardly. Similarly, if the ends of angled member 331 are made to move closer together (direction 346b), the receptacle 322 and actuator 66 move upwardly along the z-axis, in effect lifting the actuator 66 upward. A flex joint 350 is provided in the first portion 332a of the angled member 331 to allow the flexing about flex joint 352 in the z-direction to more easily occur.

By quickly changing the rotation direction of the actuator shaft 324, the actuator/receptacle can be made to oscillate along the z-axis and create a vibration on the mouse housing with the actuator 66 acting as an inertial mass. Preferably, enough space is provided above and below the actuator to allow its range of motion without impacting any surfaces or portions of the mouse housing 50, since such impacts can degrade the quality of the pulse, vibrations, and other haptic sensations output to the user. For example, 1.5 mm of free space can be allowed above and below the actuator/receptacle portion for low-profile devices.

In addition, the flex joints included in flexure 320, such as flex joint 352, act as spring members to provide a restoring force toward the origin position (rest position) of the actuator 66 and receptacle portion 332. This centering spring bias reduces the work required by the actuator to move itself since the actuator output force need only be deactivated once the actuator reaches a peak or valley position in its travel. The spring bias brings the actuator back to its rest position without requiring actuator force output. In addition, having a spring-biased center position is essential for providing linear harmonic operation which will faithfully reproduce an input control signal, and which is more desirable than nonlinear operation. With this spring compliance in the system included between the moveable member and the housing of the mouse, a second order harmonic system is created. This system can be tuned so that amplification of forces output by the actuator is performed at a efficient level, e.g. near the natural frequency of the system. Tuning such a harmonic system using an inertial force actuator and compliant suspension of a moving mass is described above. A system providing contact forces can also be so tuned. For example, in the flexure 320, the spring constants can be tuned by adjusting the thickness of the flex joints 334, 342, 338, 344, 350, and/or 352 (in the dimension in which they are thin). In some embodiments, additional springs can be added to provide additional centering forces if desired, e.g. mechanical springs such as leaf springs.

Furthermore, a link member can connect the actuator (or receptacle 322) to a cover portion, button, or other moving element on the mouse housing to provide contact forces to the user. The approximate linear motion of the actuator 66 can be used to drive a cover portion, button, or other moving contact element. For example, a link member can be rotatably coupled between the actuator and the moving element of the mouse. The link member can be coupled anywhere to the actuator or receptacle portion 322. The link member can be rotatably coupled to the actuator or member and to the moving element by mechanical bearings or other types of couplings, such as flex joints.

The flexure 320 is advantageous in the present invention because it has an extremely low cost and ease of manufacturability, yet allows high-bandwidth forces to be transmitted as inertial forces. Since the flexure 320 is a unitary member, it can be manufactured from a single mold, eliminating significant assembly time and cost. Furthermore, it is rigid enough to provide strong vibrations with respect to the mouse housing and to provide significant durability. In addition, the flexure provides close to zero backlash and does not wear out substantially over time, providing a long life to the product.

In some embodiments, the stops can be included in the flexure 320 to limit the motion of the receptacle portion 322 and actuator 66 along the z-axis. In some of those embodiments, the stops can be provided with some compliance to improve the "feel" of an impact with the stop as experienced by the user; for example, a harsh "clacking" impact can be softened at maximum amplitude output of the actuator.

Providing the actuator 66 as the inertial mass that is driven in the z-axis has several advantages. For example, this embodiment saves the cost of providing a separate inertial mass and saves space and total weight in the device, which are important considerations in the home consumer market. Another advantage of the actuator assembly 320 is that it has a very low profile in the z-axis dimension. This is allowed by the orientation of the actuator 66 in the x-y plane, e.g. the axis of rotation A of the actuator shaft 324 is parallel to the z-axis. This makes the actuator assembly 320 very suitable for use in low-profile devices such as many standard mouse housings.

The essential elements of the schematic embodiment shown in FIGS. 9a–9c can be implemented with a wide variety of components. For example, the members can be rotatably coupled using mechanical couplings such as bearings, pin joints, etc. In other embodiments, some of the couplings in the assembly can be implemented with mechanical bearings rather than flex joints. As described, the actuator 66 rotates shaft 324 about the z-axis in the x-y plane; the actuator can alternatively be positioned so that the shaft is rotated about the x-axis or y-axis and rotation occurs in the x-z plane or y-z plane.

In other embodiments, additional flex joints or bearings can be used to provide desired motion of the actuator. The flexure 320 can also be oriented in other directions to provide inertial forces in those directions from linear motion of the actuator 66. Furthermore, the compactness of the design makes the actuator assembly ideal for use in other interface devices, such as remote control devices for use with electronic devices and appliances, gamepad controllers, or any other handheld controllers. The actuator assembly of the present invention is also suitable for any interface device that provides buttons or other contact surfaces for the user to contact during operation of the device and allows tactile sensations to be conveyed to the user.

Figure 10A:
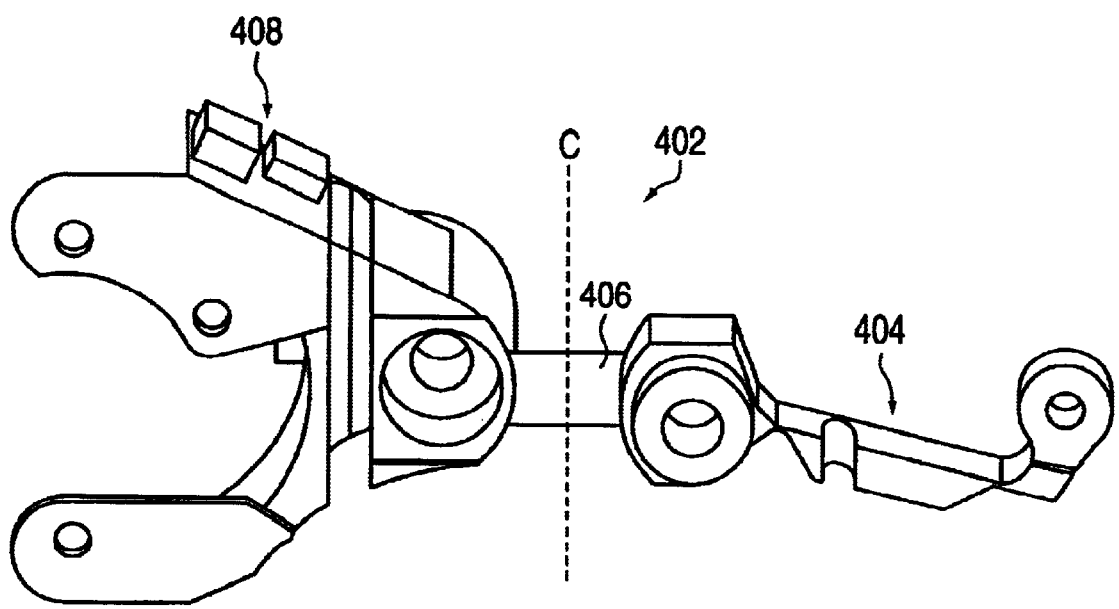
FIG. 10a is a perspective view of a flexure for use with a third embodiment of the actuator assembly of FIG. 6.
Figure 10B:
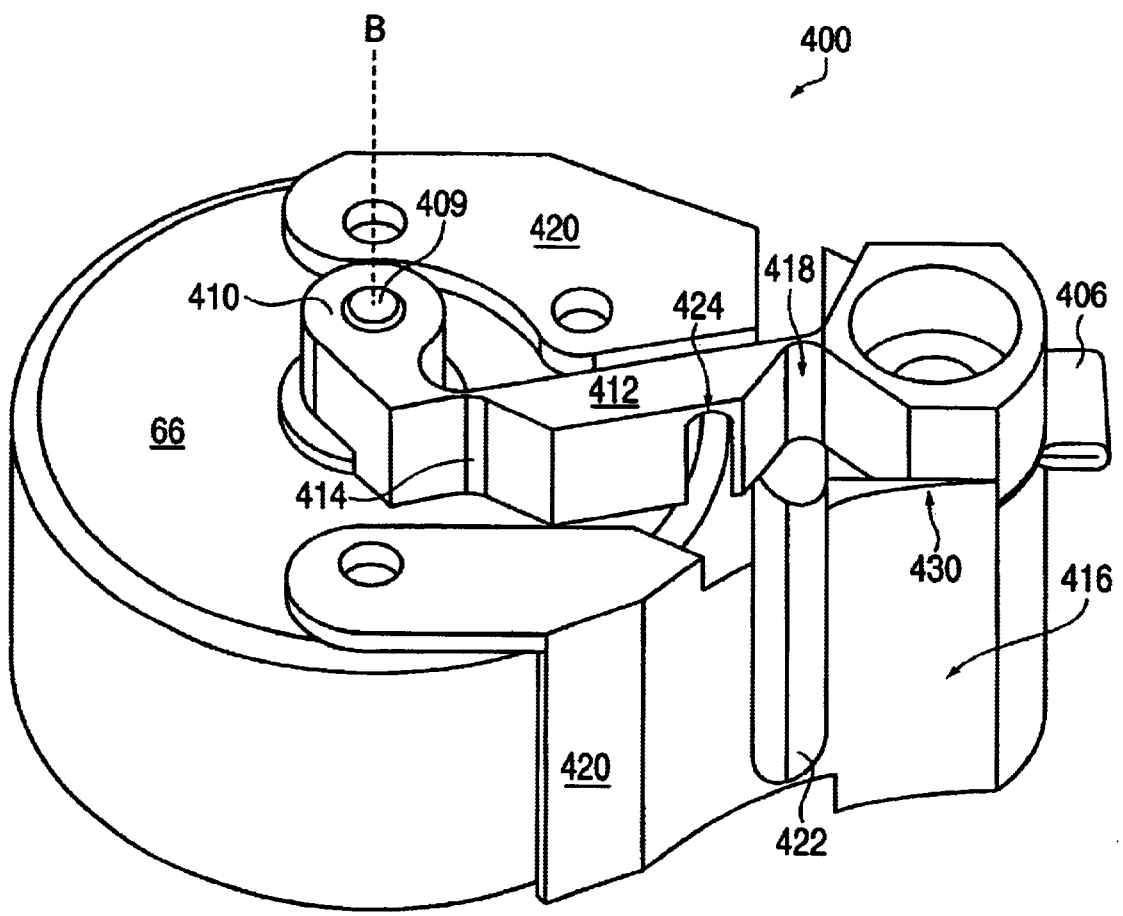
FIGS. 10b and 10c are perspective and top plan views of the third embodiment of the actuator assembly of FIG. 6.
Figure 10C:
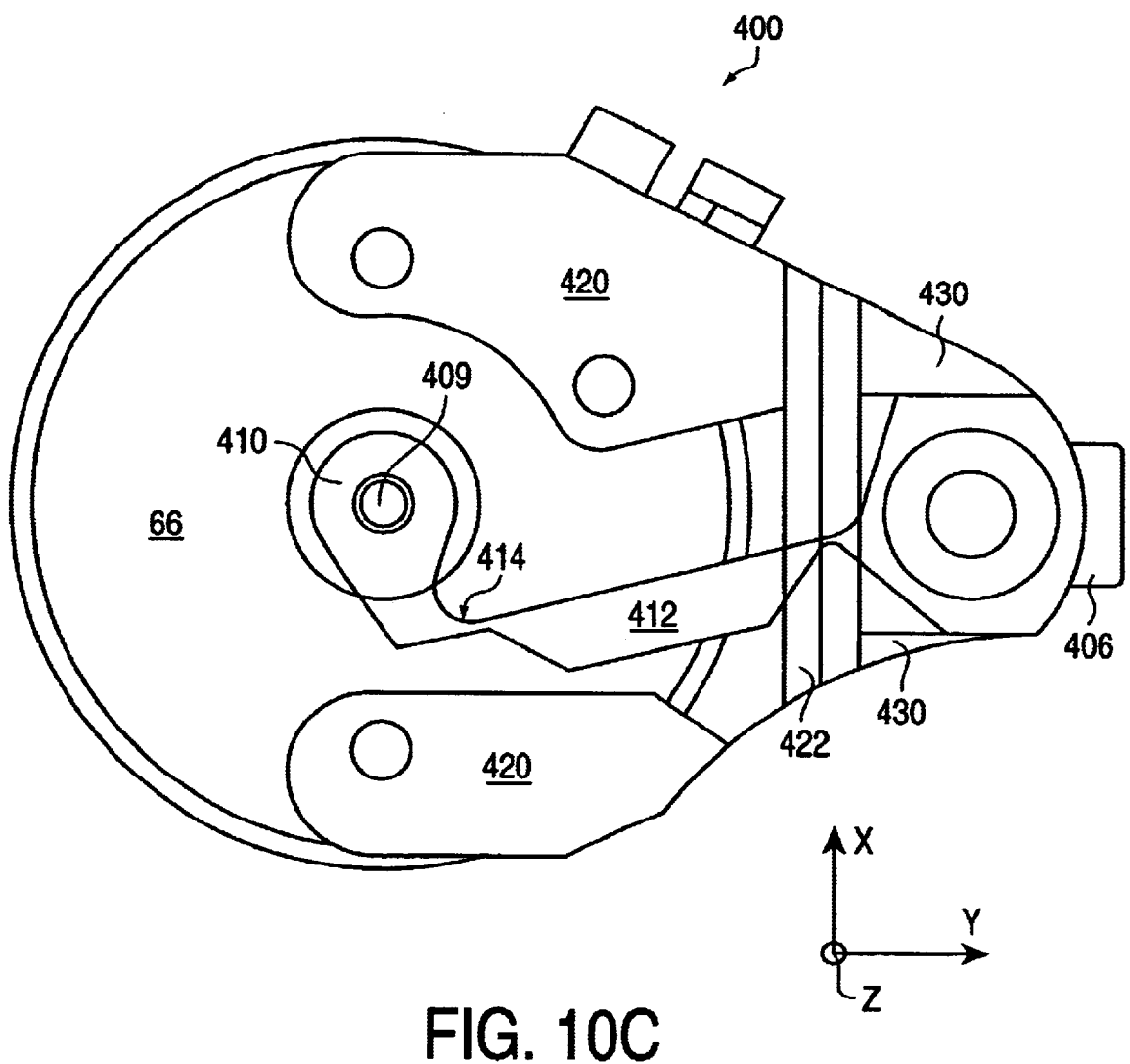

FIGS. 10a, 10b, and 10c illustrate an alternate embodiment 400 of the actuator assembly of the present invention. In FIG. 10a, a flexure 402 is shown which is used with the actuator 66 in the assembly 400. Flexure 402 is a single, unitary piece that is manufactured as shown. The manufacture of flexure 402 is easier and cheaper than the flexure 320 shown in FIGS. 9a–9c. However, an assembly step must be performed to provide a functional actuator assembly. A flexure arm portion 404 is coupled to a base portion 408 by a hinge 406. The arm portion 404 must be folded over axis C and mated with the remaining portion 408 of the flexure 402 after the actuator 66 is inserted in the portion 404, thus causing the hinge 406 to fold over itself. The resulting actuator assembly 400 (including the actuator 66) is shown as a perspective view in FIG. 10b and a top plan view in FIG. 10c.

The actuator assembly 400 is similar to the assembly 310 shown in FIGS. 9a–9c. Actuator 66 is positioned in a receptacle portion 420 of the flexure. An actuator shaft 409 is coupled to a rotary member 410. The rotary member 410 is flexibly coupled to an arm member 412 by a flex joint 414. The arm member 412 is coupled to a grounded portion 416 by a flex joint 418. The receptacle portion 420 is coupled to the grounded portion 416 by a flex joint 422. A flex joint 424 is provided in the arm member 412. In operation, the rotary member 210 rotates to cause the arm member 412 to compress or stretch. As explained above, the compression or stretching force causes the flex joint 422 to flex, thus causing the receptacle 420 and actuator 66 to move up or down along the z-axis. The flexure arm portion 404 is securely coupled to the base portion 406, where the flexure arm portion 404 is prevented from rotating by stops 430 provided in the base portion 406.

Differences between the embodiments 310 and 400 include the folding structure shown in FIG. 10a. Receptacle portion 420 is also smaller than in embodiment 310 and allows greater motion of the actuator along the z-axis in a compact space. In addition, a single arm member 412 is used instead of the two flexibly-coupled portions 332a and 332b shown in embodiment 310. Thus, embodiment 400 may provide less amplification of force due to the lack of a lever arm structure. However, the reduced amplification may not be noticeable to the user in some embodiments.

Figure 11A:
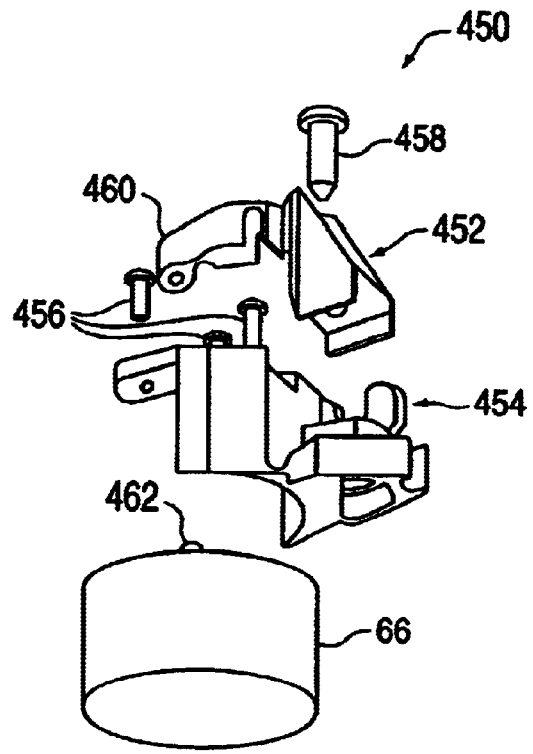
FIGS. 11a–11b are exploded views of a fourth embodiment of the actuator assembly of FIG. 6.
Figure 11B:
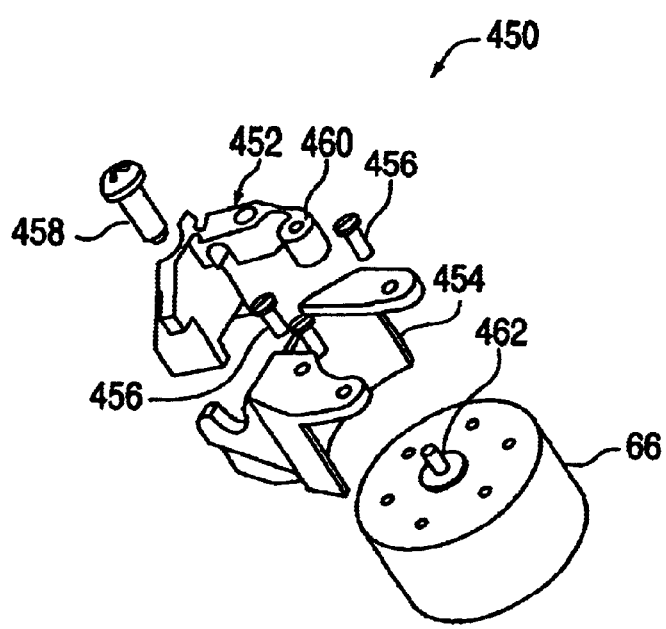

FIGS. 11a and 11b are perspective views illustrating one example of a multi-piece embodiment 450 of the actuator assembly 310 and 400 described above. The present design provides a two-part structure to the flexure and can be connected to the base or bottom inside surface of the mouse (or other surface, as described above). The flexure includes flex joints that can flex similarly to the flex joints described above. The example shown in FIGS. 11a and 11b is just one example of providing multiple pieces for easy assembly of the actuator assembly, and other configurations and pieces can be used in other embodiments.

An example of actuator assembly 450 is shown in expanded view in FIGS. 11a and 11b. The assembly as shown includes a total of seven components. Actuator linkage 452 is an injection molded piece made of polypropylene with a part material volume of, e.g., 0.78 cc. A flexure and actuator mount 454 is similarly made of polypropylene with a part material volume of, for example, 1.42 cc. Actuator 66 is shown as a rotary DC motor, such as a Mabuchi RF300-CA or Johnson HC203DG, but can be other types of actuators in other embodiments, as described above. Three screws 456 are used to connect the actuator mount 454 to the actuator 66. A plastic screw 458 can be used to connect the actuator linkage 452 and the actuator mount 454 to a ground member, such as the bottom portion of the housing of the interface device. When assembling the assembly, the linkage 452, mount 454, actuator 66, and screws 456 are assembled first. Then, the assembly is assembled into a mouse (or other device) product base with screw 458. Coupling portion 460 of the linkage 452 is pressed onto the shaft 462 of the actuator 66; preferably, the shaft 462 is splined or knurled for a tighter fit.

Figure 12A:
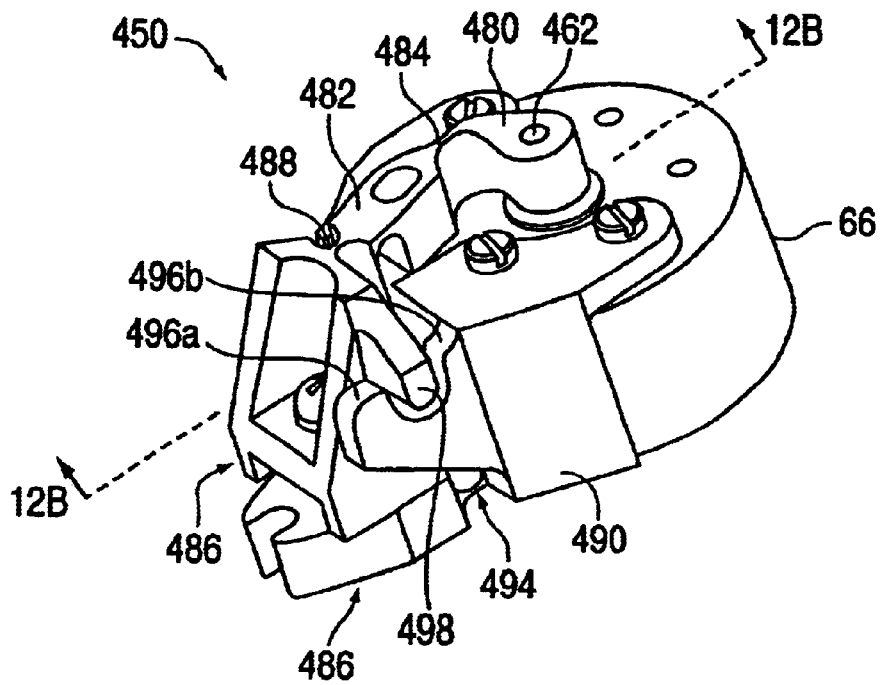
FIGS. 12a and 12b are views of the actuator assembly shown in FIGS. 11a–11b.
Figure 12B:
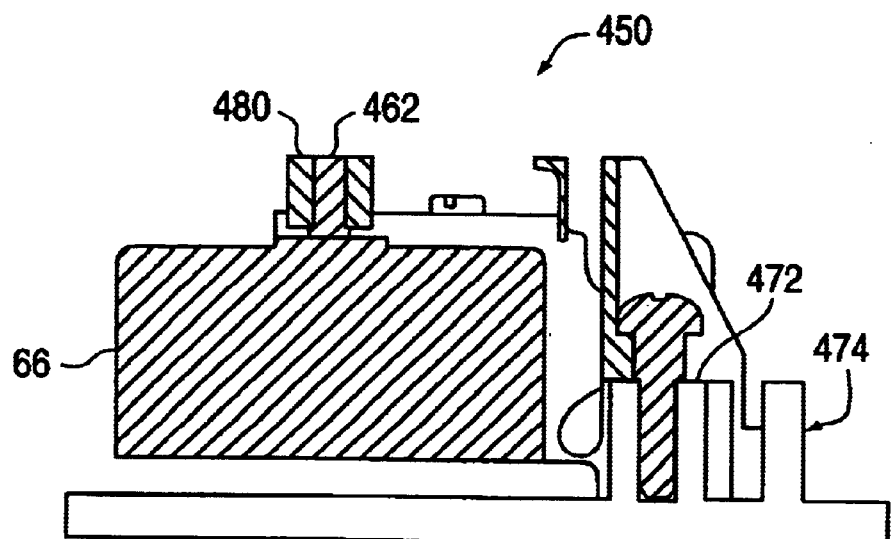

FIGS. 12a and 12b are perspective and side elevation sectional views, respectively, of the actuator assembly 450 in assembled form. The actuator assembly 450 is preferably mounted to the base 470 of a mouse or other device. In many mouse embodiments, the assembly can be placed behind or in front of the sensor mechanism of the mouse (e.g., a ball/encoder assembly, optical sensor, etc.).

The mouse base part preferably have two features to locate and retain the actuator module. A mounting boss 472 is added to receive the thread forming screw. This boss can have a hole (e.g., 2 mm radius) as deep as the boss length. A locating boss 474 can be positioned radially from the threaded boss 472 to provide angular alignment within the product.

As in the embodiments 310 and 400, actuator 66 itself outputs a rotational force that causes the actuator housing (and a portion of the flexure) to move approximately linearly along the z-axis as an inertial mass. When the inertial mass is controlled to move in conjunction with events and interactions of a cursor in a computer-displayed graphical environment, compelling haptic feedback sensations can be provided to the user, as described below with reference to FIG. 14.

The flexure and actuator assembly operates similarly to previously described embodiments. The actuator rotates its shaft to cause rotating member 480 to rotate about the shaft's axis of rotation. This motion either stretches or compresses arm 482 which is coupled to the rotating member by a flex joint 484 and is coupled to a grounded portion 486 by another flex joint 488. The tension or stretching in arm 482 causes the actuator carriage 490 and the actuator 66 (which is fastened to the carriage) to rotate about a flex joint 494 that connects the carriage 490 to the grounded portion 486 (the grounded portion 486 includes portions of both of the two assembly parts described above after they have been fastened to the mouse housing). The rotation of the carriage 490 and actuator 66 about the flex joint 494 is limited to a small arc range so that it approximates linear motion along an axis, such as the z-axis perpendicular to the x-y plane of mouse motion. During the motion of the carriage and actuator, the flex joints 484 and 488 flex to accommodate this motion.

The actuator assembly 450 preferably includes built-in displacement limiting, which is implemented by providing a travel limiter including a member 498 coupled to the linkage 452 (and to grounded portion 486) and portions 496a and 496b of the mount 454 (and carriage 490). As the carriage 490 rotates up or down, the portion 496a or 496b of the carriage impacts the feature 498 of the grounded portion 486, preventing further travel in that direction. This feature limits the travel of the actuator 66 to a desired range to approximate linear motion and prevents the actuator or carriage from impacting the housing of the mouse or other device. In one embodiment, the limiter limits travel to about 2 mm up and about 2 mm down from an origin (rest) position. Total displacement peak-to-peak is thus about 4 mm. This displacement is added to the static height to arrive at the "dynamic height", i.e. the total height required in the mouse housing to house the actuator assembly 450. Additional allowance is preferably provided to prevent the actuator/carriage from impacting the housing or enclosure. For example, about 1 mm can be added to the top and bottom internal clearances, giving approximately 3 mm clearance to the top shell and approximately 3 mm to the bottom.

The travel limiter can include the additional advantage of providing a qualitative improvement to the feel of forces experienced by the user. Since the travel limiter preferably softens the impact when the actuator reaches a travel limit, less high-frequency forces are produced, providing a crisper and less annoying feel to the user than if the actuator were to impact the device housing as a travel limit. In addition, the travel limiter can assist the motion of the actuator in the opposite direction after it has reached a limit, since it can provide more resiliency or "rebound" to the actuator than if the actuator were to impact the device housing by including more resilient materials.

Figure 13:
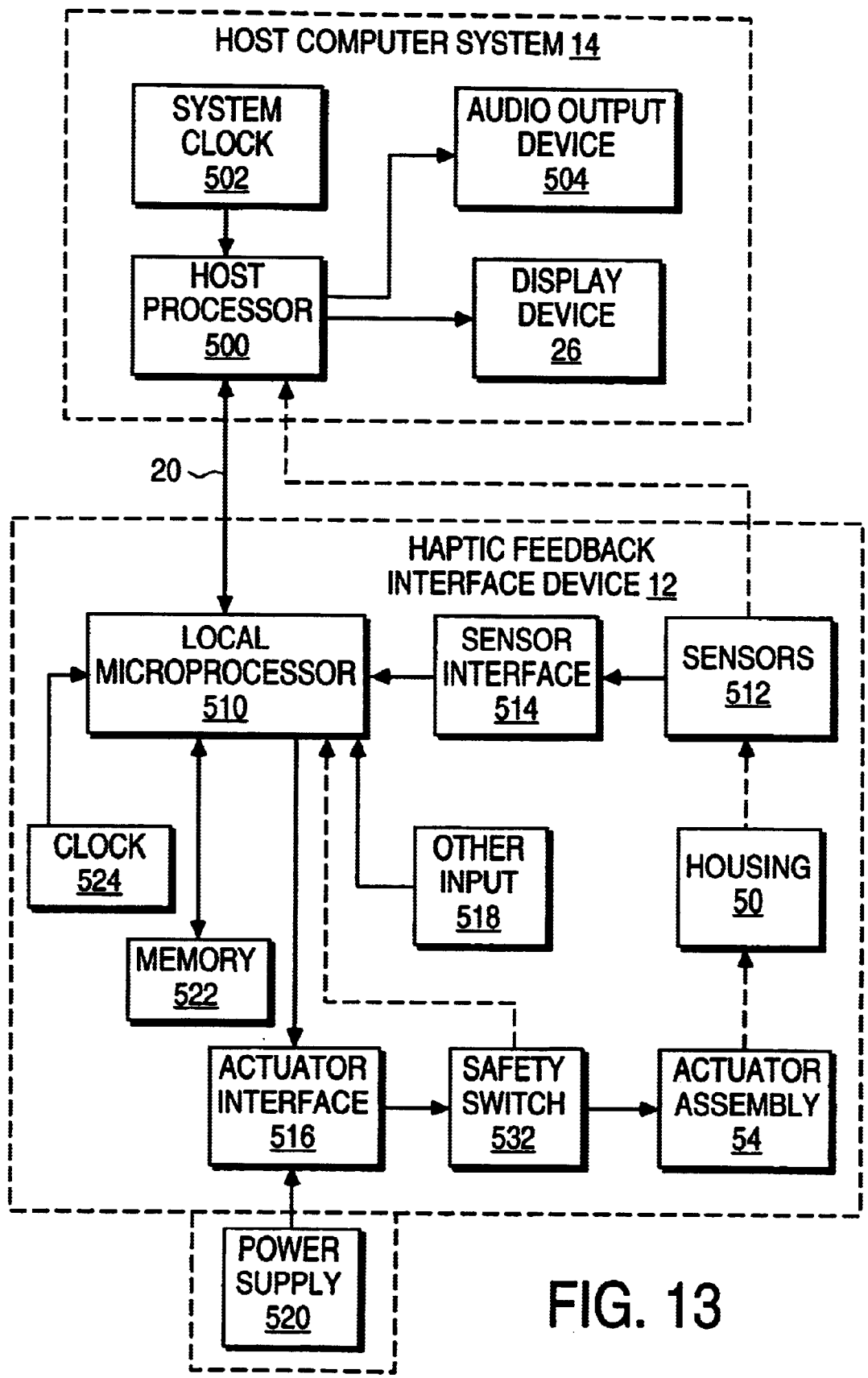
FIG. 13 is a block diagram illustrating an embodiment of the haptic interface device and host computer for use with the present invention.

FIG. 13 is a block diagram illustrating one embodiment of the haptic feedback system of the present invention including a local microprocessor and a host computer system.

Host computer system 14 preferably includes a host microprocessor 500, a clock 502, a display screen 26, and an audio output device 504. The host computer also includes other well known components, such as random access memory (RAM), read-only memory (ROM), and input/output (I/O) electronics (not shown). Display screen 26 displays images of a game environment, operating system application, simulation, etc. Audio output device 504, such as speakers, is preferably coupled to host microprocessor 500 via amplifiers, filters, and other circuitry well known to those skilled in the art and provides sound output to user when an "audio event" occurs during the implementation of the host application program. Other types of peripherals can also be coupled to host processor 500, such as storage devices (hard disk drive, CD ROM drive, floppy disk drive, etc.), printers, and other input and output devices.

The interface device, such as mouse 12, is coupled to host computer system 14 by a bi-directional bus 20. The bi-directional bus sends signals in either direction between host computer system 14 and the interface device. Bus 20 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to the actuator of actuator assembly 54.

Mouse 12 can include a local microprocessor 510. Local microprocessor 510 can optionally be included within the housing of mouse 12 to allow efficient communication with other components of the mouse. Processor 510 is considered local to mouse 12, where "local" herein refers to processor 510 being a separate microprocessor from any processors in host computer system 14. "Local" also preferably refers to processor 510 being dedicated to haptic feedback and sensor I/O of mouse 12. Microprocessor 510 can be provided with software instructions to wait for commands or requests from computer host 14, decode the command or request, and handle/control input and output signals according to the command or request. In addition, processor 510 can operate independently of host computer 14 by reading sensor signals and calculating appropriate forces from those sensor signals, time signals, and stored or relayed instructions selected in accordance with a host command. Suitable microprocessors for use as local microprocessor 510 include the MC68HC711E9 by Motorola, the PIC16C74 by Microchip, and the 82930AX by Intel Corp., for example, as well as more sophisticated force feedback processors such as the Immersion Touchsense Processor. Microprocessor 510 can include one microprocessor chip, multiple processors and/or co-processor chips, and/or digital signal processor (DSP) capability.

Microprocessor 510 can receive signals from sensor(s) 512 and provide signals to actuator assembly 54 in accordance with instructions provided by host computer 14 over bus 20. For example, in a local control embodiment, host computer 14 provides high level supervisory commands to microprocessor 510 over bus 20, and microprocessor 510 decodes the commands and manages low level force control loops to sensors and the actuator in accordance with the high level commands and independently of the host computer 14. This operation is described in greater detail in U.S. Pat. Nos. 5,739,811 and 5,734,373, both incorporated by reference herein. In the host control loop, force commands are output from the host computer to microprocessor 510 and instruct the microprocessor to output a force or force sensation having specified characteristics. The local microprocessor 510 reports data to the host computer, such as locative data that describes the position of the mouse in one or more provided degrees of freedom. The data can also describe the states of buttons 16 and safety switch 532. The host computer uses the data to update executed programs. In the local control loop, actuator signals are provided from the microprocessor 510 to actuator assembly 54 and sensor signals are provided from the sensor 512 and other input devices 518 to the microprocessor 510. Herein, the term "haptic sensation" or "tactile sensation" refers to either a single force or a sequence of forces output by the actuator assembly 54 which provide a sensation to the user. For example, vibrations, a single jolt or pulse, or a texture sensation are all considered haptic or tactile sensations. The microprocessor 510 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other simpler hardware can be provided locally to mouse 12 to provide functionality similar to microprocessor 510. For example, a hardware state machine incorporating fixed logic can be used to provide signals to the actuator assembly 54 and receive sensor signals from sensors 512, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 14 can provide low-level force commands over bus 20, which are directly transmitted to the actuator assembly 54 via microprocessor 510 or other (e.g. simpler) circuitry. Host computer 14 thus directly controls and processes all signals to and from the mouse 12, e.g. the host computer directly controls the forces output by actuator assembly 54 and directly receives sensor signals from sensor 512 and input devices 518. This embodiment may be desirable to reduce the cost of the haptic feedback device yet further, since no complex local microprocessor 510 or other processing circuitry need be included in the mouse. Furthermore, since one actuator is used with forces not provided in the primary sensed degrees of freedom, the local control of forces by microprocessor 510 may not be necessary in the present invention to provide the desired quality of forces due to their simpler nature.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single mouse device 12.

Local memory 522, such as RAM and/or ROM, is preferably coupled to microprocessor 510 in mouse 12 to store instructions for microprocessor 510 and store temporary and other data. For example, force profiles can be stored in memory 522, such as a sequence of stored force values that can be output by the microprocessor, or a look-up table of force values to be output based on the current position of the user object. In addition, a local clock 524 can be coupled to the microprocessor 510 to provide timing data, similar to the system clock of host computer 12; the timing data might be required, for example, to compute forces output by actuator assembly 54 (e.g., forces dependent on calculated velocities or other time dependent factors). In embodiments using the USB communication interface, timing data for microprocessor 510 can be alternatively retrieved from the USB signal.

For example, host computer 14 can send a "spatial representation" to the local microprocessor 510, which is data describing the locations of some or all the graphical objects displayed in a GUI or other graphical environment which are associated with forces and the types/characteristics of these graphical objects. The microprocessor can store such a spatial representation in local memory 522, and thus will be able to determine interactions between the user object and graphical objects (such as the rigid surface) independently of the host computer. In addition, the microprocessor can be provided with the necessary instructions or data to check sensor readings, determine cursor and target positions, and determine output forces independently of host computer 14. The host could implement program functions (such as displaying images) when appropriate, and synchronization commands can be communicated between the microprocessor and host 14 to correlate the microprocessor and host processes. Also, the local memory can store predetermined force sensations for the microprocessor that are to be associated with particular types of graphical objects. Alternatively, the computer 14 can directly send force feedback signals to the mouse 12 to generate tactile sensations.

Sensors 512 sense the position or motion of the mouse (e.g. the housing 50) in its planar degrees of freedom and provides signals to microprocessor 510 (or host 14) including information representative of the position or motion. Sensors suitable for detecting planar motion of a mouse include the sensing system 52 described above for FIG. 2, e.g. digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 514 can be used to convert sensor signals to signals that can be interpreted by the microprocessor 510 and/or host computer system 14, as is well known to those skilled in the art.

Actuator assembly 54 transmits forces to the housing 50 of the mouse as described above with reference to FIG. 2 in response to signals received from microprocessor 510 and/or host computer 14. Actuator assembly 54 is provided to generate inertial forces by moving an inertial mass, and/or contact forces by moving a contact member such as a cover portion 122. In the preferred embodiment, using a flexure or other mechanical transmission, the mass is moved approximately perpendicular to the planar degrees of freedom of motion of the mouse and thus the actuator assembly 54 does not generate force in the primary degrees of freedom of motion of the mouse. Actuator assembly 54 instead provides "informative" or "effect" forces that do not resist or assist motion. The sensors 512 detect the position/motion of the mouse 12 in its planar degrees of freedom, and this sensing is not substantially affected by the output of forces by actuator assembly 54.

The actuator described herein has the ability to apply short duration force sensation on the handle or housing 50 of the mouse with respect to an inertial mass. This short duration force sensation is described herein as a "pulse." Ideally the "pulse" is directed substantially along a Z axis orthogonal to the X-Y plane of motion of the mouse. In progressively more advanced embodiments, the magnitude of the "pulse" can be controlled; the sense of the "pulse" can be controlled, either positive or negative biased; a "periodic force sensation" can be applied on the handle of the mouse with respect to the inertial mass, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. No. 5,959,613 and pending provisional patent application No. 60/160,401, both incorporated herein by reference. Or the waveforms can be conveyed through high level commands that include parameters such as magnitude, frequency, and duration, as described in U.S. Pat. No. 5,734,373. These control schemes can also apply when providing contact forces using a moveable member; for example, a pulse can be simply moving a cover portion 122 to momentarily contact the user's hand. The cover potion can also be moved according to an open-loop position control scheme, where a commanded output force magnitude overcomes the centering spring force of the system to produce a desired position or displacement of the cover portion 122 in its degree of freedom. A pulse command signal can also be used in those embodiments outputting both inertial and contact forces to move both the inertial mass and the contact member to provide simultaneous pulse sensations; or, the inertial mass can be controlled to output one sensation and the contact member can be simultaneously controlled to output a different sensation, such as a pulse of a different duration or magnitude, a vibration of a different frequency, a texture of a different spacing, etc.

Alternate embodiments can employ additional actuators for providing haptic sensations in the z-direction and/or in the degrees of freedom of the device 12. In one embodiment, the device 12 can include multiple actuator assemblies 54 for greater magnitude forces, forces in multiple degrees of freedom, and/or different simultaneous haptic sensations. In another embodiment, the device 12 can be enhanced with a secondary, different type of actuator in addition the actuator assembly described herein. Because of power constraints in some embodiments, this secondary actuator can be passive (i.e., it dissipates energy). The passive actuator can be a brake, e.g., a brake employing a very low power substrate such as a magneto-rheological fluid. Alternatively, it can be a more traditional magnetic brake. The passive braking means can be employed through a frictional coupling between the mouse housing and the table surface 22. For example, a friction roller in the mouse housing base can engage the table surface. The roller can spin freely when the mouse is moved by the user so long as the passive brake is not engaged. When the brake is engaged, the user can feel the passive resistance to motion of the mouse (in one or two of the planar degrees of freedom of the mouse). The passive resistance can allow additional feel sensations that supplement the "pulse" and "vibration" sensations described above (described with reference to FIG. 14). A different embodiment is described in co-pending application Ser. No. 08/965, 720, filed Nov. 7, 1997, and incorporated herein by reference. Other types of devices, such as joysticks, steering wheels, trackballs, etc., can provide additional actuators as well.

Actuator interface 516 can be optionally connected between actuator assembly 54 and microprocessor 510 to convert signals from microprocessor 510 into signals appropriate to drive actuator assembly 54. Interface 516 can include power amplifiers, switches, digital to analog controllers (DACs), analog to digital controllers (ADCs), and other components, as is well known to those skilled in the art. It should be noted that circuitry should be provided to allow the actuator to be driven in two directions, since the preferred embodiment does not allow full revolutions of the actuator shaft, as described above. Circuitry for such bi-directional (harmonic) operation are well known to those skilled in the art and are also described in copending provisional patent application No. 60/142,155, incorporated herein by reference.

Other input devices 518 are included in mouse 12 and send input signals to microprocessor 510 or to host 14 when manipulated by the user. Such input devices include buttons 16 and can include additional buttons, dials, switches, scroll wheels, or other controls or mechanisms.

Power supply 520 can optionally be included in mouse 12 coupled to actuator interface 516 and/or actuator assembly 54 to provide electrical power to the actuator, or be provided as a separate component. Alternatively, and more preferably, power can be drawn from a power supply separate from mouse 12, or power can be received across a USB or other bus. Also, received power can be stored and regulated by mouse 12 and thus used when needed to drive actuator assembly 54 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to provide a jolt sensation to the mouse. Alternatively, this technology can be employed in a wireless mouse, in which case battery power is used to drive the tactile actuator. In one embodiment, the battery can be charged by an electric generator on board the mouse, the generator driven by the user's motions of the mouse device. For example, a mouse ball or cylinder can turn a frictional roller or shaft that is coupled to and recharges the generator.

A safety switch 532 can optionally be included to allow a user to deactivate actuator assembly 54 for safety reasons. For example, the user must continually activate or close safety switch 532 during operation of mouse 12 to enable the actuator assembly 54. If, at any time, the safety switch is deactivated (opened), power from power supply 520 is cut to actuator assembly 54 (or the actuator is otherwise disabled) as long as the safety switch is opened. Embodiments include an optical switch, an electrostatic contact switch, a button or trigger, a hand weight safety switch, etc.

Figure 14:
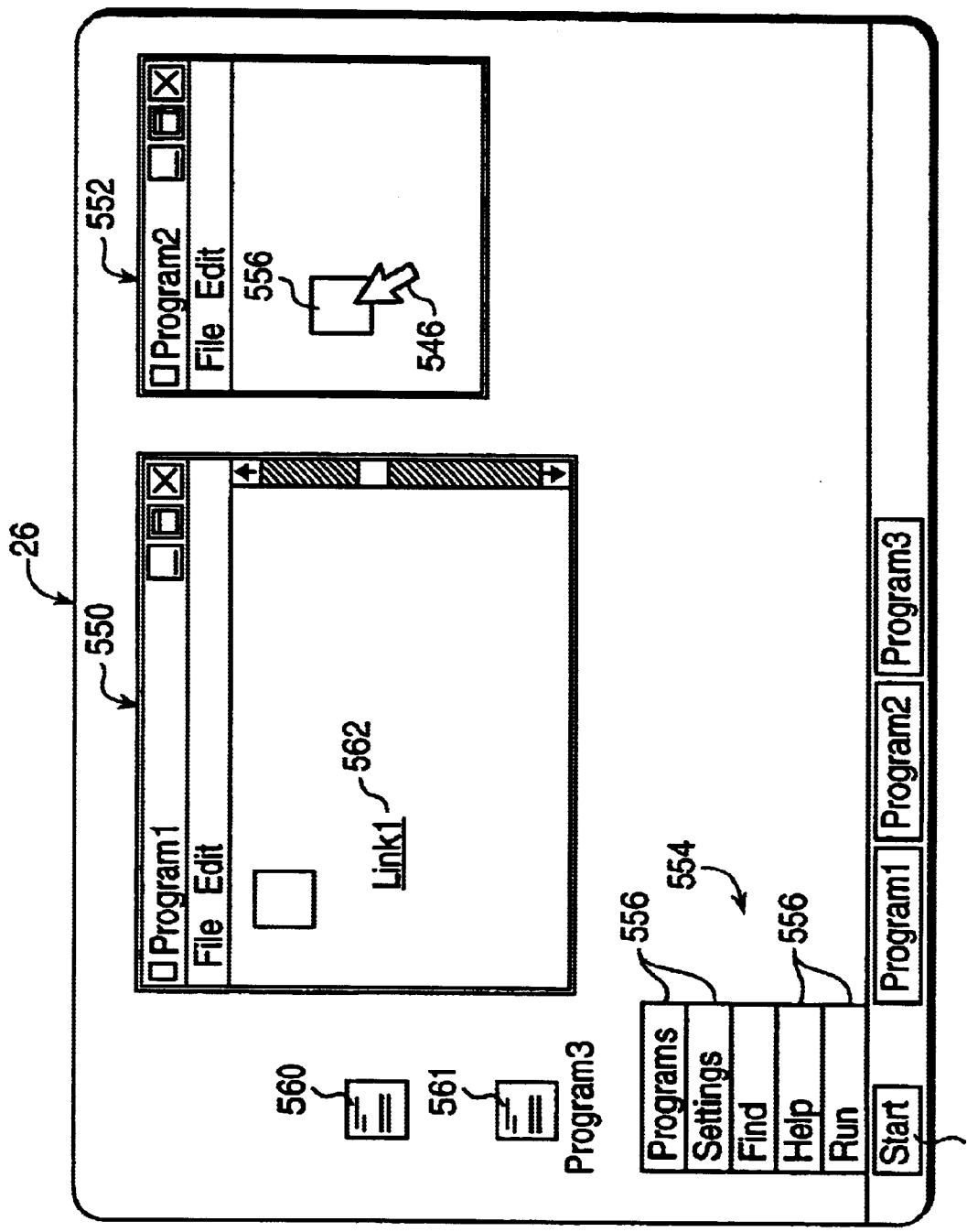
FIG. 14 is a representation of a graphical user interface with elements providing haptic feedback implemented by the present invention.

FIG. 14 is a diagram of display screen 26 of host computer 14 showing a graphical user interface for use with the present invention, which is one type of graphical environment with which the user can interact using the device of the present invention. The haptic feedback mouse of the present invention can provide tactile sensations that make interaction with graphical objects more compelling and more intuitive. The user typically controls a cursor 546 to select and manipulate graphical objects and information in the graphical user interface. The cursor is moved according to a position control paradigm, where the position of the cursor corresponds to a position of the mouse in its planar workspace. Windows 550 and 552 display information from application programs running on the host computer 14. Menu elements 556 of a menu 554 can be selected by the user after a menu heading or button such as start button 555 is selected. Icons 556, 560, and 561 and web links 562 are displayed features that can also be selected. Tactile sensations associated with these graphical objects can be output using actuator assembly 54 based on signals output from the local microprocessor or host computer. It should be noted that the actuator assemblies of the present invention each have a broad range of operating bandwidth and, from the actuator's point of view, can produce any force sensation that is controlled to be produced by appropriate input signals, whether those signals be periodic waveforms, non-periodic signals, pulses, etc.

A basic tactile functionality desired for the mouse device described herein is a "pulse" (or jolt) sensation that is output when the cursor is (a) moved between menu elements 556 of a menu 554, (b) moved on to an icon 556, button, hyperlink 562, or other graphical target, (c) moved across a boundary of a window 550 or 552, (d) moved over application-specific elements in a software title such as nodes in a flow chart, the points of a drawing, or the cells of a spread sheet. The appropriate sensation for this simple cursor interaction is a quick, abrupt "pulse" or "pop." This can be achieved by applying a crisp, short force between the inertial mass and the housing of the mouse device, e.g. by moving the inertial mass in one or a small number of oscillations. For example, a pulse can include a single impulse of force that quickly rises to a desired magnitude and then is turned off or quickly decays back to zero or small magnitude. The pulse can also or alternatively be output as a motion up and down of a contact member such as a cover portion of the housing of the mouse, in appropriate embodiments.

A vibration can also be output, which can include a series of pulses applied periodically over a particular time period at a particular frequency. The time-varying force can be output according to a force vs. time waveform that is shaped like a sine wave, triangle wave, sawtooth wave, or other shape of wave. The vibration is caused by a mass or contact member oscillating back and forth.

In some embodiments, the sensation of a "spatial texture" may be output by correlating pulses and/or vibrations with the motion of the cursor over a graphical object or area. This type of force can depend on the position of the mouse in its planar workspace (or on the position of the cursor in the graphical user interface). For example, the cursor can be dragged over a graphical grating and pulses can be correlated with the spacing of the grating openings. Thus, texture bumps are output depending on whether the cursor has moved over the location of a bump in a graphical object; when the mouse is positioned between "bumps" of the texture, no force is output, and when the mouse moves over a bump, a force is output. This can be achieved by host control (e.g., the host sends the pulses as the cursor is dragged over the grating) or by local control (e.g., the host sends a high level command with texture parameters and the sensation is directly controlled by the device). Some methods for providing texture sensations in a tactile sensation device are described in copending application Ser. No. 09/504,201, filed Feb. 15, 2000 and incorporated herein by reference. In other cases, a texture can be performed by presenting a vibration to a user, the vibration being dependent upon the current velocity of the mouse in its planar workspace. When the mouse is stationary, the vibration is deactivated; as the mouse moves faster, the frequency and magnitude of the vibration is increased. This sensation can be controlled locally by the device processor, or be controlled by the host. Local control by the device may eliminate communication burden in some embodiments. Other spatial force sensations besides textures can also be output. In addition, any of the described haptic sensations herein can be output by actuator 18 simultaneously or otherwise combined as desired.

The host computer 14 can coordinate haptic sensations with interactions or events occurring within the host application. The individual menu elements 556 in the menu can be associated with forces. In one interaction, when the cursor is moved across menu elements 556 in menu 554 of the graphical user interface, "pulse" sensations are applied. The sensations for certain menu choices can be stronger than others to indicate importance or frequency of use, i.e., the most used menu choices can be associated with higher-magnitude (stronger) pulses than the less used menu choices. Also, disabled menu choices can have a weaker pulse, or no pulse, to indicate that the menu choice is not enabled at that time. Furthermore, when providing tiled menus in which a sub-menu is displayed after a particular menu element is selected, as in Microsoft Windows™, pulse sensations can be sent when a sub-menu is displayed. This can be very useful because users may not expect a sub-menu to be displayed when moving a cursor on a menu element.

Pulse sensations can also be output based on interaction between cursor 546 and a window. For example, a pulse can be output when the cursor is moved over a border of a window 550 or 552 to signal the user of the location of the cursor. When the cursor 546 is moved within the window's borders, a texture force sensation can be output. The texture can be a series of bumps that are spatially arranged within the area of the window in a predefined pattern; when the cursor moves over a designated bump area, a pulse sensation is output when the cursor moves over designated pulse points or lines. A pulse can also be output when the cursor is moved over a selectable object, such as a link 554 in a displayed web page or an icon 556. A vibration can also be output to signify a graphical object which the cursor is currently positioned over. Furthermore, features of a document displaying in window 550 or 552 can also be associated with force sensations.

In another interaction, when the cursor is moved over an icon 556, folder, hyperlink 562, or other graphical target, a pulse sensation is applied. The sensation associated with some elements can be stronger than others to indicate importance or just to differentiate different elements. For example, icons can be associated with stronger pulses than folders, where the folders can be associated with stronger pulses than tool bar items. Also, the strength of a pulse can be associated with the displayed size of the graphical element, where a large tool bar icon can be associated a stronger pulse than a small tool bar icon. On web pages this is particularly interesting, where small graphical targets can be associated with weaker pulses than large graphical targets. Also, on web pages check boxes and hyperlinks can feel different than buttons or graphical elements based on pulse strength. The magnitude of the pulses can also depend on other characteristics of graphical objects, such as an active window as distinguished from a background window, file folder icons of different priorities designated by the user, icons for games as distinguished from icons for business applications, different menu items in a drop-down menu, etc. Methods of adding tactile sensations to web pages is described in U.S. Pat. No. 5,956,484 and co-pending patent application Ser. No. 08/571,606, both incorporated herein by reference.

In another interaction, when a document is being scrolled, a pulse sensation can be used to indicate the passing of page breaks or other demarcations, e.g. when a particular area or feature of a scrolled page is scrolled past a particular area of the window. In a related tactile sensations, when a document is being scrolled, a vibration sensation can be used to indicate the motion. The frequency of the vibration can be used to indicate the speed of the scrolling, where fast scrolling is correlated with higher-frequency sensations than slow scrolling.

In other related scrolling interactions, when a down-arrow is pressed on a scroll bar, a vibration can be displayed on the device to indicate that scrolling is in process. When using a graphical slider and reaching the end of the slider's travel, a pulse can be used to indicate that the end of travel has been reached. When using a slider bar that has "tick marks", pulse sensations can be used to indicate the location of the "ticks." In some slider bars there is only a single tick mark to indicate the center of the slider bar; a pulse can be output to inform the user when center is reached. In other slider bars there are ticks of different size (for example the center tick may be more important than the others). In such an embodiment, different strength pulses can be used, larger strength indicating the more important ticks. Pulses can also be provided for volume controls. In other instances, strength of a vibration can be correlated with the adjustment of a volume control to indicate magnitude. In yet other instances the frequency of a vibration can be correlated with the adjustment of a volume control to indicate magnitude.

In other interactions, when dragging a graphical object in a graphical user interface, such as an icon, or stretching an element such as a line, a vibration sensation can be used to indicate that the function is active. In some cases a user performs a function, like cutting or pasting a document, and there is a delay between the button press that commands the function and the execution of the function, due to processing delays or other delays. A pulse sensation can be used to indicate that the function (the cut or paste) has been executed.

Haptic sensations can also be associated with particular events that the user may or may not have control over. For example, when email arrives or an appointment reminder is displayed, a pulse or a vibration can be output to notify the user of the event. This is particularly useful for disabled users (e.g., blind or deaf users). When an error message or other system event is displayed in a dialog box on the host computer, a pulse or vibration can be used to draw the user's attention to that system event. When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over. The haptic sensations can be varied to signify different types of events or different events of the same type. For example, vibrations of different frequency can each be used to differentiate different events or different characteristics of events, such as particular users sending email, the priority of an event, or the initiation or conclusion of particular tasks (e.g. the downloading of a document or data over a network).

Many haptic sensations can be coordinated with interactions and events occurring within specific types of applications. For example, in a gaming application, a wide variety of periodic sensations can be used to enhance various gaming actions and events, such as engine vibrations, weapon fire, crashes and bumps, rough roads, explosions, etc. These sensations can also be implemented as button reflexes as described in U.S. Pat. No. 5,691,898.

In a spreadsheet application, pulse sensations can be used to indicate when the cursor is moved from one element or cell to another. Stronger pulses can be used to indicate when a particular or predefined row, column, or cell is encountered. Ideally the user who is crafting the spreadsheet can define the strength of the sensation as part of the spreadsheet construction process as well as the particular features assigned to particular pulse strengths.

In a word processor, pulse sensations can be output to allow the user to feel the boundaries between words, the spaces between words, the spaces between lines, punctuation, highlights, bold text, or other notable elements. When adjusting the tab spacing in a word processor, pulses can be used to indicate the adjustment of the graphical tab markers. Stronger pulses can be used on the spaces at certain multiples. When writing an outline in a word processor in which a hierarchy of paragraphs is imposed, pulses can be used to indicate when the cursor is on a particular outline line of a given hierarchy.

In a drawing application that allows a user to lay down color pixels using a "spray can" metaphor, a vibration can be output during the "spraying" process to make the spray-can metaphor more compelling to the user. Drawing or CAD programs also have many other features which can be associated with pulses or other sensations, such as displayed (or invisible) grid lines or dots, control points of a drawn object, outlines or borders of objects, etc.

On web pages, pulse or vibration content can be used to enhance the user experience, e.g. for web objects such as web page links, entry text boxes, graphical buttons, and images. Methods of adding such content are described in U.S. Pat. No. 5,956,484 and co-pending patent application Ser. No. 08/571,606, both incorporated herein by reference.

There may be certain cases where a user may want to turn on or turn off the pulse feedback for a particular feature. For example, when adding a letter to a word in a word processor it is useful to be able to feel the letters as pulses as the cursor is moved from letter to letter along a word. However, this sensation is not always desired by the user. Therefore the sensation can preferably be enabled or disabled by a software selector such as a check box, and/or by hardware such as pressing a button on the mouse. In other cases or embodiments, a feature can be enabled or disabled depending upon the velocity at which the mouse is being moved. For example, if the user is moving the cursor very quickly across the displayed desktop, the user is probably not trying to select a graphical object in the path of the cursor. In that case the pulses could be a distraction as the cursor passes over icons or over window borders. Therefore, it would be advantageous if the host software (or the software/firmware run by a local microprocessor) attenuated or eliminated the pulses when moving at or greater than a threshold velocity. Conversely, when the user is moving the cursor slowly he or she is likely trying to select or engage a graphical target; in that case the pulses could be active or even accentuated with a higher magnitude.

A software designer may want to allow a user to access a software function by positioning the cursor over an area on the screen, but not require pressing a button on the mouse (as is the typical way to execute a function, usually called "clicking"). Currently, it is problematic to allow "click-less" execution because a user has physical confirmation of execution when pressing a button. A pulse sent to the haptic mouse of the present invention can act as that physical confirmation without the user having to press a button. For example, a user can position a cursor over a web page element, and once the cursor is within the desired region for a given period of time, an associated function can be executed. This is indicated to the user through a haptic pulse sent via the mouse.

If a second actuator is being used to supplement the primary actuator assembly 54, such as a low-power brake as described with respect to FIG. 13, then the passive resistance provided by the brake can allow additional feel sensations that supplement the "pulse" and "vibration" sensations described above. For example, when a user drags an icon, the passive resistance force can provide a dragging (damping) sensation to the user. The larger the object to be dragged (in displayed size or other measurable characteristic), the more resistance is applied. Also, when a user stretches an image, the passive resistance force can provide a dragging sensation. The larger the object to be dragged, the more resistance is applied. The use of both active and passive haptic feedback can be used synergistically; for example, passive resistance can be useful to slow down mouse movement when selecting menu items, but since passive feedback can only be output when the mouse is being moved by the user, active feedback is useful to be output when the mouse is at rest or moving slowly. An embodiment employing passive braking can also employ the "desired play" methodology described in U.S. Pat. No. 5,767,839, incorporated herein by reference, to achieve enhanced functionality.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the actuator assembly of the present invention and many different types of rotary actuators can be used in the actuator assembly. Different configurations of flexures can also be used which provide the essential degrees of freedom to an inertial mass or contact member. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A haptic feedback interface device in communication with a host processor implementing a host program, said interface device manipulated by a user, the interface device comprising:
   a housing that is physically contacted by said user;
   a sensor device detecting said manipulation of said interface device by said user, said sensor device outputting sensor signals representative of said manipulation;
   an actuator coupled to said housing, said actuator operative to output a rotary force; and
   a flexure coupling said actuator to said housing, said flexure being a unitary member and including a plurality of flex joints allowing a portion of said flexure to be approximately linearly moved, wherein said flexure converts said rotary force output by said actuator to said linear motion, said linear motion causing a force that is transmitted to said user.

2. A haptic feedback interface device as recited in claim 1 wherein said linear motion is approximately along an axis that is perpendicular to a planar workspace in which said interface device may be moved by said user.

3. A haptic feedback interface device as recited in claim 1 wherein said portion of said flexure is coupled to an inertial mass so that said inertial mass is linearly moved when said actuator outputs said rotary force, wherein an inertial force caused by said inertial mass is transmitted to said user through said housing.

4. A haptic feedback interface device as recited in claim 3 wherein said inertial mass is said actuator.

5. A haptic feedback interface device as recited in claim 4 wherein said flexure includes:
   a rotating member coupled to said housing by a flex joint, and
   two arm members, each arm member coupling said actuator to said housing via at least one flex joint.

6. A haptic feedback interface device as recited in claim 5 wherein said rotating member is coupled to said housing by two flex joints, and wherein each of said arm members couples said actuator to said housing by two flex joints.

7. A haptic feedback interface device as recited in claim 4 wherein said actuator is positioned such that a rotating shaft of said actuator rotates about an axis approximately perpendicular to a surface on which said interface device rests.

8. A haptic feedback interface device as recited in claim 3 wherein said linear motion provides a pulse correlated with the interaction of a user-controlled cursor with a graphical object displayed in a graphical user interface.

9. A haptic feedback interface device as recited in claim 8 wherein said pulse is output with a magnitude dependent on a characteristic of said graphical object with which said cursor interacts.

10. A haptic feedback interface device as recited in claim 9 wherein said characteristic of said graphical object is a type of said graphical object, wherein said type includes one of an icon, a window, and a menu item.

11. A haptic feedback interface device as recited in claim 9 wherein said pulse is output when said cursor moves between menu items in a displayed graphical menu.

12. A haptic feedback interface device as recited in claim 3 wherein said interface device is operated on a pad, said pad providing compliance between said device and a hard surface supporting said pad, wherein said compliance magnifies said inertial force.

13. A haptic feedback interface device as recited in claim 1 wherein said portion of said flexure is coupled to a moveable contact member, said contact member being in physical contact with said user when said user is normally operating said interface device.

14. A haptic feedback interface device as recited in claim 13 wherein said contact member includes a cover portion of said interface device, said cover portion being at least a portion of a top surface of said interface device.

15. A haptic feedback interface device as recited in claim 1 wherein said flexure includes a rotating member coupled to a rotating shaft of said actuator, wherein said rotating member is coupled to a linear moving portion of said flexure by one of said flex joints.

16. A haptic feedback interface device as recited in claim 15 wherein said flexure includes two arm members coupling said linear moving potion to a stationary portion of said flexure, wherein each of said arm members is coupled to said linear moving portion by one of said flex joints.

17. A haptic feedback interface device as recited in claim 1 wherein said flexure includes a central member coupled to a rotating shaft of said actuator and two branch members arranged approximately in a Y-configuration, wherein one of said flex joints is provided between each of said members and coupled members.

18. A haptic feedback interface device as recited in claim 17 wherein two flex joints are provided on each of said branch members and at least one flex joint is provided on said central member.

19. A haptic feedback interface device as recited in claim 1 wherein said actuator is driven bi-directionally to produce pulse or vibration sensations to said user.

20. A haptic feedback interface device as recited in claim 1 wherein said flexure includes at least one stop to prevent motion of an actuator shaft of said actuator past a desired fraction of a full revolution.

21. A haptic feedback interface device as recited in claim 1 wherein said interface device is a handheld interface device.

22. A haptic feedback interface device as recited in claim 1 wherein said interface device is a remote control device.

23. A haptic feedback interface device as recited in claim 1 wherein said interface device is a mouse.

24. A haptic feedback interface device as recited in claim 23 wherein said linear motion is correlated with a graphical representation displayed by said host processor, wherein a position of said mouse in said planar workspace corresponds with a position of a cursor displayed in said graphical representation.

25. A haptic feedback interface device as recited in claim 23 wherein said actuator outputs said force in response to a command received by said mouse from said host processor.

26. A haptic feedback interface device as recited in claim 23 wherein said sensor device includes a ball that frictionally contacts a surface on which said mouse is moved by said user.

27. A haptic feedback interface device as recited in claim 23 wherein said sensor device includes an optical sensor that detects motion of a surface on which said mouse is moved relative to said housing of said mouse.

28. A haptic feedback interface device as recited in claim 1 wherein said linear motion is included in a force sensation, said force sensation being one of a pulse, vibration, and texture force.

29. A haptic feedback interface device as recited in claim 1 further comprising a microprocessor, separate from said host processor, coupled to said sensor and to said actuator, said microprocessor operative to receive host commands from said host processor and output force signals to said actuator for controlling said rotary force, and operative to receive said sensor signals from said sensors, process said sensor signals, and report locative data to said host processor derived from said sensor signals and indicative of movement of said interface device.

30. A haptic feedback interface device in communication with a host processor implementing a host program, said interface device manipulated by a user, the interface device comprising:
   a device housing that is physically contacted by said user;
   a sensor device detecting said manipulation of said interface device by said user, said sensor device outputting sensor signals representative of said manipulation;
   an actuator coupled to said device housing, said actuator operative to output a force; and
   a mechanism coupling said actuator to said device housing, said mechanism allowing said actuator to be moved with respect to said device housing, wherein said actuator acts as an inertial mass when in motion to provide an inertial force that is transmitted to said user wherein said mechanism includes a flexure having at least two flex joints.

31. A haptic feedback interface device as recited in claim 30 wherein said actuator is approximately linearly moved with respect to said device housing, said movement caused by said force output by said actuator.

32. A haptic feedback interface device as recited in claim 31 wherein said force output by said actuator is a rotary force.

33. A haptic feedback interface device as recited in claim 30 wherein said actuator approximately linearly moves approximately along a z-axis substantially perpendicular to an x-y plane in which said user can move a manipulandum of said interface device.

34. A haptic feedback interface device as recited in claim 33 wherein said interface device is a mouse.

35. A haptic feedback interface device as recited in claim 34 wherein said inertial force is correlated with a graphical representation displayed by said host processor, wherein a position of said mouse in said planar workspace corresponds with a position of a cursor displayed in said graphical representation.

36. A haptic feedback interface device as recited in claim 34 wherein said inertial force is a pulse correlated with the interaction of a user-controlled cursor with a graphical object displayed in a graphical user interface.

37. A haptic feedback interface device as recited in claim 30 wherein said actuator is coupled to a contact member such that when said actuator is moved, said contact member is moved relative to a base portion of said device housing, wherein said user physically contacts said contact member in normal operation of said interface device, said contact member transmitting a contact force to said user while said inertial force is transmitted to said user.

38. A haptic feedback interface device as recited in claim 37 wherein said contact member includes a cover portion of said interface device, said cover portion being at least a portion of a top surface of said interface device.

39. A haptic feedback interface device as recited in claim 30 wherein said mechanism includes mechanical rotary bearings.

40. A haptic feedback interface device as recited in claim 30 wherein said flexure includes:
   a rotating member coupled to said housing by a flex joint, and
   two arm members, each arm member coupling said actuator to said device housing via at least one flex joint.

41. A haptic feedback interface device as recited in claim 40 wherein said rotating member is coupled to said device housing by two flex joints, and wherein each of said arm members couples said actuator to said housing by two flex joints.

42. A haptic feedback interface device as recited in claim 30 wherein said flexure includes at least one stop to prevent rotation of a shaft of said actuator past a desired fraction of a full revolution.

43. A haptic feedback interface device as recited in claim 30 wherein said actuator drives itself bi-directionally to cause itself to oscillate and produce pulse and vibration sensations to said user.

44. A haptic feedback interface device as recited in claim 30 wherein said interface device is a handheld interface device.

45. A haptic feedback interface device as recited in claim 44 wherein said interface device is a remote control device.

46. A haptic feedback interface device as recited in claim 30 wherein said mechanism includes a travel limiter for limiting said movement of said actuator to a desired range of movement.

47. A haptic feedback interface device as recited in claim 30 wherein said actuator is a rotary DC motor.

48. A haptic feedback interface device in communication with a host processor implementing a host program, said interface device manipulated by a user, the interface device comprising:
   a device housing that is physically contacted by said user;
   a sensor device detecting said manipulation of said interface device by said user, said sensor device outputting sensor signals representative of said manipulation;
   an actuator coupled to said device housing, said actuator operative to output a force; and
   a mechanism coupling said actuator to said device housing, said mechanism allowing said actuator to be moved with respect to said device housing, wherein said actuator acts as an inertial mass when in motion to provide an inertial force that is transmitted to said user, wherein said actuator approximately linearly moves approximately along a z-axis substantially perpendicular to an x-y plane in which said user can move a manipulandum of said interface device, wherein a rotating shaft of said actuator is coupled to a flexure arm of said mechanism, said flexure arm including said at least one flex joint, said flexure arm coupled to a grounded portion that is coupled to said device housing and is flexibly coupled to a carriage of said mechanism, said carriage holding said actuator.

49. A method for providing haptic sensations to a user manipulating an interface device, said interface device in communication with a host computer, the method comprising:
- detecting said manipulation of said interface device by said user, said sensor device outputting sensor signals representative of said manipulation;
- outputting a force using an actuator, wherein said actuator is coupled to a housing of said interface device;
- moving said actuator with said force output by said actuator, wherein said actuator acts as an inertial mass when in motion to provide an inertial force that is transmitted to said user wherein a mechanism including a flexure having at least one flex joint couples said actuator to said housing allows said actuator to be moved with respect to said housing.

50. A method as recited in claim 49 wherein said force is output based on information received by said interface device from said host computer.

51. A method as recited in claim 49 wherein said actuator is moved approximately linearly.

52. A method as recited in claim 49 wherein said force output by said actuator is a rotary force.

53. A method as recited in claim 49 wherein said actuator linearly moves approximately along a z-axis substantially perpendicular to a planar workspace in which said user can move a manipulandum of said interface device.

54. A method as recited in claim 53 wherein said inertial force is correlated with a graphical representation displayed by said host computer, wherein a position of said manipulandum in said planar workspace corresponds with a position of a cursor displayed in said graphical representation.

55. A method as recited in claim 49 wherein said actuator is biased to an origin position by a spring compliance when said actuator is at rest.

56. A method as recited in claim 55 wherein when said force is output, said actuator is moved initially in a direction in which a distance from said origin position to a first range limit of said movement of said actuator is greater than a distance from said origin position to a second range limit of said movement of said actuator.

57. An actuator assembly for use in a haptic feedback interface device in communication with a host processor implementing a host program, said interface device manipulated by a user, the actuator assembly comprising:
- an actuator having an actuator housing and a rotating shaft, said actuator housing coupled to a housing of said interface device, said actuator operative to output a force; and
- a mechanism coupling said actuator to said housing, said mechanism allowing said actuator housing and shaft to be moved with respect to said device housing, said movement caused by said output force, wherein said actuator acts as an inertial mass when in motion to provide an inertial force that is transmitted to said user of said interface device, and wherein said mechanism is a flexure including at least one flex joint.

58. An actuator assembly as recited in claim 57 wherein said actuator moves approximately linearly.

59. An actuator assembly as recited in claim 57 wherein said force output by said actuator is a rotary force.

60. An actuator assembly as recited in claim 57 wherein said rotating shaft of said actuator is coupled to a flexure arm including said at least one flex joint, said flexure arm coupled to a grounded portion that is flexibly coupled to a carriage, said carriage holding said actuator housing.

61. An actuator assembly as recited in claim 57 wherein said mechanism includes a travel limiter for limiting said movement of said actuator to a desired range of movement.

62. An actuator assembly as recited in claim 57 wherein said actuator is coupled to a contact member such that when said actuator is moved, said contact member is moved, wherein said user physically contacts said contact member in normal operation of said interface device, said contact member transmitting a contact force to said user.

63. An actuator assembly for use in a haptic feedback interface device in communication with a host processor implementing a host program, said interface device manipulated by a user, the actuator assembly comprising:
- an actuator coupled to a housing of said interface device, said actuator operative to output a rotary force; and
- a flexure coupling said actuator to said housing, said flexure including a plurality of flex joints allowing a portion of said flexure to be approximately linearly moved, wherein said flexure converts said rotary force output by said actuator to said linear motion, said linear motion causing a force that is transmitted to said user.

64. A haptic feedback interface device as recited in claim 63 wherein said portion of said flexure is coupled to an inertial mass so that said inertial mass is linearly moved when said actuator outputs said rotary force, causing an inertial force from said linear movement.

65. A haptic feedback interface device as recited in claim 64 wherein said inertial mass is said actuator.

66. A haptic feedback interface device as recited in claim 63 wherein said flexure includes a rotating member coupled to a rotating shaft of said actuator, wherein said rotating member is coupled to a linear moving portion of said flexure by one of said flex joints.

67. A haptic feedback interface device as recited in claim 66 wherein said flexure includes two arm members coupling said linear moving potion to a stationary portion of said flexure, wherein each of said arm members is coupled to said linear moving portion by one of said flex joints.

68. A haptic feedback interface device as recited in claim 63 wherein said actuator is driven bi-directionally to produce pulse or vibration sensations to said user.

69. A haptic feedback interface device as recited in claim 63 wherein said flexure includes at least one stop to prevent motion of an actuator shaft of said actuator past a desired fraction of a full revolution.

* * * * *